US009141374B2

(12) United States Patent
Ando

(10) Patent No.: US 9,141,374 B2
(45) Date of Patent: Sep. 22, 2015

(54) IMAGE FORMING DEVICE, INFORMATION PROCESSING METHOD, INFORMATION PROCESSING PROGRAM, AND RECORDING MEDIUM

(75) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 1989 days.

(21) Appl. No.: 11/521,495

(22) Filed: Sep. 15, 2006

(65) Prior Publication Data

US 2007/0124510 A1    May 31, 2007

(30) Foreign Application Priority Data

Sep. 16, 2005 (JP) ................. 2005-270265
Sep. 16, 2005 (JP) ................. 2005-270266
Sep. 7, 2006 (JP) ................. 2006-243221
Sep. 7, 2006 (JP) ................. 2006-243222

(51) Int. Cl.
    *G06F 15/00* (2006.01)
    *G06F 9/44* (2006.01)
(52) U.S. Cl.
    CPC ........................................ *G06F 8/68* (2013.01)
(58) Field of Classification Search
    CPC .................................................... G06F 3/1225
    USPC ............... 358/1.3, 1.15, 448; 379/114.28
    See application file for complete search history.

(56) References Cited

U.S. PATENT DOCUMENTS 5,266,996 A * 11/1993 Wakamiya et al. ............... 399/4
6,131,166 A * 10/2000 Wong-Insley ................ 713/300
6,570,667 B1 * 5/2003 Hattori et al. ................ 358/1.15
2002/0054326 A1 * 5/2002 Morita ......................... 358/1.15
2002/0186400 A1 * 12/2002 Matsueda .................... 358/1.14
2003/0038968 A1    2/2003 Kawaura
2004/0025165 A1    2/2004 Desoli et al.
2004/0075857 A1    4/2004 Akiyoshi et al.
2004/0109188 A1    6/2004 Akiyoshi et al.
2004/0218208 A1   11/2004 Akiyoshi et al.

(Continued)

FOREIGN PATENT DOCUMENTS

JP    2002-84383    3/2002
JP    2002-244877    8/2002

(Continued)

OTHER PUBLICATIONS

U.S. Appl. No. 11/521,567, filed Sep. 15, 2006, Ando.

(Continued)

*Primary Examiner* — Chuong A Ngo
*Assistant Examiner* — Mark Milia
(74) *Attorney, Agent, or Firm* — Oblon, McClelland, Maier & Neustadt, L.L.P.

(57) ABSTRACT

In an image forming device including a service provision program providing service for an application program, the service provision program is constituted by a plurality of modules that operate exclusively to each other and are connected together. Change information of the service provision program is recorded on a change information recording unit in response to a service provision request. A service modifying unit detects a service provision request from the application program to the service provision program, and causes the service provision program to change any of the plurality of modules based on the change information recorded on the change information recording unit in response to the detected service provision request.

24 Claims, 41 Drawing Sheets

(56) References Cited

U.S. PATENT DOCUMENTS

| | | | |
|---|---|---|---|
| 2004/0233475 A1* | 11/2004 | Mikuni et al. | 358/1.15 |
| 2004/0249934 A1* | 12/2004 | Anderson et al. | 709/224 |
| 2004/0252322 A1* | 12/2004 | Gassho et al. | 358/1.14 |
| 2004/0255263 A1 | 12/2004 | Ando | |
| 2005/0057771 A1* | 3/2005 | Ohishi et al. | 358/1.15 |
| 2005/0128517 A1* | 6/2005 | Sakamoto | 358/1.15 |
| 2005/0226641 A1 | 10/2005 | Ando et al. | |
| 2006/0017970 A1* | 1/2006 | Park et al. | 358/1.15 |
| 2006/0070087 A1 | 3/2006 | Ando et al. | |
| 2006/0215218 A1* | 9/2006 | Ujigawa | 358/1.15 |
| 2007/0064892 A1* | 3/2007 | Ando | 379/114.28 |

FOREIGN PATENT DOCUMENTS

| | | |
|---|---|---|
| JP | 2003-223386 | 8/2003 |
| JP | 2004-70944 | 3/2004 |
| JP | 2005-250974 | 9/2005 |

OTHER PUBLICATIONS

Office Action issued Nov. 22, 2011, in Japanese Patent Application No. 2006-243221.

\* cited by examiner

FIG.16

```
1:  <StateMachine xmi.id="003" name="Print"
           version="0" unSolvedFlag="false">
2:    <StateMachine.top>
3:      <CompositeState xmi.id="004" name="" version="0" unSolvedFlag="false"
           isConcurrent="true" isRegion="true">
4:        <CompositeState.subvertex>
5:          <CompositeState xmi.id="005" name="Idle" version="0" unSolvedFlag="false"
             isConcurrent="true" isRegion="true">
6:            <StateVertex.container>
7:              <CompositeState xmi.idref="004"/>
8:            </StateVertex.container>
9:            <StateVertex.outgoing>
10:             <Transition xmi.idref="006"/>     ~911
11:           </StateVertex.outgoing>
12:           <StateVertex.incoming>
13:             <Transition xmi.idref="007"/>     ~912
14:           </StateVertex.incoming>
15:         </CompositeState>
16:         <CompositeState xmi.id="008" name="Print" version="0" unSolvedFlag="false"
             isConcurrent="true" isRegion="true">
17:           <StateVertex.container>
18:             <CompositeState xmi.idref="004"/>
19:           </StateVertex.container>
20:           <StateVertex.outgoing>
21:             <Transition xmi.idref="007"/>     ~921
22:           </StateVertex.outgoing>
23:           <StateVertex.incoming>
24:             <Transition xmi.idref="006"/>     ~922
25:           </StateVertex.incoming>
```

FIG.17

```
26:         </CompositeState>
27:        </CompositeState.subvertex>                                              920
28:       </CompositeState>
29:     </StateMachine.top>
30:     <StateMachine.context>
31:       <ModelElement xmi.idref="001"/>
32:     </StateMachine.context>
33:     <StateMachine.transitions>
34:       <Transition xmi.id="006" name="PRINT START" version="0" unSolvedFlag="false">
38:         <Transition.trigger>
39:           <Event xmi.id="010" name="PRINT START"
                  version="0" unSolvedFlag="false"></UML:Event>
40:         </Transition.trigger>
41:         <Transition.source>                                                     930
42:           <StateVertex xmi.idref="005"/>  ~931
43:         </Transition.source>
44:         <Transition.target>
45:           <StateVertex xmi.idref="008"/>  ~932
46:         </Transition.target>
47:         <Transition.stateMachine>
48:           <StateMachine xmi.idref="003"/>
49:         </Transition.stateMachine>
50:       </Transition>
51:       <Transition xmi.id="007" name="PRINT END" version="0" unSolvedFlag="false">
52:         <Transition.trigger>
53:           <Event xmi.id="011" name="PRINT END"
                  version="0" unSolvedFlag="false"></UML:Event>
54:         </Transition.trigger>
55:         <Transition.source>
56:           <StateVertex xmi.idref="008"/>  ~941
57:         </Transition.source>
58:         <Transition.target>                                                     940
59:           <StateVertex xmi.idref="005"/>  ~942
60:         </Transition.target>
61:         <Transition.stateMachine>
62:           <StateMachine xmi.idref="003"/>
63:         </Transition.stateMachine>
64:       </Transition>
65:     </StateMachine.transitions>
66:   </StateMachine>
```

FIG.20

```
1:  <aspectSM>
2:    <Event name="Memory" type="lower" value="10MB">            ── 811
3:      <modify.StateMachine>
4:        Print
5:      </modify.StateMachine>
6:    </Event>
7:    <aspect XMl.StateMachine="Print">                           ── 812
8:      <pointcut.Transmission name="PRINT START" timing="Idle"/>  ── 813
9:      <advice.Gaurd type="insert">
10:       <Transition.guard>
11:         <Guard xmii.id="009" name="is_in(FaxTx.Idle)" version="0" unSolvedFlag="false">
12:         </Guard>
13:       </Transition.guard>
14:     </advice>
15:   </aspect>                                                   ── 814
16: </aspectSM>
```

810

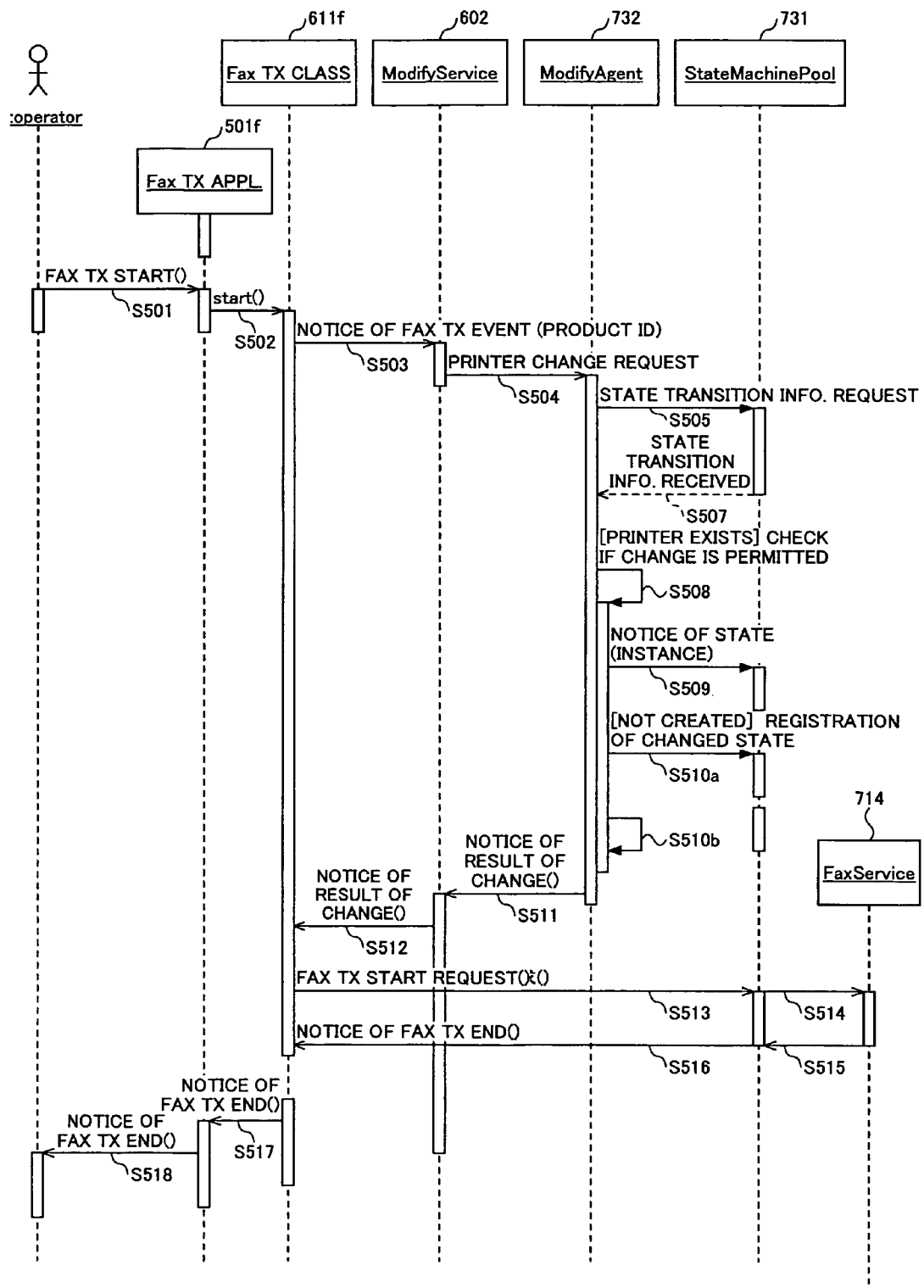

FIG.24

```
1: <aspectSM>
2:   <Event name="Method" type="void jp.co.rrr.function.FaxTx:start(void)" value="123456">
3:     <modify.StateMachine>
4:       Print
5:     </modify.StateMachine>
6:   </Event>
7:   <aspect XMI.StateMachine="Print">
8:     <pointcut.Transmission name="PRINT START" timing="Idle"/>
9:     <advice.Gaurd type="insert">
10:      <Transition.guard>
11:        <Guard xmi.id="009" name="is_in(FaxTx.Idle)" version="0" unSolvedFlag="false"/>
12:      </Guard>
13:      </Transition.guard>
14:    </advice>
15:  </aspect>
16:</aspectSM>
```

FIG.32

```
121: <StateMachine xmi.id="004" name="StateMachine FaxTx1" version="0" unSolvedFlag="false">
122:   <StateMachine.top>
123:     <CompositeState xmi.id="016" name="" version="0"
                                  unSolvedFlag="false" isConcurrent="true" isRegion="true">
124:       <CompositeState.subvertex>
125:         <CompositeState xmi.id="017" name="FaxTx1" version="0"
                                  unSolvedFlag="false" isConcurrent="true" isRegion="true">
126:           <StateVertex.container>
127:             <CompositeState xmi.idref="016"/>
128:           </StateVertex.container>
129:           <CompositeState.subvertex>
130:             <Pseudostate xmi.id="018" name="Init" version="0"
                                  unSolvedFlag="false" kind="initial">
131:               <StateVertex.container>
132:                 <CompositeState xmi.idref="017"/>
133:               </StateVertex.container>
134:               <StateVertex.outgoing>
135:                 <Transition xmi.idref="018"/>         ---1111
136:               </StateVertex.outgoing>
137:             </Pseudostate>
138:             <CompositeState xmi.id="019" name="Send" version="0"
                                  unSolvedFlag="false" isConcurrent="true" isRegion="true">   1120
139:               <StateVertex.container>
140:                 <CompositeState xmi.idref="017"/>
141:               </StateVertex.container>
142:               <StateVertex.outgoing>
143:                 <Transition xmi.idref="020"/>         ---1121
144:               </StateVertex.outgoing>
145:               <StateVertex.incoming>
146:                 <Transition xmi.idref="023"/>         ---1122
147:               </StateVertex.incoming>
148:             </CompositeState>
149:             <CompositeState xmi.id="022" name="Idle" version="0"
                                  unSolvedFlag="false" isConcurrent="true" isRegion="true">   1130
150:               <StateVertex.container>
151:                 <CompositeState xmi.idref="017"/>
152:               </StateVertex.container>
153:               <StateVertex.outgoing>
154:                 <Transition xmi.idref="023"/>
155:               </StateVertex.outgoing>
156:               <StateVertex.incoming>
157:                 <Transition xmi.idref="018"/>
158:               </StateVertex.incoming>
159:             </CompositeState>
160:             <FinalState xmi.id="024" name="end" version="0" unSolvedFlag="false">         1140
161:               <StateVertex.container>
162:                 <CompositeState xmi.idref="017"/>
163:               </StateVertex.container>
164:               <StateVertex.incoming>
165:                 <Transition xmi.idref="020"/>
```

```
166:            </StateVertex.incoming>
167:          </FinalState>
182:        </CompositeState.subvertex>
183:      </CompositeState>
184:    </CompositeState.subvertex>
185:  </CompositeState>
186: </StateMachine.top>
187: <StateMachine.context>
188:   <ModelElement xmi.idref="001"/>
189: </StateMachine.context>
190: <StateMachine.transitions>
191:   <Transition xmi.id="023" name="PRINT START" version="0" unSolvedFlag="false">                    1150
192:     <Transition.trigger>
193:       <Event xmi.id="027" name="PRINT START" version="0" unSolvedFlag="false"></Event>
194:     </Transition.trigger>
195:     <Transition.source>
196:       <StateVertex xmi.idref="022"/>            ---1151
197:     </Transition.source>
198:     <Transition.target>
199:       <StateVertex xmi.idref="019"/>            ---1152
200:     </Transition.target>
201:     <Transition.stateMachine>
202:       <StateMachine xmi.idref="004"/>
203:     </Transition.stateMachine>
204:   </Transition>
205:   <Transition xmi.id="020" name="PRINT END" version="0" unSolvedFlag="false">                      1160
206:     <Transition.trigger>
207:       <Event xmi.id="028" name="PRINT END" version="0" unSolvedFlag="false"></Event>
208:     </Transition.trigger>
209:     <Transition.source>
210:       <StateVertex xmi.idref="019"/>            ---1161
211:     </Transition.source>
212:     <Transition.target>
213:       <StateVertex xmi.idref="024"/>            ---1162
214:     </Transition.target>
215:     <Transition.stateMachine>
216:       <StateMachine xmi.idref="004"/>
217:     </Transition.stateMachine>
218:   </Transition>
219:   <Transition xmi.id="018" name="" version="0" unSolvedFlag="false">                               1170
220:     <Transition.source>
221:       <StateVertex xmi.idref="018"/>            ---1171
222:     </Transition.source>
223:     <Transition.target>
224:       <StateVertex xmi.idref="022"/>            ---1172
225:     </Transition.target>
226:     <Transition.stateMachine>
227:       <StateMachine xmi.idref="004"/>
228:     </Transition.stateMachine>
244: </StateMachine.transitions>
```

```
1: <aspectSM>
2:    <aspect XMI.StateMachine="StateMachine_FaxTx1" xmi.idref="004">>
3:       <pointcut.CompositeState xmi.idref="017" timing="Idle">
4:          <advice.CompositeState type="insert" >
5:             <CompositeState xmi.id="025" name="Transform" version="0"
                  unSolvedFlag="false" isConcurrent="true" isRegion="true">
6:                <StateVertex.container>
7:                   <CompositeState xmi.idref="017"/>
8:                </StateVertex.container>
9:                <StateVertex.outgoing>
10:                  <Transition xmi.idref="021"/>
11:               </StateVertex.outgoing>
12:               <StateVertex.incoming>
13:                  <Transition xmi.idref="023"/>
14:               </StateVertex.incoming>
15:               <State.entry>
16:                  <Action xmi.id="026" name="pdf2tiff" version="0" unSolvedFlag="false"
                       isAsynchronous="false" actionType="5"></Action>
17:               </State.entry>
18:            </CompositeState>
19:         </advice>
20:      </pointcut>
21:      <pointcut.Transition xmi.idref="023" timing="Idle">
22:         <advice.Transition.target type="modify" >
23:            <StateVertex xmi.idref="025"/>
24:         </advice>
25:         <advice.Transition type="insert" >
26:            </Transition>
27:            <Transition xmi.id="021" name="TRANSFORM END" version="0" unSolvedFlag="false">
28:               <Transition.trigger>
29:                  <Event xmi.id="029" name="TRANSFORM END" version="0"
                       unSolvedFlag="false"></Event>
30:               </Transition.trigger>
31:               <Transition.source>
32:                  <StateVertex xmi.idref="025"/>
33:               </Transition.source>
34:               <Transition.target>
35:                  <StateVertex xmi.idref="019"/>
36:               </Transition.target>
37:               <Transition.stateMachine>
38:                  <StateMachine xmi.idref="004"/>
39:               </Transition.stateMachine>
40:            </Transition>
41:         </advice>
42:      </pointcut>
43:      <pointcut.XMI.extension >
44:         <advice.Bundle type="insert" >
45:            <Bundle:StateMachine xmi.idref="004">
46:               <Action xmi.idref="026" name="pdf2tiff" >
47:                  <action class="jp.co.rrr.function.pdf2tiff"/>
48:                  <property name="type" value="size" type="string"/>
49:               </Action>
50:               <Transition xmi.idref="021" name="TRANSFORM END">
51:                  <transition class="jp.co.rrr.function.convertEnd"/>
52:               </Transition>
53:            </Bundle:StateMachine>
54:         </advice>
55:      </pointcut>
56:   </aspect>
57: <aspectSM>
```

IMAGE FORMING DEVICE, INFORMATION PROCESSING METHOD, INFORMATION PROCESSING PROGRAM, AND RECORDING MEDIUM

BACKGROUND OF THE INVENTION

1. Field of the Invention

The present invention relates to an image forming device, such as copier, printer, scanner, facsimile, composite machine or multi-function peripheral, an information processing method, an information processing program, and a recording medium, such as SD memory card.

2. Description of the Related Art

In recent years, a composite machine or multi-function peripheral which is provided with a copier function, a printer function, a scanner function and a facsimile function has come to be marketed. The composite machine or multi-function peripheral is configured to print an image on a copy sheet when it functions as a copier or a printer. The composite machine or multi-function peripheral is configured to read an image from an original document when it functions as a copier or a scanner. The composite machine or multi-function peripheral is configured to transmit an image to or receive an image from an external device through a communication line when it functions as a facsimile. For example, see Japanese Laid-Open Patent Application No. 2002-084383.

In recent years, various kinds of application program and platform have come to be implemented in the composite machine or the multi-function peripheral. What is concerned about under such circumstances is that it may be difficult to adapt the existing platform for new application programs which are implemented successively. It is very difficult to take into consideration, at the time of design of a platform, the differences between the currently developed application programs developed, or predict the functions of application programs that will be developed in the future. There may be a possibility that a certain application program does not operate normally under the influence of the platform according to the kind of the application program.

Accordingly, it is desirable to provide a mechanism for adapting the platform to conform to various changes of the application programs appropriately.

SUMMARY OF THE INVENTION

According to one aspect of the invention, there is provided an improved image forming device in which the above-described problems are eliminated.

According to one aspect of the invention there is provided an image forming device having application programs and a platform being implemented, wherein a mechanism for adapting the platform to conform to various changes of the application programs appropriately is provided.

In an embodiment of the invention which solves or reduces one or more of the above-mentioned problems, there is provided an image forming device comprising: a service provision program providing service for an application program, the service provision program being constituted by a plurality of modules that operate exclusively to each other and are connected together; a change information recording unit on which change information of the service provision program is recorded in response to a service provision request to the service provision program; and a service modifying unit detecting a service provision request from the application program to the service provision program, and causing the service provision program to change any of the plurality of modules based on the change information recorded on the change information recording unit in response to the detected service provision request.

In an embodiment of the invention which solves or reduces one or more of the above-mentioned problems, there is provided an image forming device comprising: a service provision program providing service for an application program, the service provision program being constituted by a plurality of modules that operate exclusively to each other and are connected together; an input unit receiving an input of change information of the service provision program; a timing determining unit determining whether an operating state of the service provision program matches with a time of changing specified in change information; a changing unit changing connection relation of the plurality of modules according to the change information when it is determined by the timing determining unit that the operating state of the service provision program matches with the time of changing; and an interface adding unit adding an interface for allowing the application program to use the service provision program in which the connection relation of the plurality of modules is changed.

According to embodiments of the image forming device and method of the invention, it is possible to realize the mechanism for adapting the platform to conform to various changes of the application programs appropriately.

BRIEF DESCRIPTION OF THE DRAWINGS

Other objects, features and advantages of the present invention will be apparent from the following detailed description when reading in conjunction with the accompanying drawings.

FIG. 16 is a diagram showing an example of definition of the state-transition information of Print Service.

FIG. 17 is a diagram showing the example of definition of the state-transition information of Print Service.

FIG. 20 is a diagram showing an example of description of AspectSM in which the contents of change of the behavior of Print Service are described.

FIG. 23 is a sequence diagram for explaining the change processing of Function Service by Modify Service.

FIG. 24 is a diagram showing an example of description of AspectSM which is registered as corresponding to Fax transmission application.

FIG. 32 is a diagram showing an example of definition of the state-transition information of Fax Tx1.

FIG. 33 is a diagram showing an example of definition of the state-transition information of Fax Tx1.

FIG. 36 is a diagram showing an example of description of AspectSM in which the extended contents of Fax Service are described.

DESCRIPTION OF PREFERRED EMBODIMENTS

A description will be given of embodiments of the invention with reference to the accompanying drawings.

Figure 1:
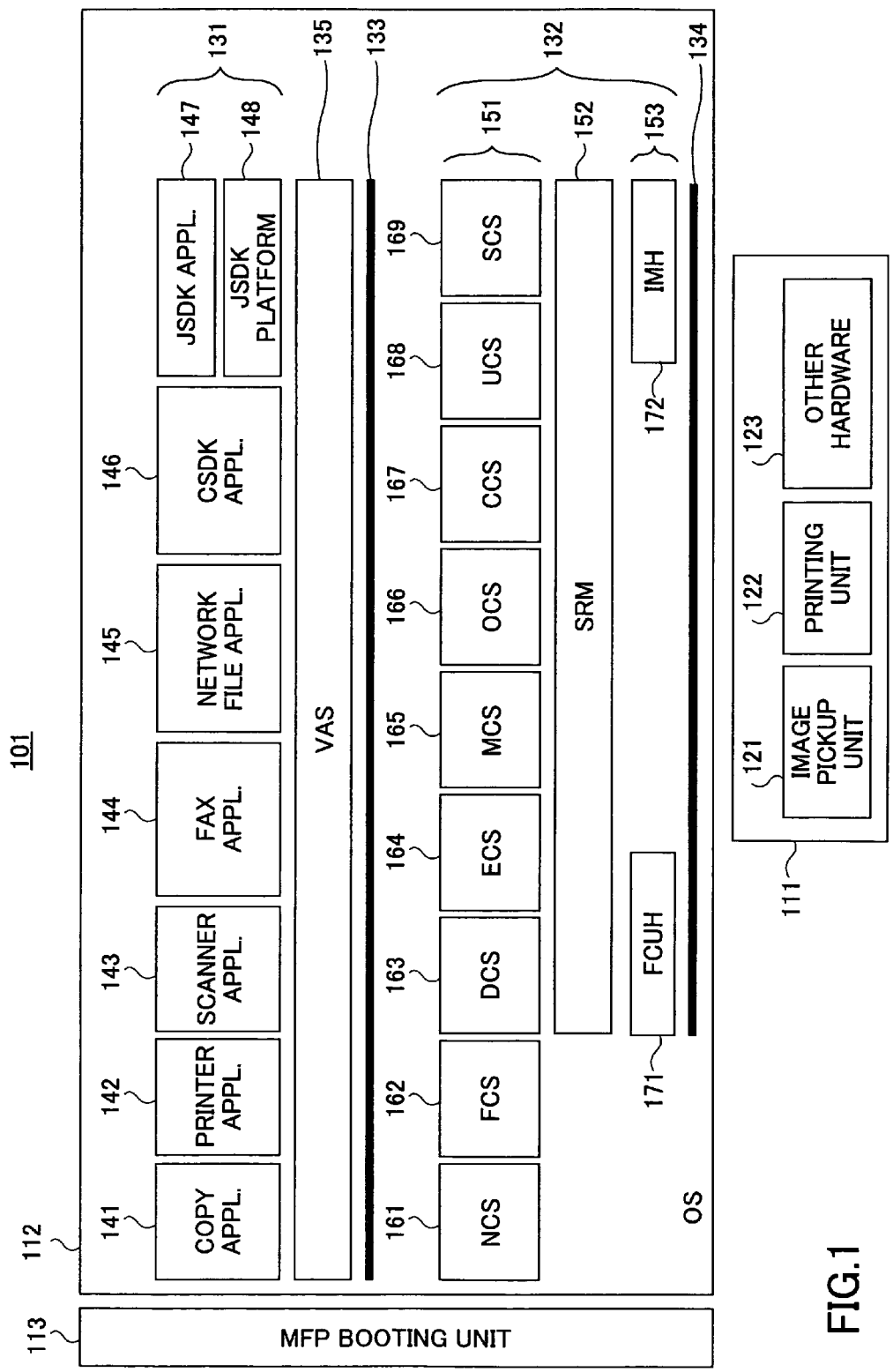
FIG. 1 is a diagram showing the composition of a multi-function peripheral concerning an embodiment of this invention.

FIG. 1 shows the composition of the multi-function peripheral (MFP) 101 in an embodiment of the invention.

The MFP 101 of FIG. 1 comprises various hardware elements 111, various software elements 112, and a MFP booting unit 113. The hardware elements 111 of the multi-function peripheral 101 include an image pick-up unit 121, a printing unit 122, and other hardware elements 123.

The image pick-up unit 121 is the hardware for reading an image (image data) from the original document. The printing unit 122 is the hardware for printing an image (image data) on a copy sheet.

The software elements 112 of the multi-function peripheral 101 include various application programs 131 and various platform programs 132. The OS (operating system), such as UNIX (registered trademark), carries out parallel execution of the respective programs of the software elements 112 as the processes.

The application programs 131 include a copy application 141 which is the application program for a copier, a printer application 142 which is the application program for a printer, a scanner application 143 which is the application program for a scanner, a facsimile application 144 which is the application program for a facsimile, a network file application 145 which is the application program for network files.

Another one of the application programs 131 can be developed using a dedicated SDK (software-development kit). Such application program 131 which is developed using the SDK will be called SDK application. The dedicated SDK may include a CSDK for developing the application program 131 in the C language, and a SDK for developing the application program 131 in the Java (registered trademark) language. The application program 131 developed using the CSDK will be called "CSDK application", and the application program 131 developed using the JSDK is called "JSDK application".

The multi-function peripheral 101 of FIG. 1 includes also the CSDK application 146 and the JSDK application 147. Moreover, the JSDK platform 148 is further provided in the multi-function peripheral 101 of FIG. 1 as the software element 112 which performs the intermediary tasks between the JSDK application 147 described in the Java language and another software element 112 described in the C language.

The platform 132 includes various control services 151, a system resource manager 152, and various handlers 153. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

The process of NCS 161 performs intermediary tasks for network communications. The process of FCS 162 provides the API (application program interface) of facsimile function. The process of DCS 163 performs control related to the message distribution processing of stored documents. The process of ECS 164 performs control related to the image pick-up unit 121 and the printing unit 122. The process of MCS 165 performs control related to the memory and the hard disk drive. The process of OCS 166 performs control related to the operation panel. The process of CCS 167 performs control related to authenticating processing and charging processing. The process of UCS 168 performs control related to the management of user information. The process of SCS 169 performs control related to the management of the system.

A virtual application service (VAS) 135 is provided as the software element 112 which performs the intermediary tasks between the application program 131 and the platform 132. The VAS 135 operates as a server process which makes the application program 131 a client, while it operates as a client process which makes the platform 132 a server. The VAS 135 is provided with the wrapping function which serves to conceal the platform 132 from the application program 131, and it plays the role which absorbs the version difference accompanied with the upgrading of the platform 132.

The MFP booting unit 113 is first initiated upon the power up of the multi-function peripheral 101. Thereby, the OS, such as UNIX (registered trademark), is started and the application programs 131 and the platform 132 are started. These programs are stored in the hard disk drive or the memory card, and they are read from the hard disk drive or the memory card and loaded to the computer memory.

Figure 2:
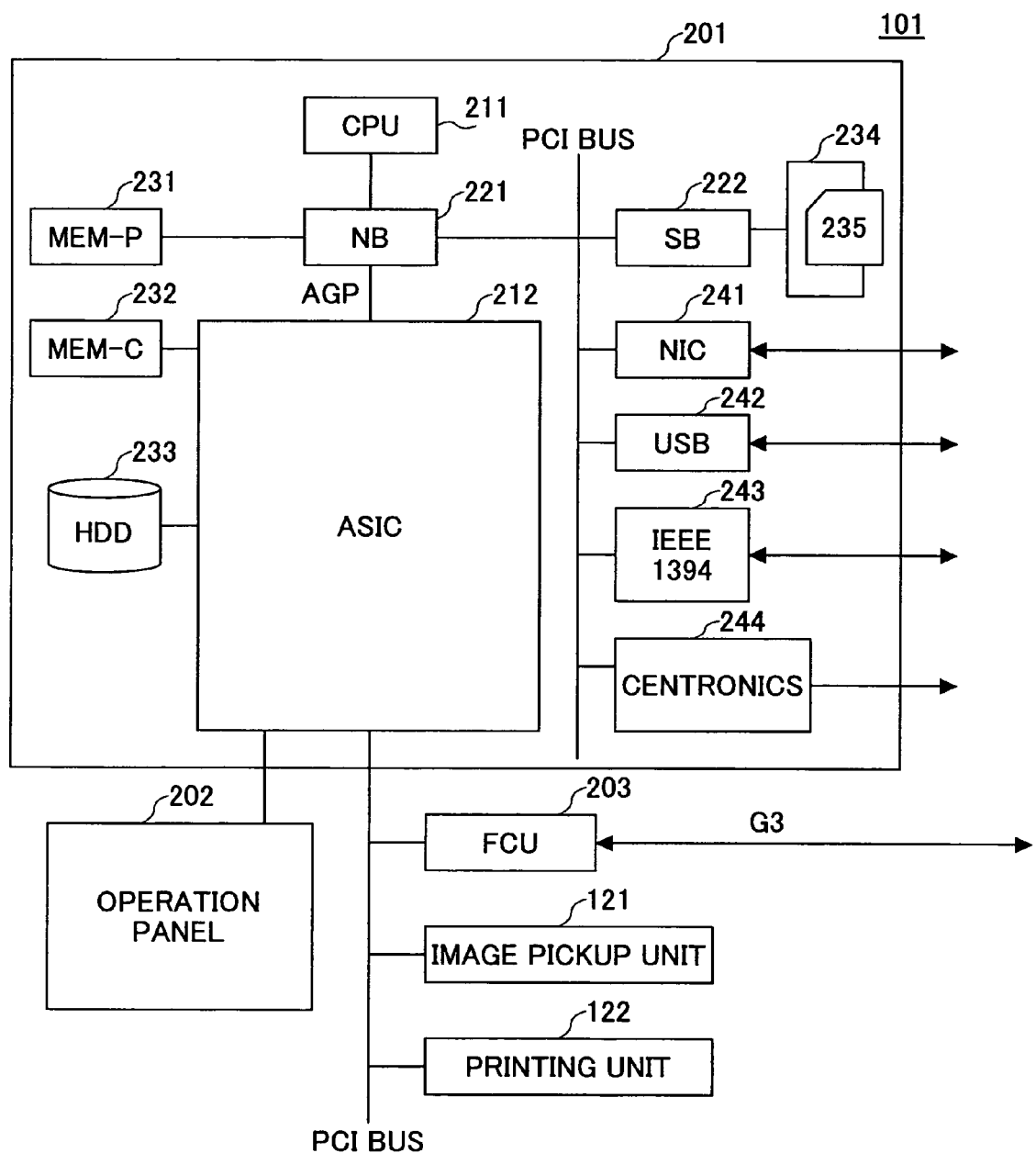
FIG. 2 is a diagram showing the hardware composition of the multi-function peripheral of FIG. 1.

FIG. 2 is a diagram showing the hardware composition of the multi-function peripheral 101 of FIG. 1. The hardware elements 111 of the multi-function peripheral 101 include a controller 201, an operation panel 202, a facsimile control unit (FCU) 203, the image pick-up unit 121, and the printing unit 122.

The controller 201 comprises a CPU 211, an ASIC 212, a NB 221, a SB 222, a MEM-P 231, a MEM-C 232, a HDD (hard disk drive) 233, a memory card slot 234, a NIC (network interface controller) 241, a USB device 242, an IEEE1394 device 243, and a Centronics device 244.

The CPU 211 is the IC for various information processing. The ASIC 212 is the IC for various image processing. The NB 221 is the north bridge of the controller 201. The SB 222 is the south bridge of the controller 201. The MEM-P 231 is the system memory of the multi-function peripheral 101. The MEM-C 232 is the local memory of the multi-function peripheral 101. The HDD 233 is the storage device of the multi-function peripheral 101. The memory card slot 234 is a slot for setting a memory card 235. The NIC 241 is a controller for network communications by using a MAC address. The USB device 242 is a device for providing the connection interface in conformity with the USB specifications. The IEEE1394 device 243 is a device for providing the connection interface in conformity with the IEEE1394 specifications. The Centronics device 244 is a device for providing the connection interface in conformity with the Centronics specifications.

The operation panel 202 is the hardware (operation device) for an operator to give an input to the multi-function peripheral 101, while it is the hardware (display device) for an operator to obtain an output from the multi-function peripheral 101.

Figure 3:
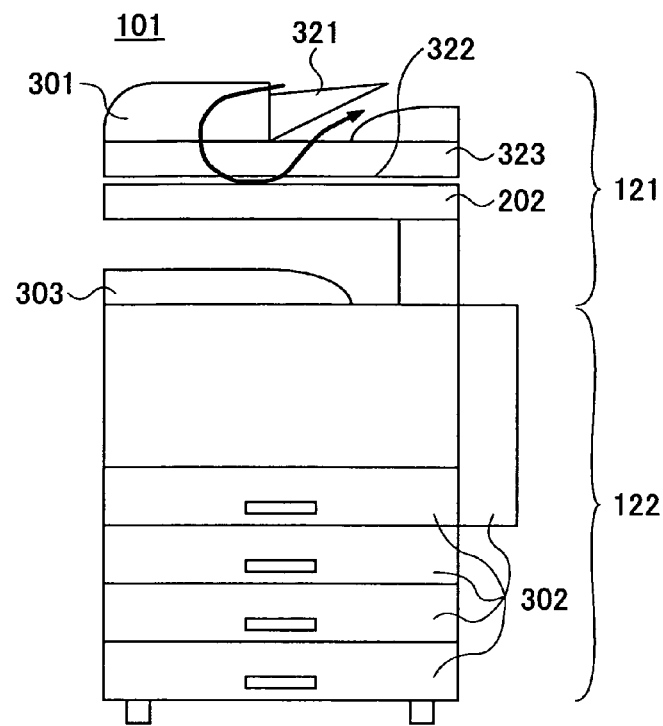
FIG. 3 is a diagram showing the external appearance of the multi-function peripheral of FIG. 1.

FIG. 3 is a diagram showing the external appearance of the multi-function peripheral 101 of FIG. 1.

In FIG. 3, the position of the image pick-up unit 121, the position of the printing unit 122, and the position of the operation panel 202 are illustrated. Illustrated further in FIG. 3 are a document set part 301 used as the place of an original document being set, a sheet feeding part 302 used as the place of a copy sheet being fed, and a sheet ejection part 303 used as the place of a copy sheet being ejected.

Figure 4:
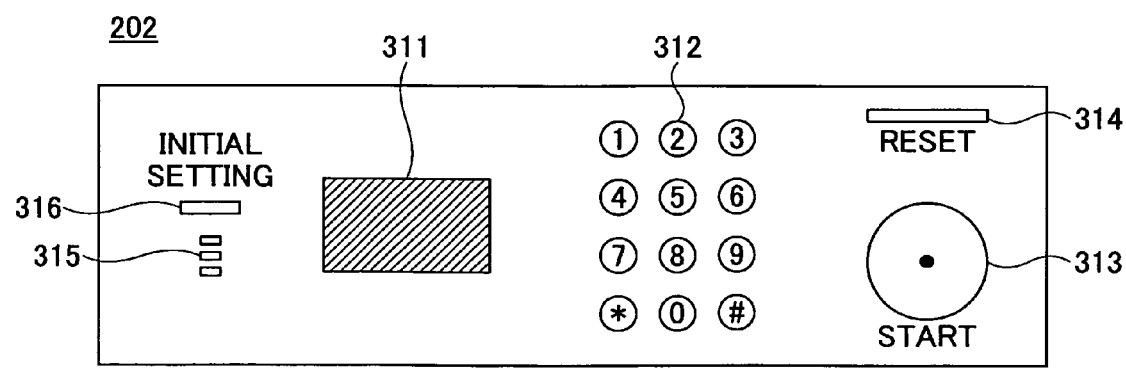
FIG. 4 is a diagram showing the composition of the operation panel.

The operation panel 202 comprises a touch panel 311, ten keys 312, a start button 313, a reset button 314, function keys 315, and an initial-setting button 316 as shown in FIG. 4. The touch panel 311 is the hardware (touch operation unit) for giving an input to the MFP by touch operation, while it is the hardware (display device) for obtaining an output from the MFP in the form of a display screen. The ten keys 312 are the hardware for giving a numeric input by key (button) operation. The start button 313 is the hardware for performing start operation by depression of the button. The reset button 314 is the hardware for performing reset operation by depression of the button. The function keys 315 are the hardware for displaying an operational screen by CSDK application 146 or JSDK application 147 by depression of the key (button). The initial-setting button 316 is the hardware for displaying an initial-setting screen by depression of the button.

The document set part 301 contains an ADF (automatic document feeder) 321, a flat bed 322, and a flat bed cover 323. The sheet feeding part 302 contains four sheet trays. The sheet ejection part 303 contains a sheet ejection tray.

(CSDK/JSDK/OSGi)

Figure 5:
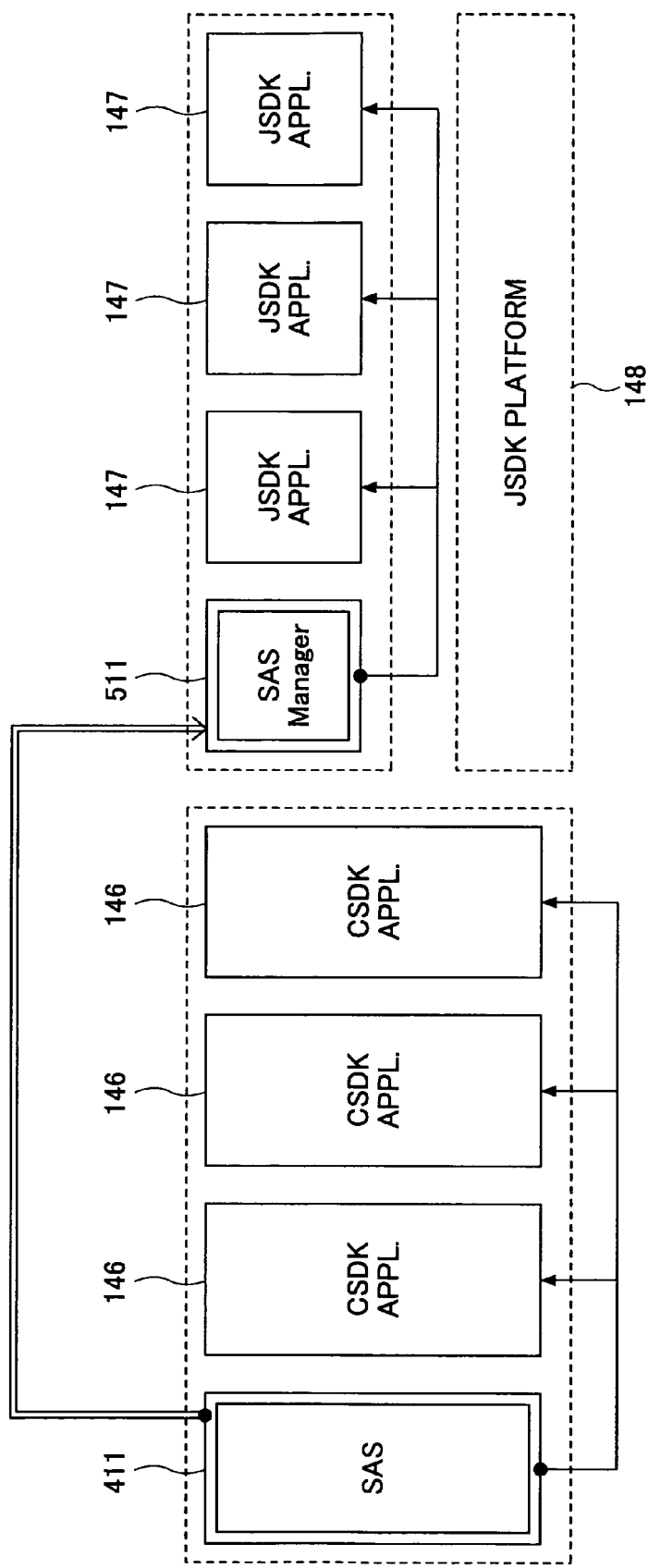
FIG. 5 is a diagram showing the composition of CSDK application programs and JSDK application programs in the multi-function peripheral of FIG. 1.

FIG. 5 is a block diagram showing the composition of CSDK application programs 146 and JSDK application programs 147 in the multi-function peripheral of FIG. 1. For the sake of simplicity, in the following, a CSDK application program 146 will be called CSDK application 146, and a JSDK application program 147 will be called JSDK application 147.

Each CSDK application 146 is an application program described in the C language, and it is performed as a process, respectively. Each JSDK application 147 is an application program described in the Java (registered trademark) language, and it is performed as a thread, respectively.

In the multi-function peripheral 101 of FIG. 1, SAS (SDK application service) 411 is further provided as being a CSDK application 146 which controls other CSDK applications 146, and SAS Manager (SDK application service manager) 511 is further provided as being a JSDK application 147 which controls other JSDK applications 147.

Since the CSDK application 146 is performed as a process while the JSDK application 147 is performed as a thread, the application controlling mechanism for CSDK applications 146, and the application controlling mechanism for JSDK applications 147 are provided separately.

SAS 411 and SAS Manager 511 perform the starting control, starting release control, installing control, uninstalling control, and update control of CSDK application 146 and JSDK application 147, respectively.

SAS 411 is adapted to not only control CSDK application 146, but also control JSDK application 147 through SAS Manager 511. Namely, SAS 411 is capable of performing the control of CSDK application 146 directly, and also capable of performing the control of JSDK application 147 indirectly through SAS Manager 511.

Thus, the application controlling mechanism for CSDK application 146 and the application controlling mechanism for JSDK application 147 are provided in the software of multi-function peripheral 101 in an integrated manner in which the function to control SAS Manager 511 is incorporated into SAS 411.

Since the essential portion of the software of the multi-function peripheral 101 is based on the C language program, it is preferred that the function which controls SDK applications is concentrated on SAS 411 of the C language.

Figure 6:
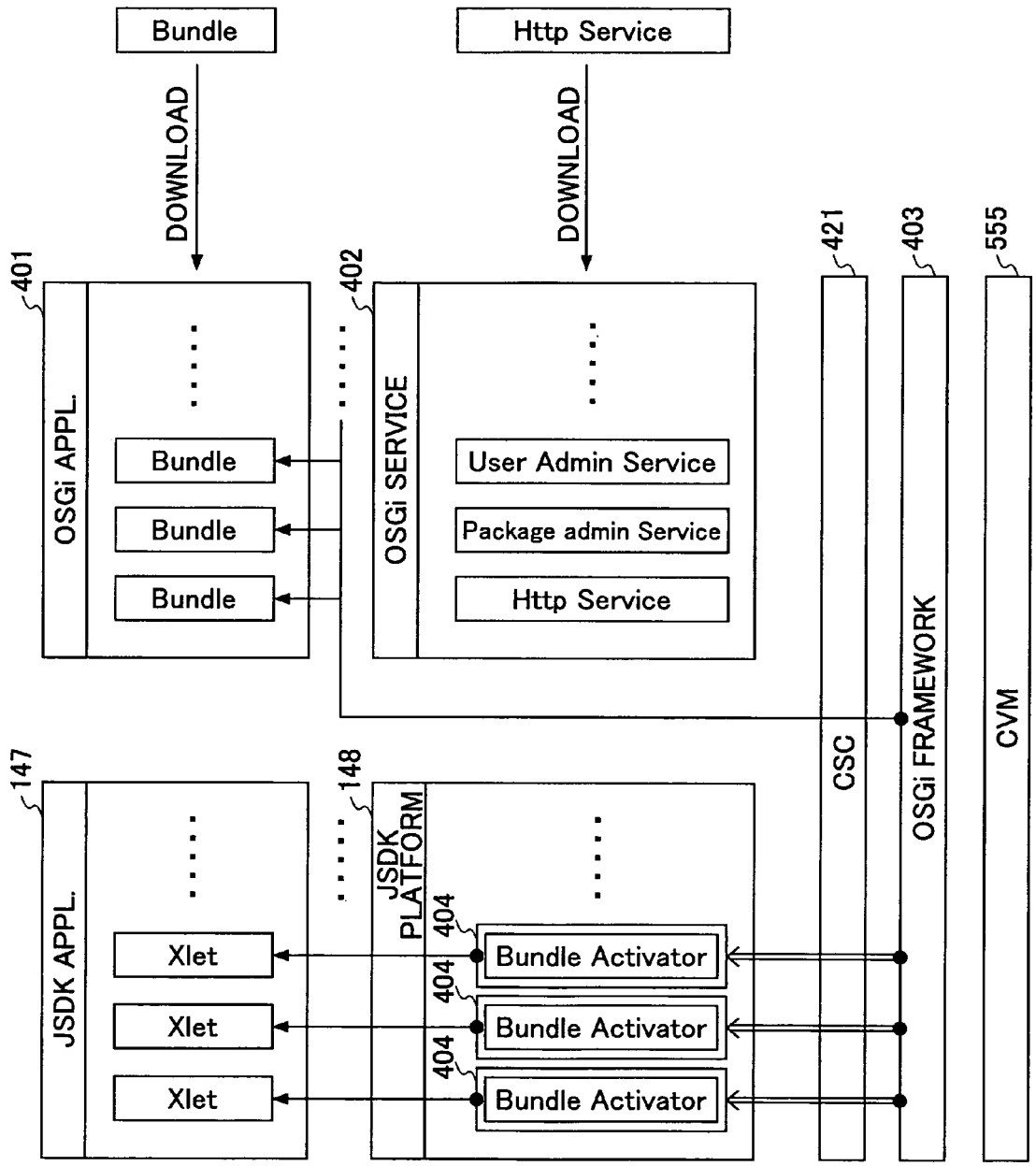
FIG. 6 is a diagram for explaining OSGi service platform in the multi-function peripheral of FIG. 1.

FIG. 6 is a diagram for explaining the OSGI (Open Service Gateway initiative) service platform in the multi-function peripheral 101 of FIG. 1.

The OSGi service platform is the standardization technology provided by the OSGi alliance, and it is the open software component technology based on the Java language.

In a device in which the OSGi service platform is implemented, the software of the Java language is implemented in the form of a software component called "bundle". And many functions of the device can be constituted with a bundle, and updating, customizing and maintenance of many functions of the device can be realized by downloading of the bundle.

In the multi-function peripheral 101 of FIG. 1, the software of the Java language includes JSDK application 147, JSDK platform 148, OSGi application 401 which is the application program for OSGi, OSGi service 402 which is the service for OSGi, and OSGi framework 403 which performs management of the bundle (or management of the life cycle and data of the bundle).

Moreover, in the multi-function peripheral 101 of FIG. 1, CSC (Communication Service Concierge) 421 for processing the OSGi service platform of another device in the same manner as the processing of the OSGi service platform of the self device, and CVM (Compact Virtual Machine) 555 for performing the software of the Java language are provided.

It is preferred that OSGi application 401 is implemented in multi-function peripheral 101 in the form of the bundle but JSDK application 147 is implemented in the multi-function peripheral 101 in the non-bundle form. The purpose of this is not to impose the burdens of bundling and implementation of JSDK application 147 on the vendor of JSDK application 147. Instead, Bundle Activator 404 which performs the bundling of JSDK application 147 is provided in JSDK platform 148.

An OSGi framework 403 manages the bundle (OSGi application 401) which is implemented in the multi-function peripheral 101 in the form of the bundle, and manages the bundle (JSDK application 147) which is implemented in the multi-function peripheral 101 in the non-bundle form and the bundling thereof is performed by Bundle Activator 404.

Thus, the application controlling mechanism for OSGi application 401 and the application controlling mechanism for JSDK application 147 are provided in an integrated manner that OSGi framework 403 and Bundle Activator 404 are arranged in parallel. Thereby, unification of the management resources of the application programs of the Java language is possible.

OSGi framework 403 also performs management of the bundle which constitutes OSGi service 402, and management of the bundle which constitutes JSDK platform 148. Hence, it can be said that unification of the management resources of the software of the Java language is realized. And it is supposed that OSGi application 401 in this embodiment is the Servlet or JSP, and that JSDK application 147 in this embodiment is the Xlet.

Moreover, implementing JSDK application 147 in the multi-function peripheral of FIG. 1 in the form of a bundle may also be possible. Alternatively, JSDK application 147 may be implemented either in the form of the bundle or in the non-bundle form, and whichever is sufficient. If JSDK application 147 is implemented in the form of the bundle, it is no longer necessary to perform the bundling performed by Bundle Activator 404.

(JSDK)

Figure 7:
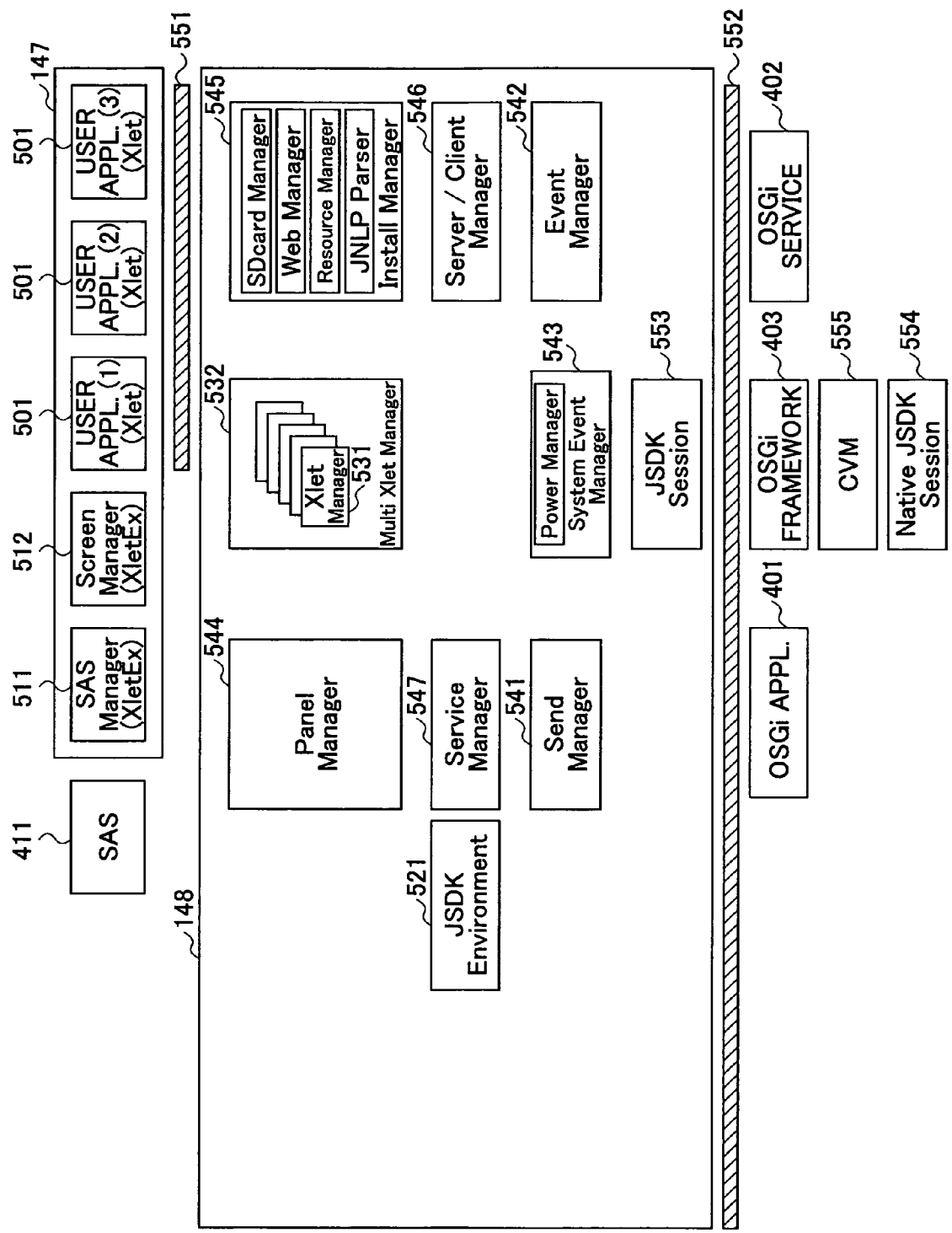
FIG. 7 is a class diagram for explaining a JSDK application program and a JSDK platform in the multi-function peripheral of FIG. 1.

FIG. 7 is a class diagram for explaining JSDK application 147 and JSDK platform 148 in the multi-function peripheral of FIG. 1.

JSDK application 147 and JSDK platform 148 are performed integrally in the same process as a single process. The respective blocks in JSDK application 147 and JSDK platform 148 are performed as a plurality of threads in parallel (multi-thread processing). Each block is performed as a thread in the single process, respectively.

The package translation from the source code into the byte code is performed by the Java compiler, and JSDK application 147 and JSDK platform 148 are serially performed by the Java virtual machine. The Foundation Profile of the Java 2 Micro Edition serves as the base for performing JSDK application 147 and JSDK platform 148.

As shown in FIG. 7, user applications 501, SAS Manager 511, and Screen Manager 512 are provided as JSDK applications 147. Each user application 501 is the JSDK application 147 which the user (for example, the vendor) of the multi-function peripheral 101 has developed using JSDK. The SAS Manager 511 is the JSDK application 147 which controls other JSDK applications 147 (the user applications 501). The Screen Manager 512 is the JSDK application 147 which displays the operational screen which deals with the operation of any of other JSDK applications 147 (the user applications 501).

Each user application 501 in this embodiment is the Xlet which is a kind of a Java language application program similar to a stand-alone application or an applet. The SAS Manager 511 and the Screen Manager 512 in this embodiment are the extended version of Xlet (XletEx) to which a specific extension is given.

As shown in FIG. 7, the respective classes of JSDK Environment 521, Xlet Manager 531, Multi Xlet Manager 532, Send Manager 541, Event Manager 542, System Event Manager 543, Panel Manager 544, Install Manager 545, Server/Client Manager 546, and Service Manager 547 are provided in the JSDK platform 148.

The JSDK Environment 521 is a class which performs starting configuration of the JSDK system reflecting the execution environment of the JSDK system. The Xlet Manager 531 is a class which manages the Xlet using one-to-one correspondence. In this embodiment, the life cycle and data of the five Xlets are managed by the five Xlet Managers 531 using one-to-one correspondence, respectively.

The Multi Xlet Manager 532 is a class which manages all the Xlet Managers 531. In this embodiment, the life cycle and data of all the five Xlet Managers 531 are managed by one Multi Xlet Manager 532.

In addition, the life cycle and data of the bundle of the classes of SAS Manager 511, Screen Manager 512, JSDK Environment 521, Multi Xlet Manager 532, Send Manager 541, Event Manager 542, System Event Manager 543, Panel Manager 544, Install Manager 545, Server/Client Manager 546, and Service Manager 547 are managed by the OSGi framework 403.

The System Event Manager 543 is a class which manages the system event (such as the power mode) which takes place on the platform 132 of FIG. 1. The Panel Manager 544 is a class which performs arbitration when one Xlet occupies the screen of the operation panel 202 of FIG. 2. The Install Manager 545 is a class which performs management of installation or uninstallation of the module externally supplied from the SD card or the Web.

The Service Manager 547 is a class which performs service provision to the Xlet in response to a service request sent from the Xlet.

In the JSDK system of FIG. 7, JSDK API 551 and JSDK API 552 are used as the API (application program interface). The XletEx differs from the Xlet in that which use of JSDK API 551 and access to JSDK platform 148 are possible to XletEx when accessing an object.

Furthermore, in the multi-function peripheral 101 of FIG. 1, as the elements related to the JSDK system of FIG. 7, JSDK Session 553 and Native JSDK Session 554, which are used as the interface of the C language and the Java language, and CVM 555 which serves as the Java virtual machine for performing JSDK application 147 and JSDK platform 148, are provided.

Figure 8:
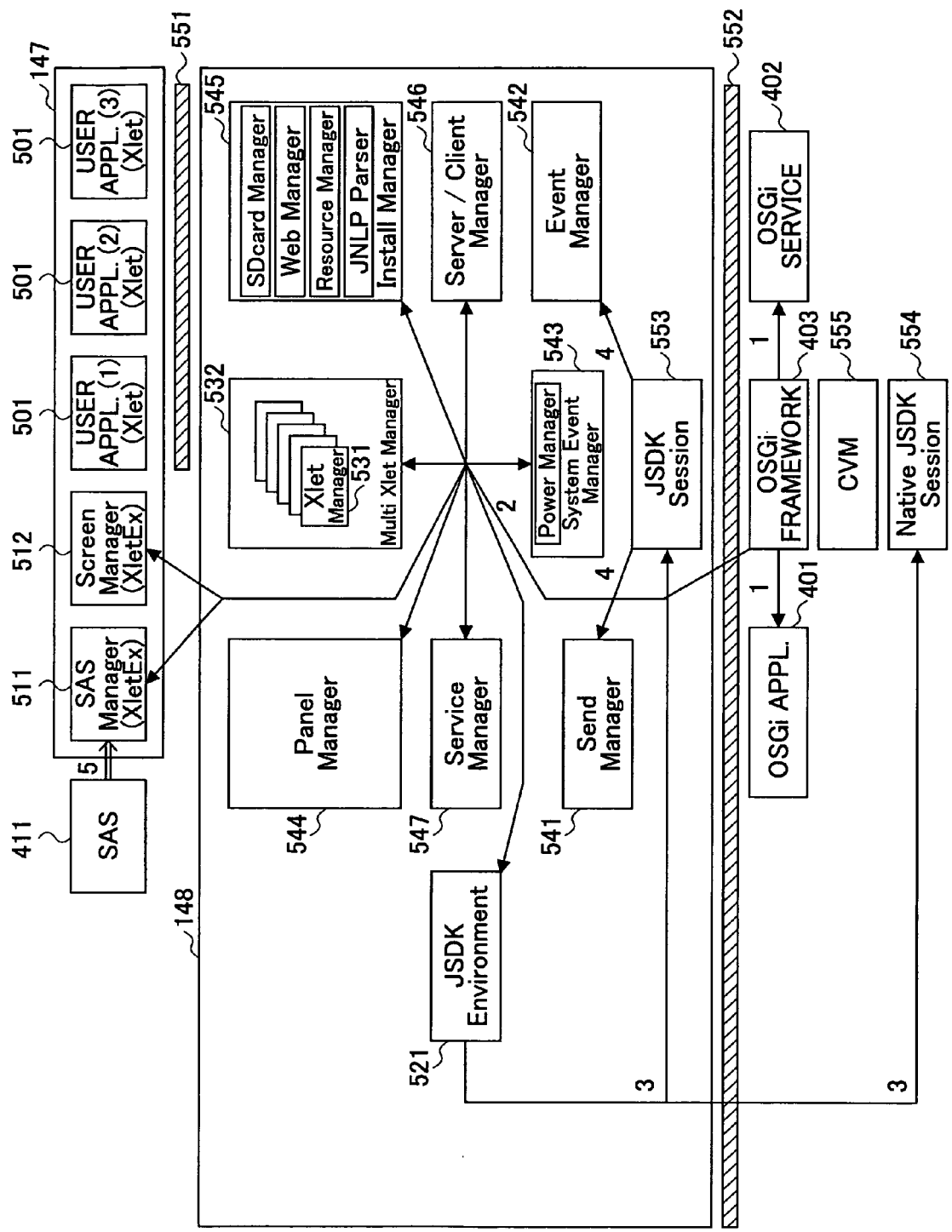
FIG. 8 is a diagram for explaining the starting processing of a JSDK system.

FIG. 8 is a diagram for explaining the starting processing of the JSDK system.

As shown in FIG. 8, upon start of the starting processing of the JSDK system, OSGi framework 403 creates the bundle which constitutes OSGi application 401 and OSGi service 402 (step 1).

Next, OSGi framework 403 creates the bundle which constitutes JSDK application 147 and JSDK platform 148 (step 2).

Next, JSDK Environment 521 performs starting configuration of the JSDK system reflecting the execution environment of the JSDK system, namely, creating JSDK Session 553 and Native JSDK Session 554 (step 3).

Next, JSDK Session 553 creates Send Manager 541 and Event Manager 542 (step 4). SAS 411 and SAS Manager 511 participate in the starting processing of user application 501 (step 5).

In the following, Service Manager 547 will be explained in greater detail. Service Manager 547 will be referred to as Function Service 601, JSDK API 551 will be referred to as Function API 611, and JSDK API 552 will be referred to as C/J API 621. The API is the abbreviation of application program interface.

(1) Function Service

Figure 9:
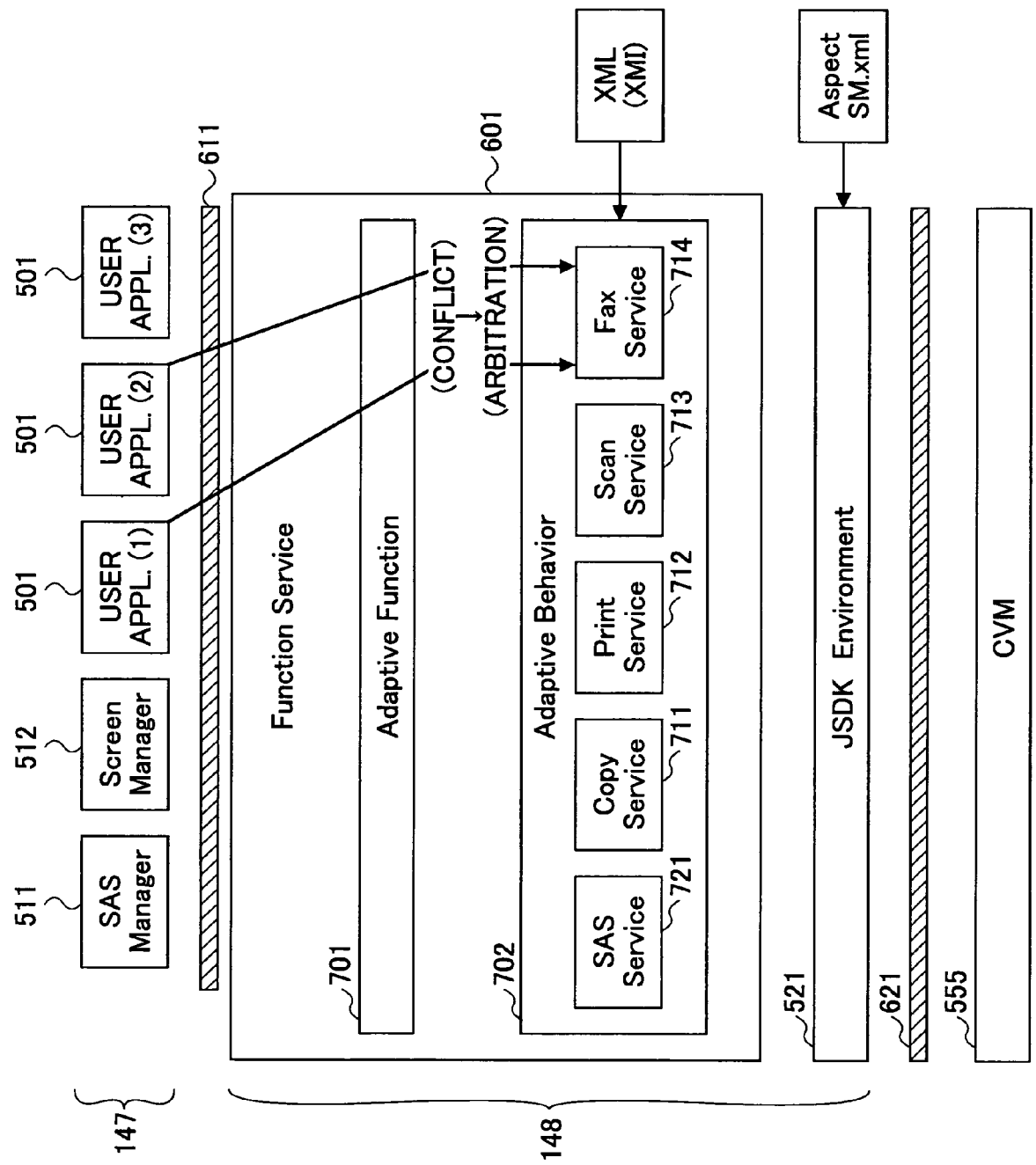
FIG. 9 is a class diagram for explaining Function Service.

FIG. 9 is a class diagram for explaining Function Service 601 which constitutes the JSDK system of FIG. 7.

Function Service 601 is a class which performs service provision to user application 501 in response to a service request sent from user application 501. As an example of the service content, the service related to the execution control of copy processing, the service related to the execution control of printing processing, the service related to the execution control of scanning processing, and the service related to the execution control of facsimile processing may be mentioned.

Function API 611 is provided in the JSDK system of FIG. 7 as the API which performs the intermediary task for the service transfer between Function Service 601 and user application 501.

Function Service 601 is provided with the function to arbitrate the service request from a specific user application 501. This is because the service requests from multiple user applications 501 may conflict.

As shown in FIG. 9, when the service request from user application (1) 501 and the service request from user application (2) 501 conflict, Function Service 601 performs arbitration between the conflicting service requests by giving priority to one service request and deferring the other service request.

The classes of Adaptive Function 701 and Adaptive Behavior 702 are provided in Function Service 601. Furthermore, the classes of Copy Service 711, Print Service 712, Scan Service 713, Fax Service 714, and SAS Service 721 are provided in the Adaptive Behavior 702.

Adaptive Function 701 is a class which receives the service requests from user applications 501. Adaptive Function 701 is provided with a number of functions of processing the service requests from user applications 501, which functions can be changed dynamically.

Adaptive Behavior 702 is a class which deals with the service provision to user application 501. Adaptive Behavior 702 is provided with the function of changing the self behavior dynamically. An example of the method of handling the program behavior is disclosed in Japanese Patent Application No. 2004-062413.

Copy Service 711 is a class which deals with the service provision related to the execution control of copy processing. Print Service 712 is a class which deals with the service provision related to the execution control of printing processing. Scan Service 713 is a class which deals with the service provision related to the execution control of scanning and processing. Fax Service 714 is a class which deals with the service provision related to the execution control of facsimile processing.

SAS Service 721 is a class which controls the mode of operation of user application 501. SAS Service 721 changes the mode of operation of a predetermined user application 501 according to a dynamic change of the behavior by Adaptive Behavior 702. SAS Service 721 can control the mode of operation of user application 501 by controlling SAS Manager 511.

JSDK application 147 and JSDK platform 148 are implemented in the reflection type architecture. The term "reflection" means the capabilities of a program to release the information related to the self static structure and dynamic behavior, and to change the self static structure and dynamic behavior. The reflection type architecture includes a base level and a meta-level.

In the JSDK system of FIG. 7, JSDK application 147 is equivalent to the base level, and JSDK platform 148 is equivalent to the meta-level.

Figure 10:
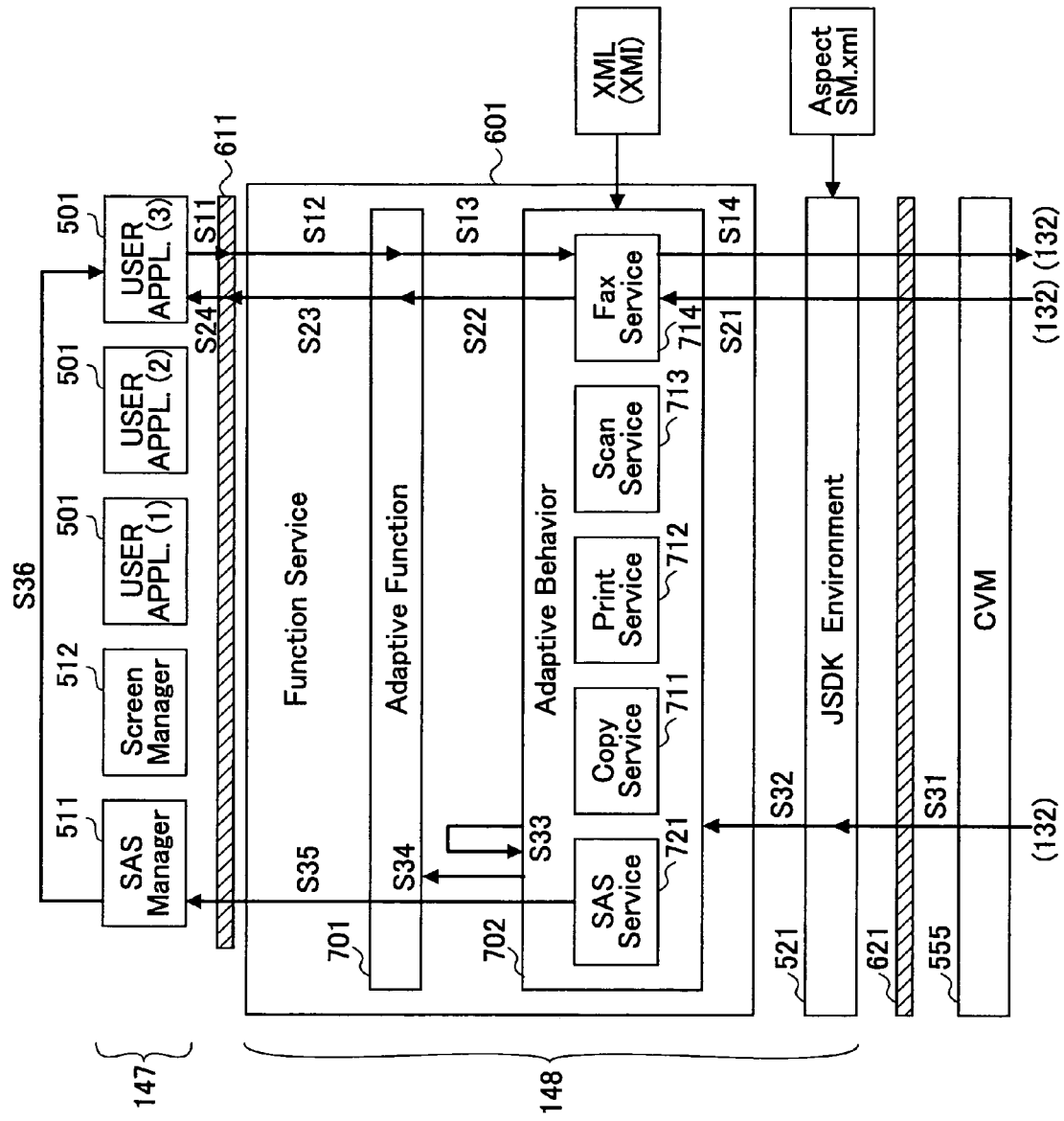
FIG. 10 is a diagram for explaining the operation of Function Service.

FIG. 10 is a diagram for explaining the operation of Function Service 601. This FIG. 10 is a collaboration diagram corresponding to the class diagram of FIG. 9.

When user application 501 sends a service request to Function Service 601, the service request indicating provision of the service of Function Service 601 is requested by user application 501 is transmitted to Function API 611 from user application 501 (S11).

Next, the service request is transmitted to Adaptive Function 701 from Function API 611 (S12).

Next, the service request is transmitted to Adaptive Behavior 702 in the form of a state transition event from Adaptive Function 701 (S13).

Next, a processing request including various processings related to the service, such as information processing, communication processing, and image formation processing, is transmitted to platform 132 from Adaptive Behavior 702 in the form of a state transition action (S14).

Next, the processing result related to the processing request is transmitted to Adaptive Behavior 702 from platform 132 in the form of the state transition event (S21).

Next, the service result related to the service request is transmitted to Adaptive Function 701 from Adaptive Behavior 702 in the action form of the state transition action (S22).

Next, the service result related to the service request is transmitted to Function API 611 from Adaptive Function 701 (S23).

Next, the service result related to the service request is transmitted to user application 501 from Function API 611 (S24).

If a problem or defective matter exists in performing the above-mentioned processings of information processing, communication processing, and image formation processing by platform 32, a notice indicating that a problem or defective matter exists is transmitted to JSDK Environment 521 from platform 132 (S31).

Next, the instruction to change the self behavior dynamically is transmitted to Adaptive Behavior 702 from JSDK Environment 521 (S32).

Next, Adaptive Behavior 702 changes the self behavior dynamically (S33), and further changes the operation of the various functions of Adaptive Function 701 dynamically (S34).

Next, SAS Service 721 changes the mode of operation of the predetermined user application 501 through SAS Manager 511 (S35, S36).

Figure 11:
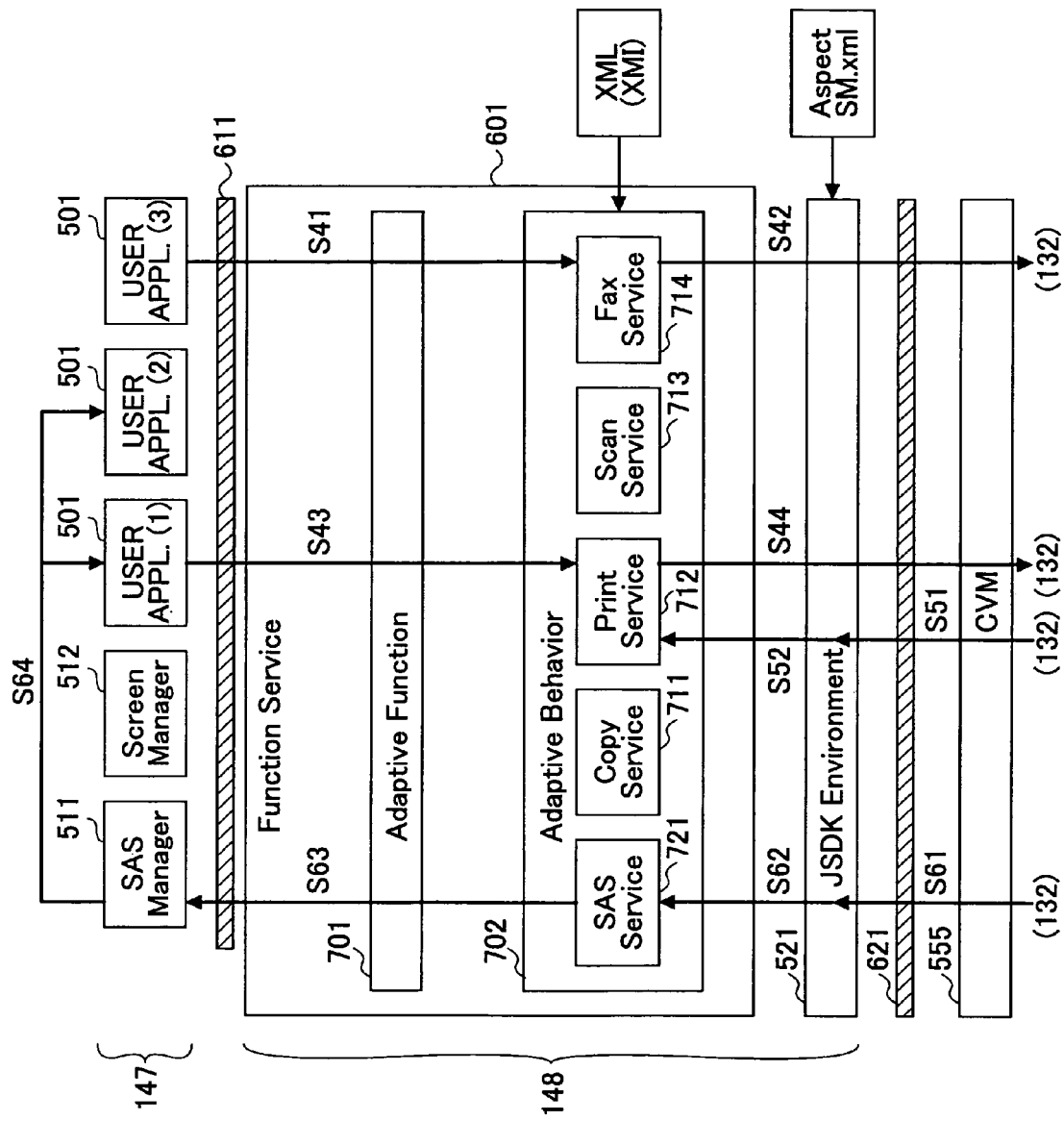
FIG. 11 is a diagram for explaining the operation of Function Service.

FIG. 11 is a diagram for explaining the operation of Function Service 601. This FIG. 11 is a collaboration diagram equivalent to an example of the collaboration diagram of FIG. 10.

First, the service request related to the execution control of facsimile transmission processing is transmitted to Fax Service 714 from the third user application (3) 501 (S41).

Next, the processing request concerning facsimile transmission processing is transmitted to platform 132 from Fax Service 714 (S42).

Next, the service request concerning the execution control of printing processing is transmitted to Print Service 712 from the first user application (1) 501 (S43).

Next, the processing request concerning printing processing is transmitted to platform 132 from Print Service 712 (S44).

Next, a notice indicating that the available capacity of the memory is insufficient for performing the facsimile transmission processing and the printing processing simultaneously is sent to JSDK Environment 521 from platform 132 (S51).

Next, JSDK Environment 521 changes the behavior of Print Service 712 dynamically so that a processing request of the printing processing may not be sent during execution of the facsimile transmission processing (S52).

Next, a notice is sent from platform 132 to JSDK Environment 521, the notice indicating that, even if the printing processing is suspended, the available capacity of the memory is still insufficient for performing the facsimile transmission processing (S61).

Next, JSDK Environment 521 changes the behavior of SAS Service 721 dynamically, so that all the other user applications 501 except the user application 501 of the requesting source of the facsimile transmission processing are stopped during execution of the facsimile transmission processing (S62).

Next, SAS Service 721 stops all the other user applications 501 except the user application 501 of the requesting source of the facsimile transmission processing during execution of the facsimile transmission processing (S63, S64).

Figure 12A:
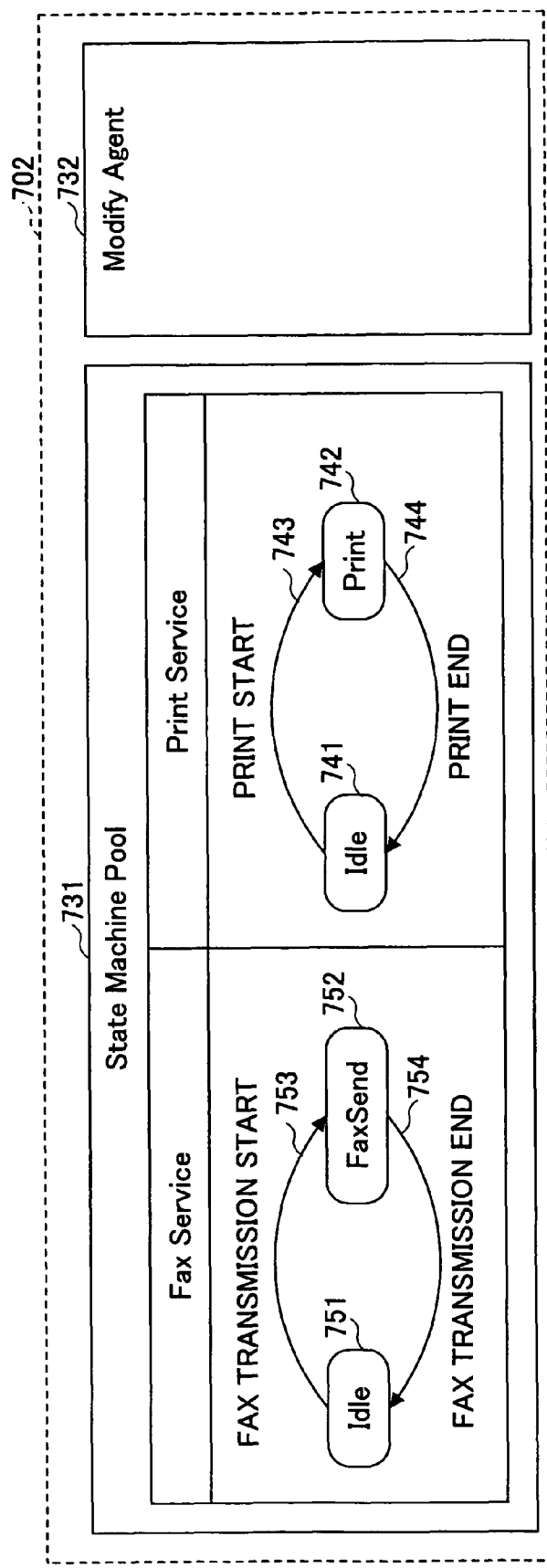
FIG. 12A and FIG. 12B are diagrams for explaining notionally the behavior change processing of Function Service.
Figure 12B:
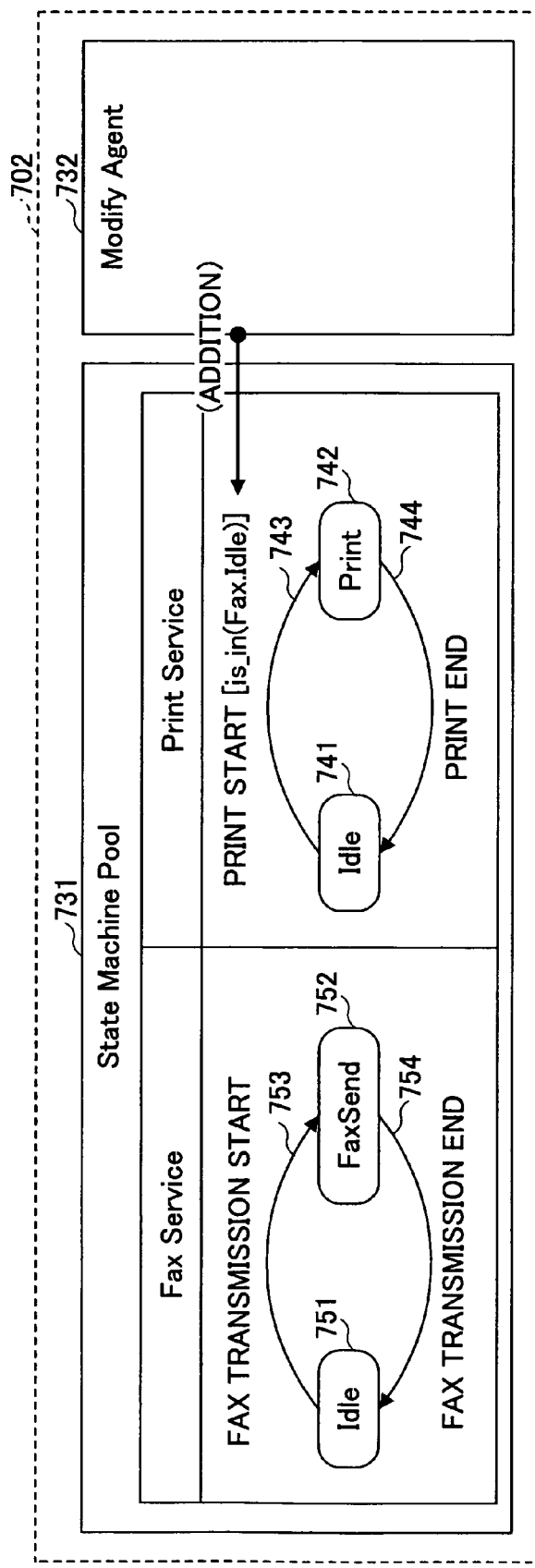

FIG. 12A and FIG. 12B are diagrams for explaining notionally the behavior change processing of Function Service 601.

In Adaptive Behavior 702 of Function Service 601, the classes of State Machine Pool 731 and Modify Agent 732 are provided.

The State Machine Pool 731 deals with management of the state-transition model of Print Service 712 or Fax Service 714. The Modify Agent 732 deals with modification of the state-transition model of Print Service 712 or Fax Service 714.

The management and modification of a state-transition model may be carried out also for Copy Service 711 and Scan Service 713.

The state-transition model of Print Service 712 will be explained. Idle state 741 is a waiting state in which the printing processing is suspended. Print state 742 is a state in which the printing processing is running. A change from Idle state 741 to Print state 742 is caused by Print Start event 743. A change from Print state 742 to Idle state 741 is caused by Print End event 744.

The state-transition model of Fax Service 714 will be explained. Idle state 751 is a waiting state in which the facsimile transmission processing is suspended. FaxSend state 752 is a state in which the facsimile transmission processing is running. A change from Idle state 751 to FaxSend state 752 is caused by Fax Transmission Start event 753. A change from FaxSend state 752 to Idle state 751 is caused by Fax Transmission End event 754.

Modify Agent 732 adds the execution condition of a state transition to the state-transition model which is managed by State Machine Pool 731, to modify the state-transition model which is managed by State Machine Pool 731. Thereby, the behavior of Print Service 712 or Fax Service 714 can be dynamically changed.

FIG. 12A shows the state-transition model before behavior change, and FIG. 12B shows the state-transition model after behavior change.

As shown in FIG. 12A, a limited condition does not exist for changing Print Service 712 from Idle state 741 to Print state 742. However, as shown in FIG. 12B, a limited condition exists for changing Print Service 712 from Idle state 741 to Print state 742. This limited condition (guard condition) means that only when Fax Service 714 is in Idle state 751, the state transition of Print Service 712 is permitted. This behavior change processing by addition of the limited condition (guard condition) is equivalent to the steps S51 and S52 of the behavior change processing of FIG. 11.

Function Service 601 is equivalent to the aspect-oriented program. The aspect orientation means the separation mechanism of events of concern across the system. In the aspect-oriented programming, the execution condition of a state transition can be added to the state-transition model of the aspect-oriented program by incorporating an aspect into the aspect-oriented program.

In this manner, Modify Agent 732 adds the execution condition of a state transition to the state-transition model which is managed by State Machine Pool 731.

When designing Function Service 601, the behavior and the components are separated from each other, and the state-transition model and the component library are registered into State Machine Pool 731 from Modify Agent 732. In this manner, the incorporation of the aspect according to the aspect-oriented programming is realized.

The XML document (FIG. 9, FIG. 10, FIG. 11) described in the XMI language will be explained.

As shown in FIG. 10, the processing of S32 and the processing of S33 are performed by JSDK Environment 521 and Function Service 601, respectively, according to the contents of description of the AspectSM.xml file (called "AspectSM") which is an XML document described in the XMI language.

Referring to FIG. 11, the AspectSM is described so that, when the available capacity of the memory is insufficient, the behavior of Function Service 601 has to be changed dynamically. XML is the abbreviation of extensible Markup Language. XMI is the abbreviation of XML Metadata Interchange.

As described above, Function Service 601 is adapted to change the self behavior dynamically. Thereby, JSDK platform 148 is adapted to conform to various change of JSDK application 147 appropriately.

Moreover, Function Service 601 is adapted to change the mode of operation of user application 501 according to a dynamic change of the self behavior. Thereby, JSDK platform 148 is adapted to conform to various changes of JSDK application 147 appropriately based on the control of JSDK application 147 along with the control of JSDK platform 148.

The contents notionally explained with FIG. 12A and FIG. 12B will be explained more concretely.

Figure 13:
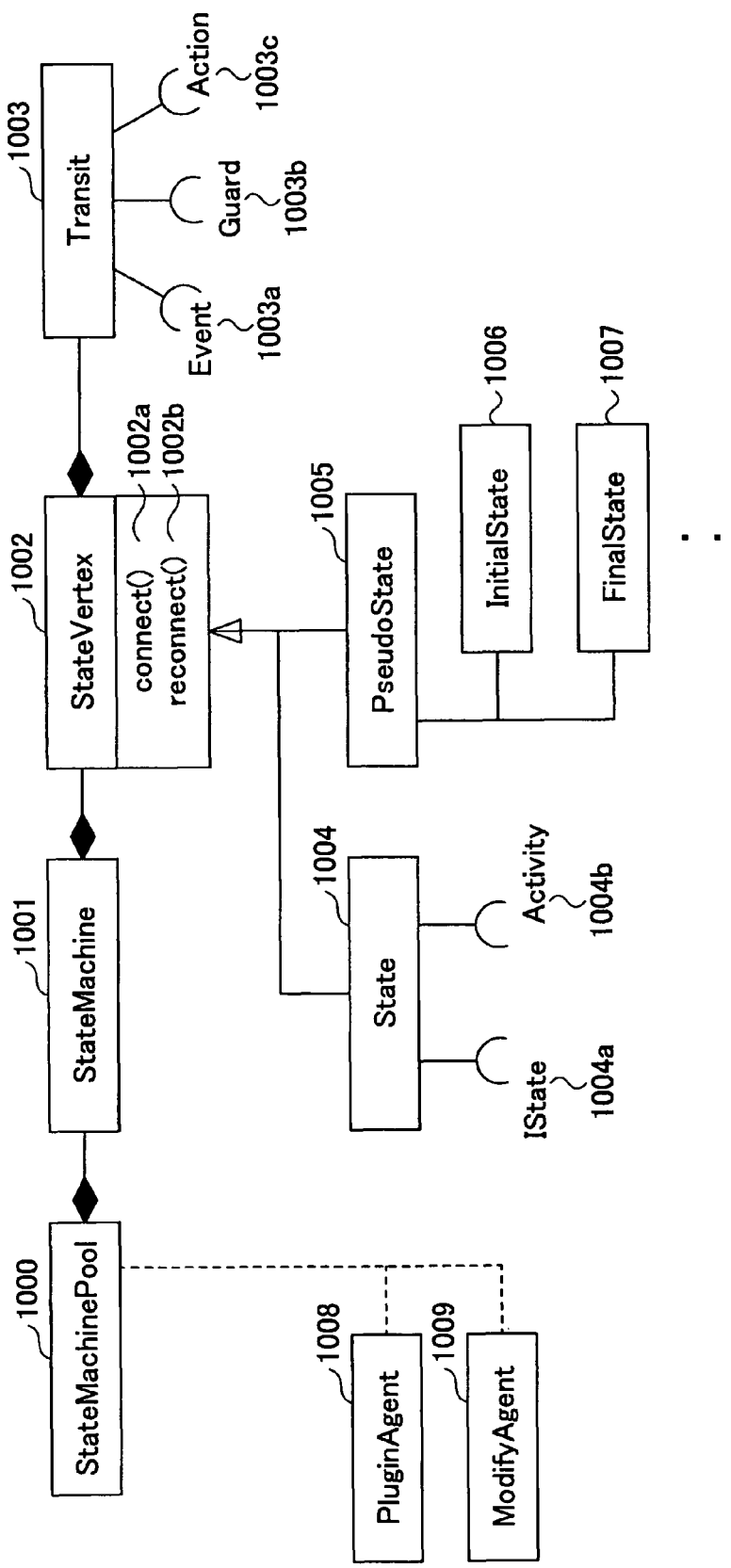
FIG. 13 is a class diagram for explaining the class group which realizes dynamic change of the behavior of Function Service.

The composition of the modules shown in FIG. 12A and FIG. 12B is based on the class diagram shown in FIG. 13. FIG. 13 is a class diagram for explaining the class group which realizes dynamic change of the behavior of Function Service.

As shown in FIG. 13, StateMachinePool class 1000 is a class expressing the State Machine Pool 731. Namely, State Machine Pool 731 is an instance of StateMachinePool class 1000. StateMachine class 1001 is a class expressing each service (Copy Service 711, Print Service 712, Scan Service 713, and Fax Service 714) in Adaptive Behavior 702. Namely, each of Copy Service 711, Print Service 712, Scan Service 713, and Fax Service 714 is created as an instance (StateMachine object) of StateMachine class 1001, respectively. Therefore, it is called a state machine when naming these services collectively.

StateVertex class 1002 is an abstract class and equivalent to the root class of the class which expresses a state in the state-transition model of each state machine. In this StateVertex class 1002, the methods of connect method 1002a and reconnect method 1002b are defined.

The connect method 1002a is a method of performing connection of the resulting state after transition and the state transition. Transit class 1003 is a class expressing the state transition.

More specifically, the connect method 1002a is a method of performing connection of the object in which the method concerned is called, the StateVertex object of the resulting state of the object concerned after transition (more strictly, the object of the subclass thereof, which is called "state object" when naming it generically), and the Transit object (called "transition object") corresponding to the state transition. In this respect, the connection is realized by holding the resulting state object and the identification information (ID, reference, or a pointer) of the transition object in the state object, for example.

The reconnect method 1002b is a method of performing change to the resulting state. In the Transit class 1003, Event interface 1003a, Guard interface 1003b, and Action interface 1003c are defined as interfaces.

The Event interface 1003a is an interface for implementing the transition event of a state transition. The Guard interface 1003b is an interface for implementing the guard condition. The Action interface 1003c is an interface for implementing the action performed at the time of a state transition.

As the subclasses of StateVertex class 1002, State class 1004 and PseudoState class 1005 are defined. The State class 1004 is a class expressing the state of a state machine, for example. In the State class 1004, IState interface 1004a and Activity interface 1004b are defined as interfaces. The IState interface 1004a is an interface for implementing processing at the time of entry of a state (entry processing), and processing at the time of leaving of the state (leaving processing). The Activity interface 1004b is an interface for implementing processing which is performed during a state. These interfaces are implemented as classes. For example, the processing of Activity interface 1004b is implemented in the Activity class.

The PseudoState class 1005 is a class expressing a false state, such as an initial state or an end state. And the subclasses of the Pseudo class 1005 include FinalState class 1007 expressing the end state, and InitialState class 1006 expressing the initial state.

In the state-transition model of FIG. 12A and FIG. 12B, the initial state and the end state are omitted for the sake of convenience.

The ModifyAgent class 1009 is a class expressing Modify Agent 732. Namely, Modify Agent 732 is an instance of the ModifyAgent class 1009. The PluginAgent class 1008 will be described mentioned later.

The relationship between the above-mentioned classes will be explained. StateMachinePool class 1000 collects StateMachine class 1001. This expresses that State Machine Pool 731 manages the respective state-transition models of one or more state machines.

StateMachine class 1001 collects StateVertex class 1002. This expresses that one state machine has one or more states.

StateVertex class 1002 collects Transit class 1003. This expresses that the states are interconnected by the transition.

For example, Print Service 712 is constituted by the following objects based on the above-described state-transition model.

Figure 14:
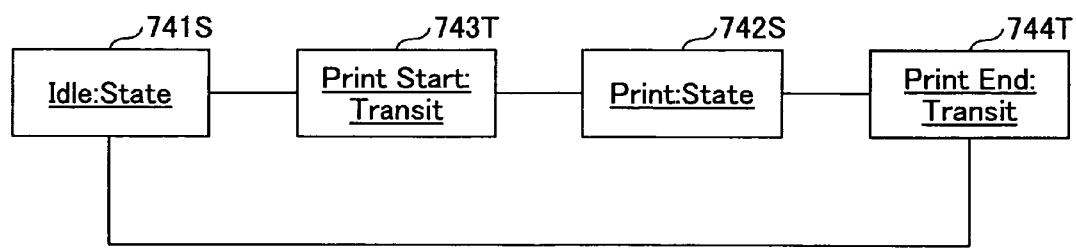
FIG. 14 is a diagram showing the object composition of Print Service.

FIG. 14 is a diagram showing the object composition of Print Service 712.

As shown in FIG. 14, Print Service 712 comprises Idle state object 741S, Print state object 742S, Print Start object 743T, and Print End object 744T based on the state-transition model of FIG. 12A and FIG. 12B.

The Idle state object 741S and the Print state object 742S are the instances of the State class 1004. The Print Start object 743T and the Print End object 744T are the instances of the Transit class 1003.

Each line segment which connects the two objects in FIG. 14 denotes the reference relation of the objects. The state object before state transition makes reference to the state object after state transition. In FIG. 14, the transition object is provided to interconnect the two state objects. For example, the Print Start object 743T is provided to interconnect the Idle state object 741S and the Print State object 742S. However, this does not mean that the Idle state 703 does not make reference to the Print state object 742S. The Idle state object 741S makes reference to the Print state object 742S, and also makes reference to the Print Start object 743T as a transition object corresponding to the state transition.

The state of an object is classified into an inactive state in which the transfer of service is not performed, and an active state in which the transfer of service is performed.

In order to change the behavior of the state machine in Function Service 601 during operation of the state machine, it is sufficient that the behavior of the state machine be changed when the object corresponding to the updated portion of the state machine is not in the active state (or when it is in the inactive state). This is because the transfer of service of the operating objects in the state machine is not suppressed by the update processing. Therefore, the update processing of Function Service 601 is performed when the object corresponding to the updated portion of Function Service 601 is not in the active state.

In the modeling using the state transition diagram, it is limited that when one object is in the active state, another object is in the inactive state. That is, the respective objects perform the processing exclusively each other.

Next, the construction processing of the object composition of Print Service 712 shown in FIG. 14 will be explained.

Figure 15:
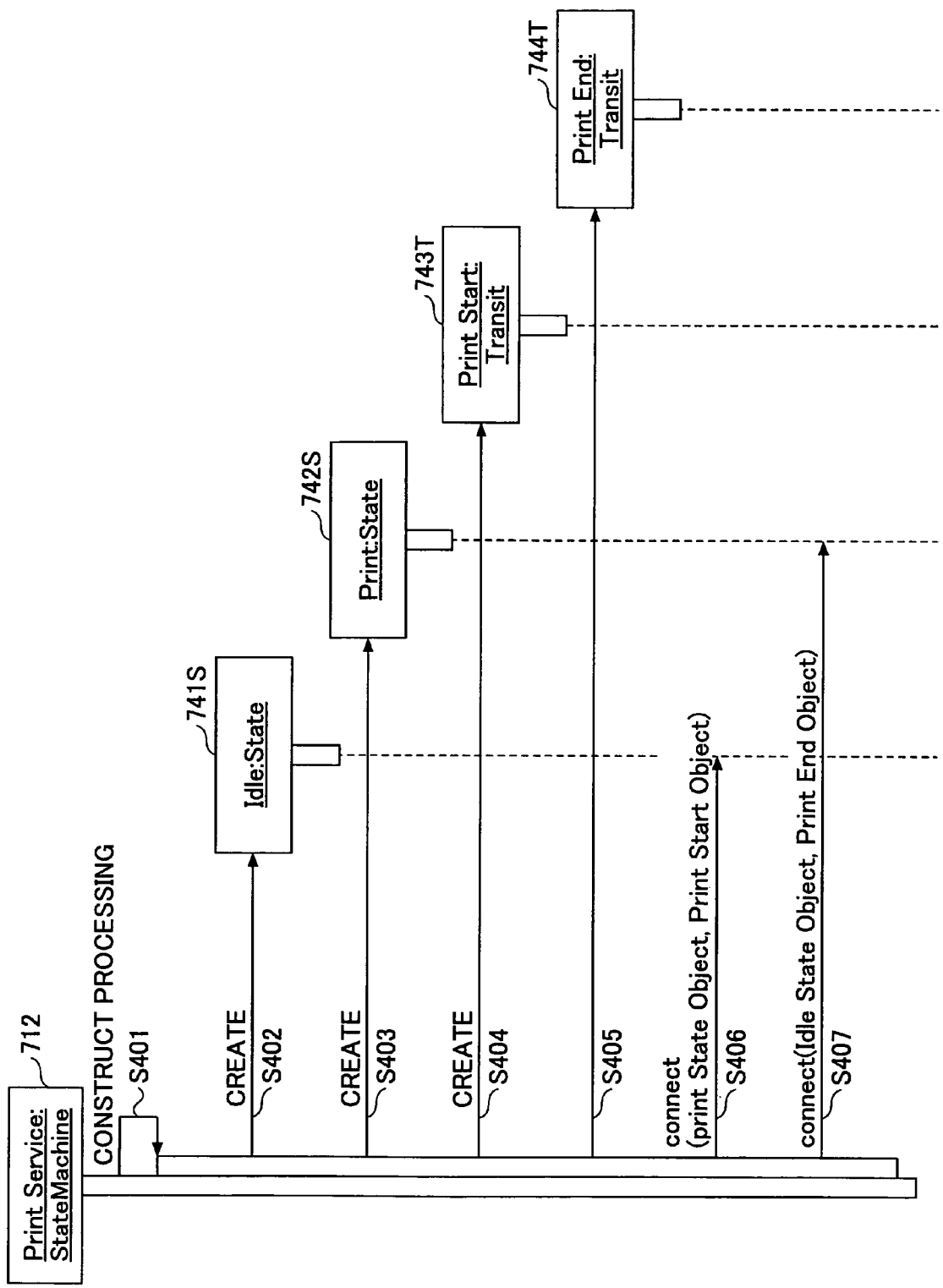
FIG. 15 is a sequence diagram for explaining construction processing of the object composition of Print Service.

FIG. 15 is a sequence diagram for explaining the construction processing of the object composition of Print Service.

The construction processing of FIG. 15 is performed when Print Service 712 is instantiated by State Machine Pool 731.

When Print Service 712 is instantiated, the object composition corresponding to the state-transition model of Print Service 712 is constructed based on the state-transition information of Print Service 712 (S401).

For example, the state-transition information is stored in the following form in a predetermined storage device of the multi-function peripheral 101 of FIG. 1.

FIGS. 16 and 17 are diagrams showing an example of definition of the state-transition information of Print Service 712. Only one example of the description of the state-transition information 900 is shown in FIGS. 16 and 17.

The description of the state-transition information 900 shown in FIGS. 16 and 17 is in conformity with the XMI (XML Metadata Interchange). The XMI is the standard specification aiming at exchanging models with XML documents among various kinds of software. However, in carrying out this embodiment, the state-transition information does not necessarily need to be described in conformity with the XMI.

The line number is attached to the diagrams in FIGS. 16 and 17, for the sake of convenience of description.

As shown in FIG. 16, the state-transition information 900 is defined as corresponding to the Print Service 712 by the tag name of the <StateMachine> tag and the value ("Print") of its name attribute at the 1st line of the state-transition information 900. The value ("003") of the xmi.id attribute in the <StateMachine> tag is the ID that identifies the Print Service 712.

The <CompositeState> tag at the 3rd line is equivalent to the declaration of a start of a definition of a state of the Print Service 712. This declaration is identified by the value ("004") of xmi.id of the <CompositeState> tag.

The CompositeState element 910 from the 5th line to the 15th line is the definition with respect to the Idle state 741. "Idle" is set to the value of the name attribute of the CompositeState element 910, and "005" is set to the value of the xmi.id element.

The CompositeState element 920 from the 16th line to the 26th line (FIG. 17) is the definition with respect to the Print state 742. "Print" is set to the value of the name attribute of the CompositeState element 920, and "008" is set to the value of the xmi.id element.

As shown in FIG. 17, each of respective state transitions in the Print Service 712 is defined from the 34th line to the 64th line. That is, the Transition element 930 from the 34th line to the 50th line is the definition with respect to the state transition from the Idle state 741 to the Print state 742. This is specified from Transition.source element 931 and Transition.target element 932 which are defined as the child elements of the Transition element 930.

The Transition.source element 931 is an element in which the state of the transition-source element is set up. The value of the xmi.idref attribute as the child element of the Transition.source element 931 is "005". Therefore, it can be found out that the state of the transition-source element is the Idle state 741 where the value of the xmi.id attribute is "005".

The Transition.target element 932 is an element in which the state of the transition-target element is set up. The value of the xmi.idref attribute as the child element of the Transition.target element 932 is "008". Therefore, it can be found out that the state of the transition-target element is the Print state 742 where the value of the xmi.id attribute is "008". The value of the name attribute of the Transition element 930 is "Print Start", and the value of the xmi.id attribute is "006."

The Transition element 940 from the 51st line to the 64th line is the definition with respect to a state transition from the Print state 742 to the Idle state 741. This is specified by the value of the xmi.idref attribute in the Transition.source element 941 which is "008" (the Print state 742), and by the value of the xmi.idref attribute in the Transition.target element 942 which is "005" (the Idle state 741). The value of the name attribute of the Transition element 940 is "Print End", and the value of the xmi.id attribute is "007".

A description will be given of the state-transition information 900 following the 5th line. The CompositeState element 910 and the CompositeState element 920 corresponding to the respective states have at least one of the StateVertex.outgoing element and the StateVertex.incoming element as a child element. The StateVertex.outgoing element is an element in which the connection to the state transition from the transition source element is defined. The StateVertex.incoming element is an element in which the connection to the state transition to the transition target element is defined.

For example, in the StateVertex.outgoing element 911 for the CompositeState element 910 corresponding to the Idle state 741, the value of the xmi.idref attribute of the child element is "006". In the StateVertex.incoming element 912, the value of the xmi.idref attribute of the child element is "007". Therefore, it is found out that the state transition from the Print state 742 to the transition target element is equivalent to the state transition to which the Transition element 930 corresponds, and the state transition of the transition source element is equivalent to the state transition to which the Transition element 940 corresponds.

In the StateVertex.outgoing element 921 for the CompositeState element 920 corresponding to the Print state 742, the value of the xmi.idref attribute of the child element is "007". In the StateVertex.incoming element 922, the value of the xmi.idref attribute of the child element is "006". Therefore, it is found out that the state transition from the Print state 742 to the transition target element is equivalent to the state transition to which the Transition element 940 corresponds, and the state transition of the transition source element is equivalent to the state transition to which the Transition element 930 corresponds.

Based on the above-mentioned state-transition information 900, the Print Service 712 instantiates the respective state objects and transition objects. In the construction processing of FIG. 15, the Idle state object 741S, the Print state object 742S, the Print Start object 743T, and the Print End object 744T are created based on each of the CompositeState element 910, the CompositeState element 920, the Transition element 930, and the Transition element 940 in the state-transition information 900 (S402-S405).

Next, the Print Service 712 connects the state object of the transition target element to the state object of the transition source element so that the reference relation of each state object becomes the order of the state transition defined in the state-transition information 900. For example, the Print Service 712 calls the connect( ) method of the Idle state object 741S by making the identification information of the Print state object 742S and the identification information of the Print Start object 743T into the arguments (S406).

In addition, the Print Service 712 calls the connect( ) method of the Print state object 742S by making the identification information of the Idle object 741S and the identification information of the Print End object 744T into the arguments (S407). Each state object from which the connect( ) method is called holds the identification information specified by the arguments in the corresponding state object.

When each identification information of the state object and the transition object is specified as the arguments of the connect( ) method, the state object from which the connect( ) method is called has the association between the identification information of the state object and the identification information of the transition object and holds it (in pair). Thereby, when a certain state object is active, the state object of the transition target element upon occurrence of a certain event may be specified.

By performing the above-described processing, the object composition of the Print Service 712 as shown in FIG. 14 is created.

A description will be given of the behavior change processing of the Print Service 712.

Figure 18:
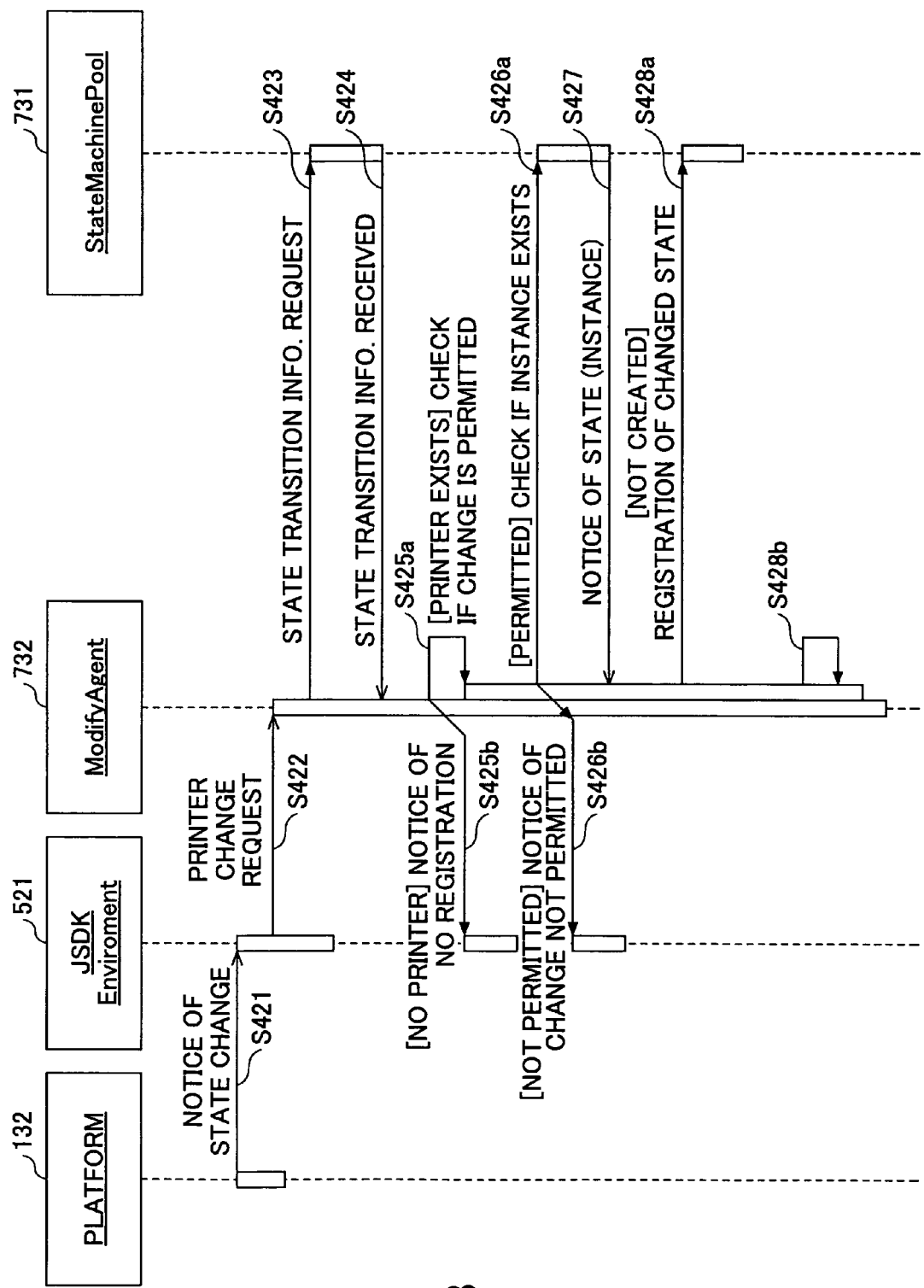
FIG. 18 is a sequence diagram for explaining behavior change processing of Print Service.
Figure 19:
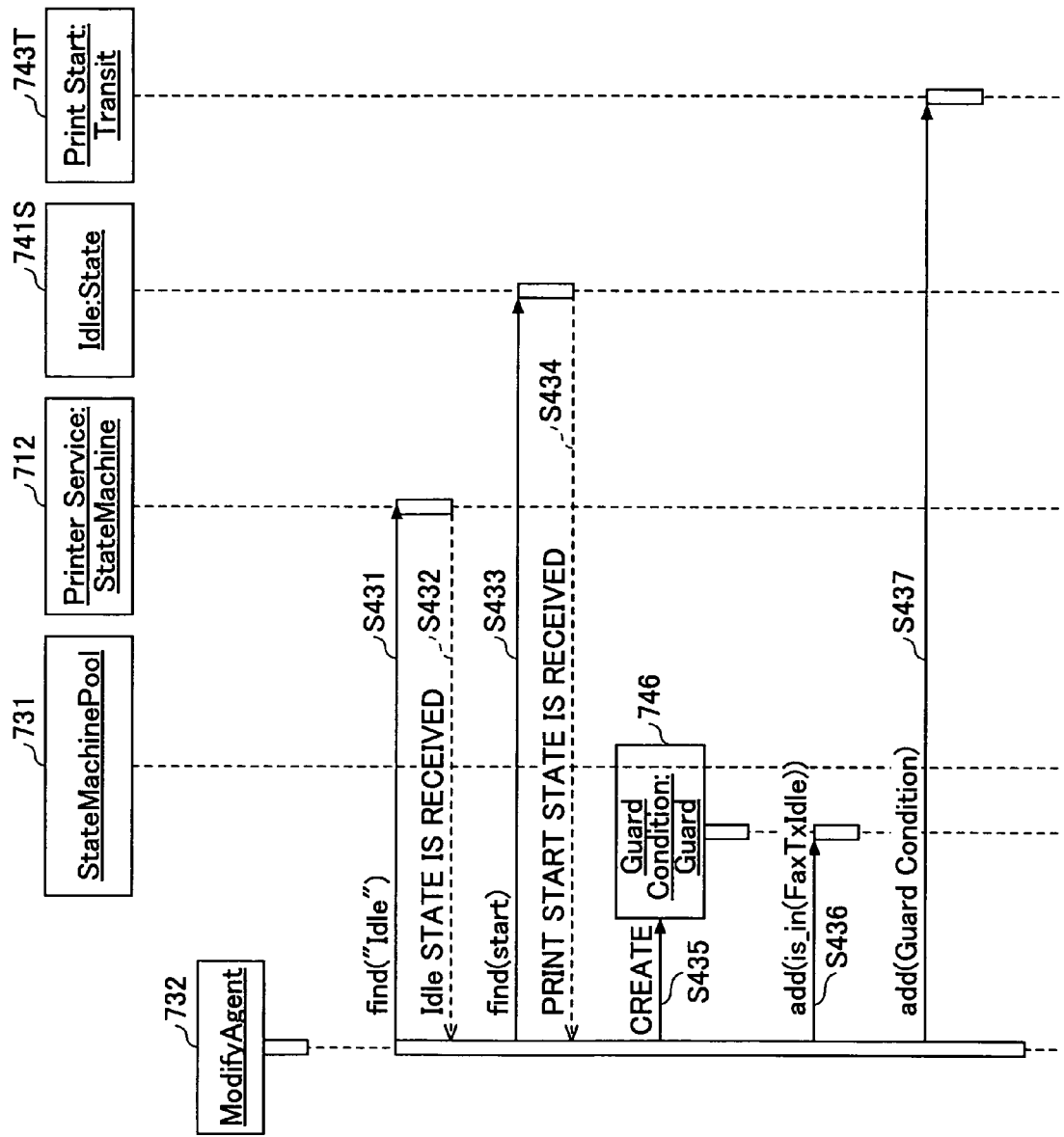
FIG. 19 is a sequence diagram for explaining the behavior change processing of Print Service.

FIGS. 18 and 19 are sequence diagrams for explaining the behavior change processing of the Print Service.

For example, an event which indicates occurrence of a problem or defect is transmitted from the platform 132 to the JSDK Environment 521 (S421).

In this embodiment, suppose that the event which indicates that the available capacity of the memory is insufficient is notified. However, the possible events notified in this step are not limited to a problem or defect. For example, a change of the state of a device may also be included in this event. This change of the state of a device may include a change of static information (the model name, the model specification, the peripheral-device information) and a change of dynamic information (the available memory, the state of a peripheral device, the user's operation).

A change of the static information is notified to the JSDK Environment 521 when it is confirmed. A change of the dynamic information is notified at any time when the change occurs.

The JSDK Environment 521 determines whether the behavior change specification according to the event received from the platform 132 is described in the AspectSM.

FIG. 20 is a diagram showing an example of description of the AspectSM in which the contents of change of the behavior of the Print Service are described.

The contents of change to the state-transition information 900 (FIGS. 16 and 17) of the Print Service 712 are described in the AspectSM 810. In each of the name attribute, the type attribute, and the value attribute of the Event element 811, surrounded by the <Event> tag from the 2nd line to the 6th line of the AspectSM 810, the event name, the conditions, and the threshold which are used as the trigger which changes the behavior are described respectively.

The state machine used as the target for the change of the behavior is described in the child element (or the modify.StateMachine element) of the Event element 811. In the example of FIG. 20, it is described that, when the event which indicates that the available capacity of the memory is less than 10MB is received, the behavior to the Print Service 712 is changed.

The name (Print) of the state machine being changed is described in the XMI.StateMachine attribute of the aspect element 812 from the 7th line to the 15th line. In addition, the name of the state transition which becomes the transition target element in the Print Service 712 is described in the name attribute of the pointcut.Transmission element 813, and the timing at which the change processing is performed by the AspectSM 810 is described in the timing attribute. In the example of FIG. 20, performing the behavior change processing when the state transition of Print Service 712 is in the Idle state 741 is described.

The contents of the change are described in the advice.Guard element. Namely, it is described in the tag name of the <advice.Guard> tag that the target of the change is the Guard (guard condition).

It is described in the type attribute that the classification of the change is "insert" (insertion). That is, it is described that the contents of the change are the insertion of the guard condition.

The definition from the 10th line to the 12th line is the contents which are actually inserted in the state-transition information 900. That is, it is defined in the AspectSM 810 that the guard condition (the Fax Service 714 must be in the Idle state) with respect to the state transition is added based on the Print Start event 743 of the Print Service 712 when it is in the Idle state 741.

The AspectSM according to each event is stored beforehand in the HDD 233 of the multi-function peripheral 101 or the memory card 235.

Accordingly, when the event notified in the step S421 indicates that the available capacity of the memory is less than 10MB, the JSDK Environment 521 determines, based on the AspectSM 810 of FIG. 20, that it is necessary to change the behavior of the Print Service 712, and transmits a behavior change request to the Modify Agent 732 by attaching the behavior change information on the Print Service 712 to the behavior change request (S422).

In this respect, the "behavior change information" may be only information which is extracted from the AspectSM 810 and required for the change of the behavior, or it may be the AspectSM 810 itself.

The Modify Agent 732 receives the behavior change request to the Print Service 712, and sends an acquisition request of the state-transition information 900 of the Print Service 712 to the State Machine Pool 731 (S423).

In response to the acquisition request of the state-transition information 900, the State Machine Pool 731 provides the Modify Agent 732 with the state-transition information 900, if the state-transition information is registered (S424).

When the state-transition information 900 can be acquired from the State Machine Pool 731, the Modify Agent 732 determines whether the behavior change processing to the state-transition information 900 of the Print Service 712 is permitted (S425*a*).

On the other hand, when the state-transition information 900 cannot be acquired, the Modify Agent 732 notifies to the JSDK Environment 521 that the Print Service 712 is not registered in the State Machine Pool 731 (S425*b*)

When it is determined in step S425*a* that the behavior change processing is permitted, the Modify Agent 732 sends an inquiry to the State Machine Pool 731, as to whether the Print Service 712 is instantiated (S426*a*). Namely, the inquiry is to check if the object composition of the Print Service 712 shown in FIG. 14 is constructed on the memory.

On the other hand, when it is determined in the step 425*a* that the behavior change processing is not permitted, the Modify Agent 732 reports to the JSDK Environment 521 that the behavior change processing is not permitted (S426*b*).

In response to the inquiry of the step S426*a*, the State Machine Pool 731 returns the instance to the Modify Agent 732, if the Print Service 712 is instantiated (S427).

When the instance of the Print Service 712 is not created, the Modify Agent 732 modifies the state-transition information 900 according to the behavior change information, and registers the modified state-transition information 900 into the State Machine Pool 731 (S428*a*). Specifically, the 10th through 13th lines of the AspectSM 810 are inserted to the portion between the 37th line and the 38th line of the state-transition information 900.

Therefore, when the Print Service 712 is instantiated subsequently, the object group will be created based on the modified state-transition information 900.

On the other hand, when the instance of the Print Service 712 is created, the Modify Agent 732 performs the processing shown in FIG. 19 (S428*b*). In the processing of FIG. 19, the Modify Agent 732 searches the Idle state object 741S of the Print Service 712 (S431, S432). In these steps, the Modify Agent 732 monitors the Idle state object 741S based on the timing attribute of the pointcut.Transmission element 813 of the AspectSM 810, and is set in a waiting condition until the Print Service 712 changes to the Idle state 741.

If the Print Service 712 changes to the Idle state 741, the Modify Agent 732 searches the Print Start object 743T from the Idle state object 741S (S433, S434).

Next, the Modify Agent 732 creates the guard condition object 746 indicating the guard condition (S435), and sets the guard condition ([is_in (FaxTxIdle)]) defined in the AspectSM 810 to the guard condition object 746 (S436).

In this respect, FaxTxIdle is the identification information of the Idle state object of the Fax Service 714.

Next, the Modify Agent 732 sets the guard condition object 746 to the Print Start object 743T (S437). In this embodiment, the Print Start object 743T is an object corresponding to the state transition from the Idle state 741 to the Print state 742. Therefore, the guard condition is added to the state transition by the processing of the step S437. When the state transition from the Idle state 741 to the Print state 742 occurs in the Print Service 712 subsequently, the permission of the transition is determined based on the guard object 746 set to the Print Start object 743T.

As mentioned above, the Function Service 601 in this embodiment realizes the service by the transition of the state object. In the processing to realize the service, the active state object is limited. In other words, the Function Service 601 is constituted so that an inactive state object will exist. In the AspectSM 810, the updating instructions are described so that updating is performed when the updating portion is at the inactive timing, on the assumption of the above-mentioned composition. And according to the AspectSM 810, when the updating portion is at the inactive timing, updating is performed.

Therefore, the Function Service 601 in this embodiment is adapted to change the behavior during operation of the Function Service 601. Since the object group is not necessarily reconstructed when changing the behavior, it is possible to change the behavior dynamically without destroying the reference relation between the accessing side and the accessed side in the Function Service 601. Therefore, the behavior of the Function Service 601 can be changed without rebooting the multi-function peripheral 101.

In the above-mentioned embodiment, the case in which the state machine is designed based on the state-transition model has been explained. However, the program according to the invention is not limited to the composition in which an object is created for every state. It is sufficient that the program according to the invention is constituted by connection of a plurality of modules (including objects also) which operate exclusively to each other. Performing processing exclusively by the plurality of modules, in this case, means that it is guaranteed that when a certain module is operating (active), other modules are not operating (inactive). With such software, it is possible to change the module which is not operating, and the change processing of the behavior in this embodiment can be applied.

(2) Modify Service

Figure 21:
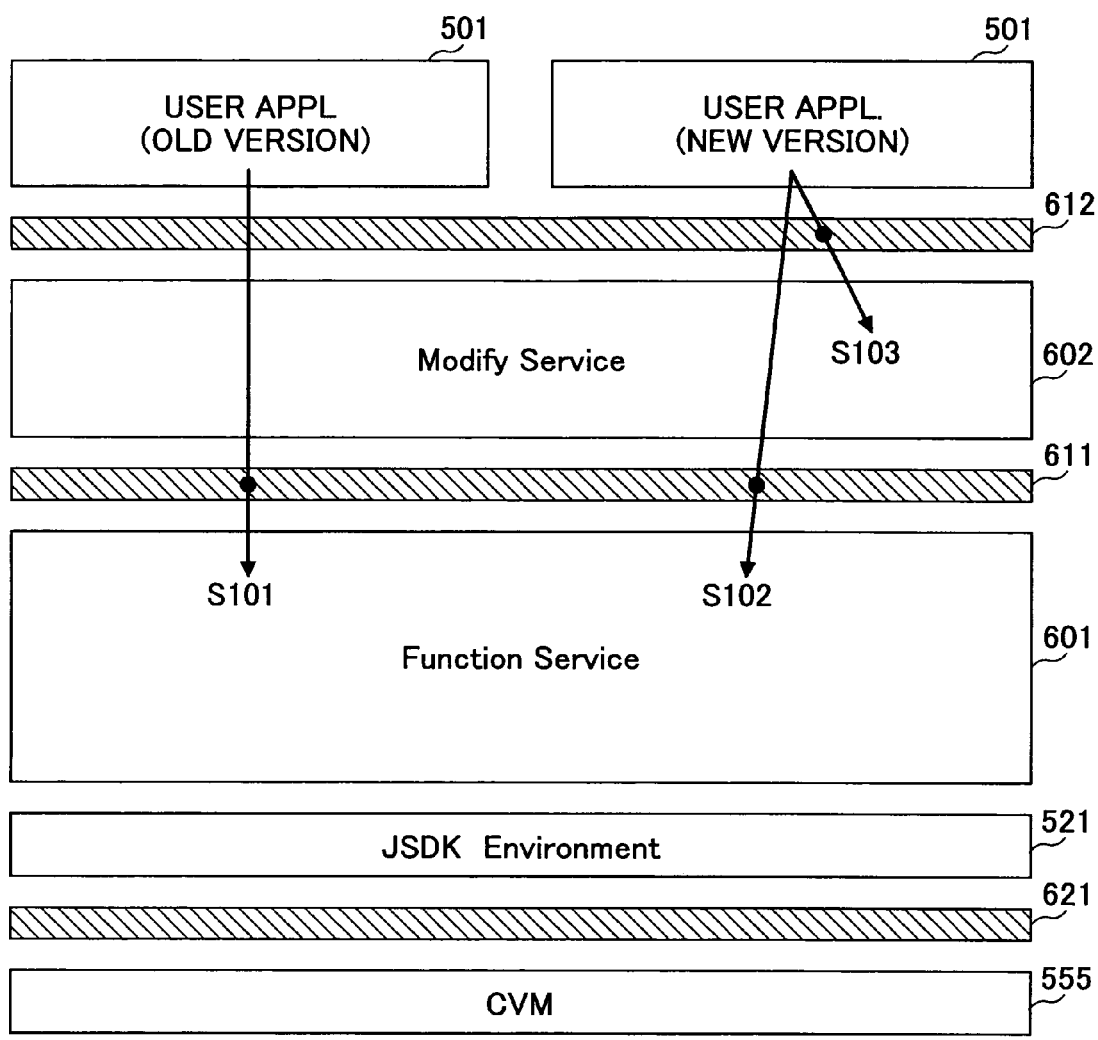
FIG. 21 is a class diagram for explaining Modify Service.

FIG. 21 is a class diagram for explaining the Modify Service 602 which constitutes the JSDK system of FIG. 7.

The Modify Service 602 is a class which modifies the service of the Function Service 601 according to a service providing request from the JSDK application 147 to the Function Service 601. In the preceding section ((1) Function Service), the processing of the Function Service 601 which changes its behavior according to the event from the platform 132 has been described. In the present section, the processing of the Modify Service 602 which changes the behavior of the Function Service 601 when the JSDK application 147 is going to use the Function Service 601 will be described.

In the JSDK system of FIG. 7, the Function Service 601 described in the preceding section (1) and the Modify Service 602 described in the present section (2) are in the relation between the lower-level layer and the high-level layer. In the JSDK system of FIG. 7, as an API which performs the intermediary task for the service transfer between the Function Service 601 and the user application 501, the Function API 611 is provided. And the Modify API 612 is provided as an API which performs the intermediary task for the service transfer between the Modify Service 602 and the user application 501.

Figure 22:
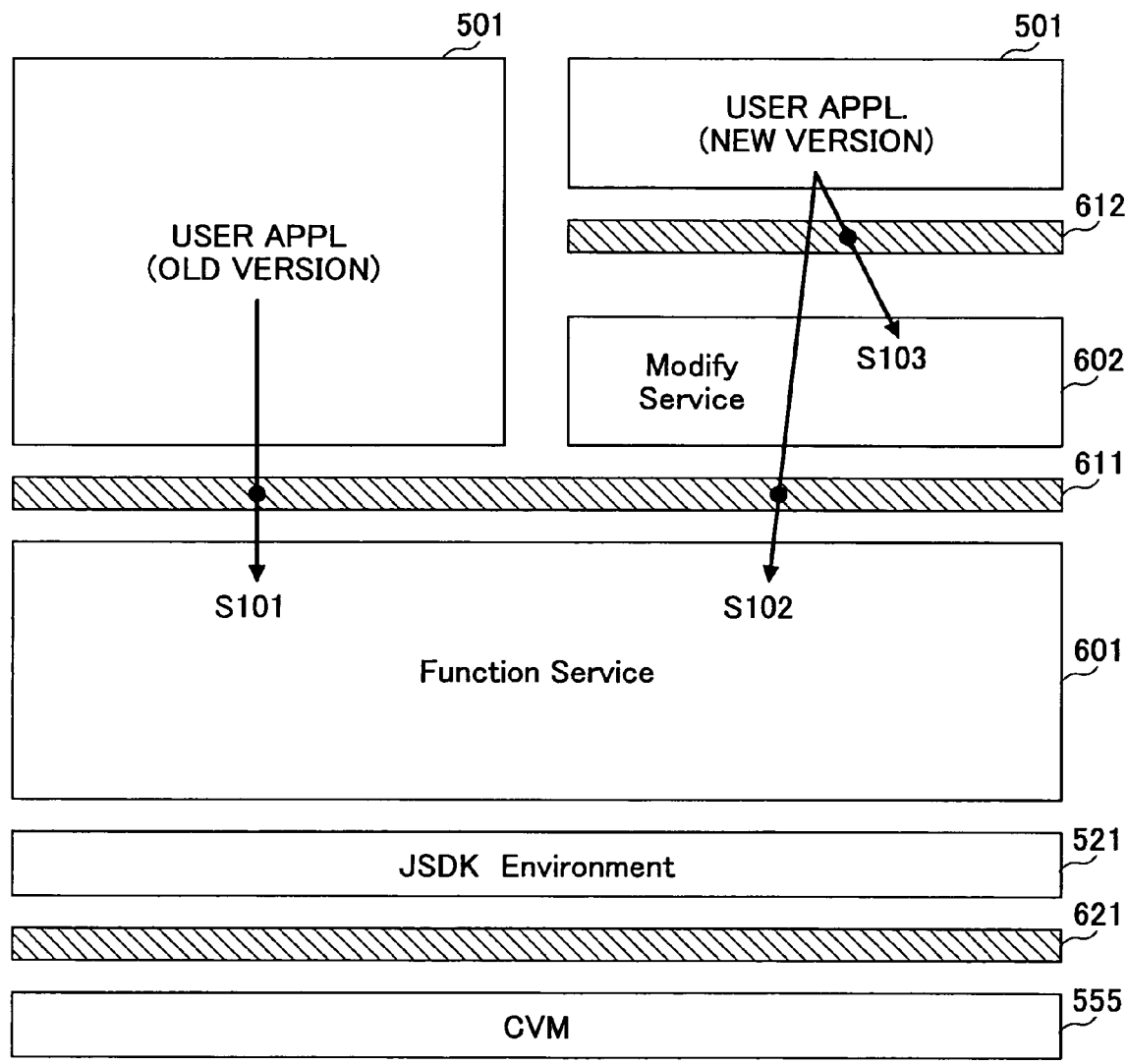
FIG. 22 is a class diagram for explaining Modify Service.

The composition of the Modify Service 602 and the Modify API 612 shown in FIG. 21 may be modified to the composition shown in FIG. 22. FIG. 22 is a class diagram for explaining the Modify Service 602. The contents of the description with respect to FIG. 21 may be similarly applied to those with respect to FIG. 22.

It is supposed in FIG. 21 that the Modify API 612 is effective to a plurality of user applications 501 (the calling module is not limited). On the other hand, it is supposed in FIG. 22 that the Modify API 612 is effective to a specific user application 501 (the calling module is limited).

The reason for the composition of the Modify Service 602 and the Modify API 612 will be explained.

Although the function to change the behavior of the Function Service 601 dynamically is implemented in the JSDK system of FIG. 7, the function to change operation of the Function API 611 dynamically is not implemented. This is because the composition which changes operation of the API dynamically may cause a development problem and a market problem as the composition of the API has great influences on the development efficiency of the user application 501.

Therefore, in order to modify the service of the Function Service 601, the Modify Service 602 which modifies the service of the Function Service 601 is additionally provided over the Function Service 601. And the Modify API 612 is further additionally provided over the Function API 611.

As shown in FIG. 21, the user application 501 of the old version sends a service request to the Function Service 601 through the Function API 611 (S101).

On the other hand, when requesting the service of the Function Service 601, the user application 501 of a new version sends a service request to the Function Service 601 through the Function API 611 (S102). When requesting the service of the Modify Service 602, the user application 501 of a new version sends a service request to the Modify Service 602 through the Modify API 612 (S103).

However, after the service request is sent to the Modify Service 602 and the behavior of the Function Service 601 is changed, even the user application 501 of the old version is able to obtain the service of the Function Service 601, the behavior of which is changed, through the Function API 611.

In the following, the Modify Service 612 will be explained in greater detail. FIG. 23 is a sequence diagram for explaining the change processing of the Function Service by the Modify Service. In the example of FIG. 23, the case in which the behavior of Printer Service 712 is changed according to a call of the Function API 611 to use the Fax Service 714 will be described.

Suppose that the user (the operator) sends a transmission start request to the Fax transmission application 501*f* through the operation panel 202 in a state in which the Fax transmission application 501*f* which is one of the JSDK applications 147 is started (S501).

The Fax transmission application 501*f* performs a transmission start using the Fax transmission class 611*f* which constitutes a component of Function API 601 or Modify API 612 according to the request from the user (S502). Specifically, the Fax transmission application 501*f* calls the start( ) method (Faxtx.start( )) of the Fax transmission class 611*f*.

The Fax transmission class 611*f* attaches a product ID of the application of the requesting source to a notice, and sends the notice to the Modify Service 602, the notice indicating that the FaxTx.start( ) method is called (occurrence of transmission start event 753) (S503).

The Modify Service 602 determines whether the received event (transmission start event 753) is an event used as the trigger of the behavior change based on the AspectSM which is registered, on the occasion of installation of the Fax transmission application 501*f*, for the Fax transmission application 501*f*, by making reference to the AspectSM.

FIG. 24 is a diagram showing an example of the description of the AspectSM which is registered as corresponding to the Fax transmission application.

The AspectSM 820 of FIG. 24 differs from the AspectSM 810 of FIG. 20 in the content of the description at the 2nd line. Namely, "Method" is described in the name attribute of the Event element 821 of the AspectSM 820 as an event name used as the trigger which changes the behavior. This means that calling the method is the trigger that changes the behavior. In the type attribute, the method name ("jp.co.rrr.function.FaxTx:start (void)") used as the trigger is described. In the following, the Fax transmission class will be referred to as "Fax Tx".

The product ID ("123456") which specifies the calling source of the method is described in the value attribute in the example of FIG. 24. In this example, "123456" is the product ID of the Fax transmission application 501*f*.

When the calling module is not specified, the value of the value attribute is left blank. The difference between the case where the product ID is not specified as the value of the value attribute (or, when the calling module is not specified), and the case where the product ID is specified (or, when the calling module is specified) is notionally illustrated as the difference between FIG. 21 and FIG. 22.

As is apparent from the foregoing, it is described in the AspectSM 820 that the calling of the method Faxtx.start( ) from the Fax transmission application 501*f* is the trigger which changes the behavior.

Accordingly, the Modify Service 602 determines, based on the Event element 821 of the AspectSM 820, that the event (the transmission start event 753) received from the Fax transmission class 611*f* is an event used as the trigger of the behavior change, and sends a behavior change request for changing the behavior of the Printer Service 712, to the Modify Agent 732 by attaching the behavior change information to the request (S504).

Next, the processing of the steps S505 to S510*b* which is essentially the same as the processing of the steps S423 to S428*b* of FIG. 18 is performed. Therefore, in the step S510*b*, the processing which is essentially the same as processing in FIG. 19 is performed, and the behavior of the Printer Service 712 is changed.

Namely, the guard condition is added to the state transition from the Idle state 741 to the Print state 742 in the Printer Service 712.

Then, the Modify Agent 732 notifies to the Modify Service 602 that the change of the behavior of the Printer Service 712 is completed (S511). The Modify Service 602 notifies to the Fax transmission class 611*f* the completion of the change of the behavior (S512).

The Fax transmission class 611*f* is set in a waiting condition until the notice of the completion of the change is received from the Modify Service 602. The Fax transmission class 611*f* sends a transmission start event 753 to the State Machine Pool 731 according to the notice of completion of the change (S513). The State Machine Pool 731 searches the notification destination of the transmission start event 753, and notifies the transmission start event 753 to the searched Fax Service 713 (S514).

Although the Fax transmission processing is performed by the Fax Service 713 in this example, printing is not started even if the Print Start event 743 is sent to the Printer Service 712, based on the change of the behavior mentioned above.

After the Fax transmission is completed by the Fax Service 714 (S515), the State Machine Pool 731 sends a transmission end notice to the Fax transmission class 611*f* (S516).

The Fax transmission class 611*f* sends a transmission end notice to the Fax transmission application 501*f* in response to the transmission end notice received from the State Machine Pool 731 (S517).

The Fax transmission application 501*f* notifies the user of completion of the Fax transmission by displaying a message indicating that the Fax transmission is completed, on the operation panel 202 (S518).

In the step S514 of FIG. 23, the State Machine Pool 731 searches the notification destination of the transmission start event 753. Next, a description will be given of how the event received by the State Machine Pool 731 is notified to each state machine.

Figure 25:
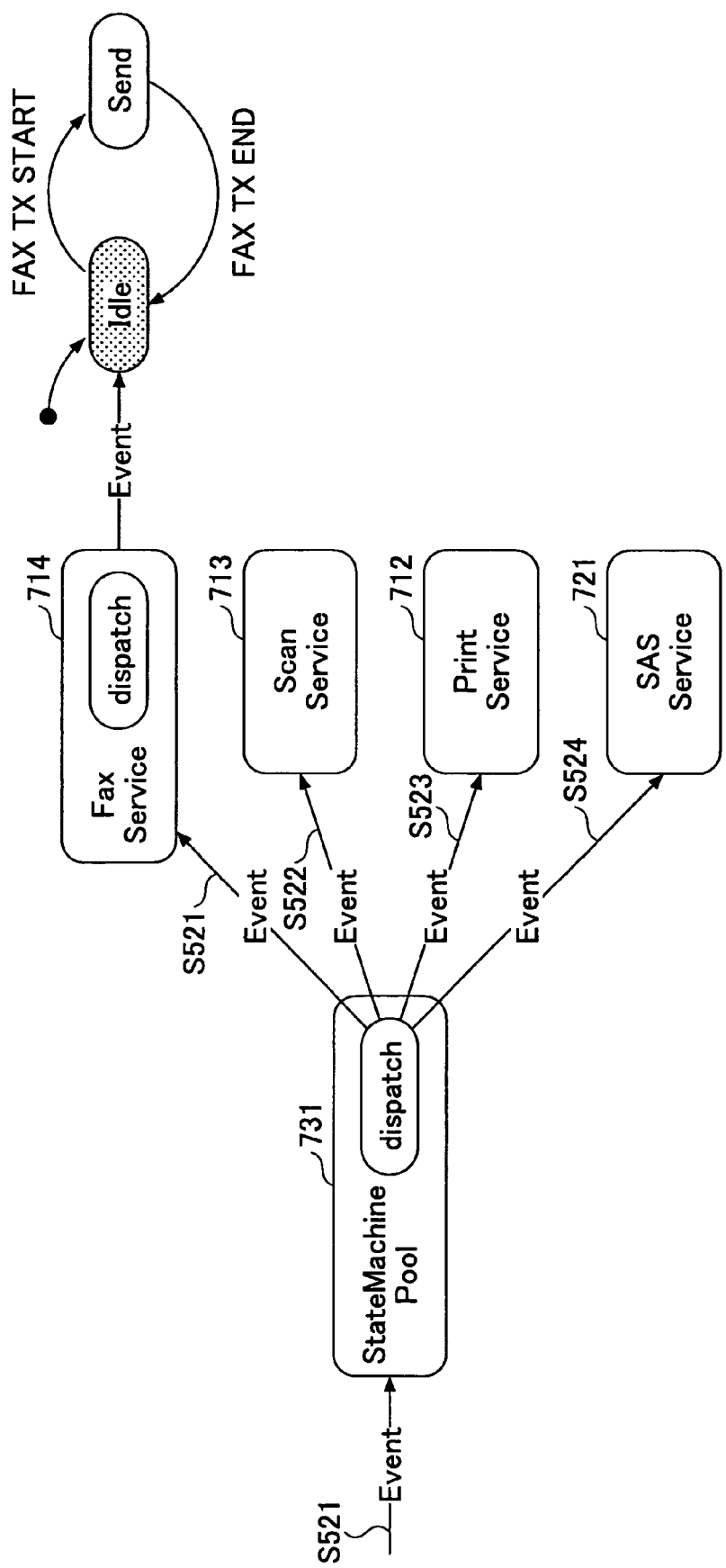
FIG. 25 is a diagram for explaining the event notification processing by State Machine Pool.

FIG. 25 is a diagram for explaining the event notification processing by the State Machine Pool.

When an event is received, the State Machine Pool 731 sends the event to the group of state machines managed, sequentially in a round robin scheduling. Thereby, exclusive operation among the state machines is realized.

Since the transition processing of each state machine is performed exclusively, the action processing in the State Machine Pool 731 can be performed exclusively.

The event notification processing will be explained with reference to FIG. 25.

As shown in FIG. 25, the transmission start event 753 is sent to the State Machine Pool 731 (S521). The State Machine Pool 731 sends the transmission start event 753 to all the managed state machines in a round robin scheduling (S521-S524). However, if the destination is specified by the event, the event is sent to the specified state machine.

For example, when the Fax Service 714 is located in the beginning of the queues, the State Machine Pool 731 sends the transmission start event 753 to the Fax Service 714 first (S521).

The Fax Service 714 sends the events to all the transition objects connected to the currently active state object sequentially, and checks whether the transition conditions are satisfied.

If the transition conditions are satisfied, the action processing is performed and the transition is effected. For example, if it is in the Idle state 751, the transition to the FaxSend state 752 is effected by the transmission start event 753, and the Fax transmission is started.

(3) Extend Service

Figure 26:
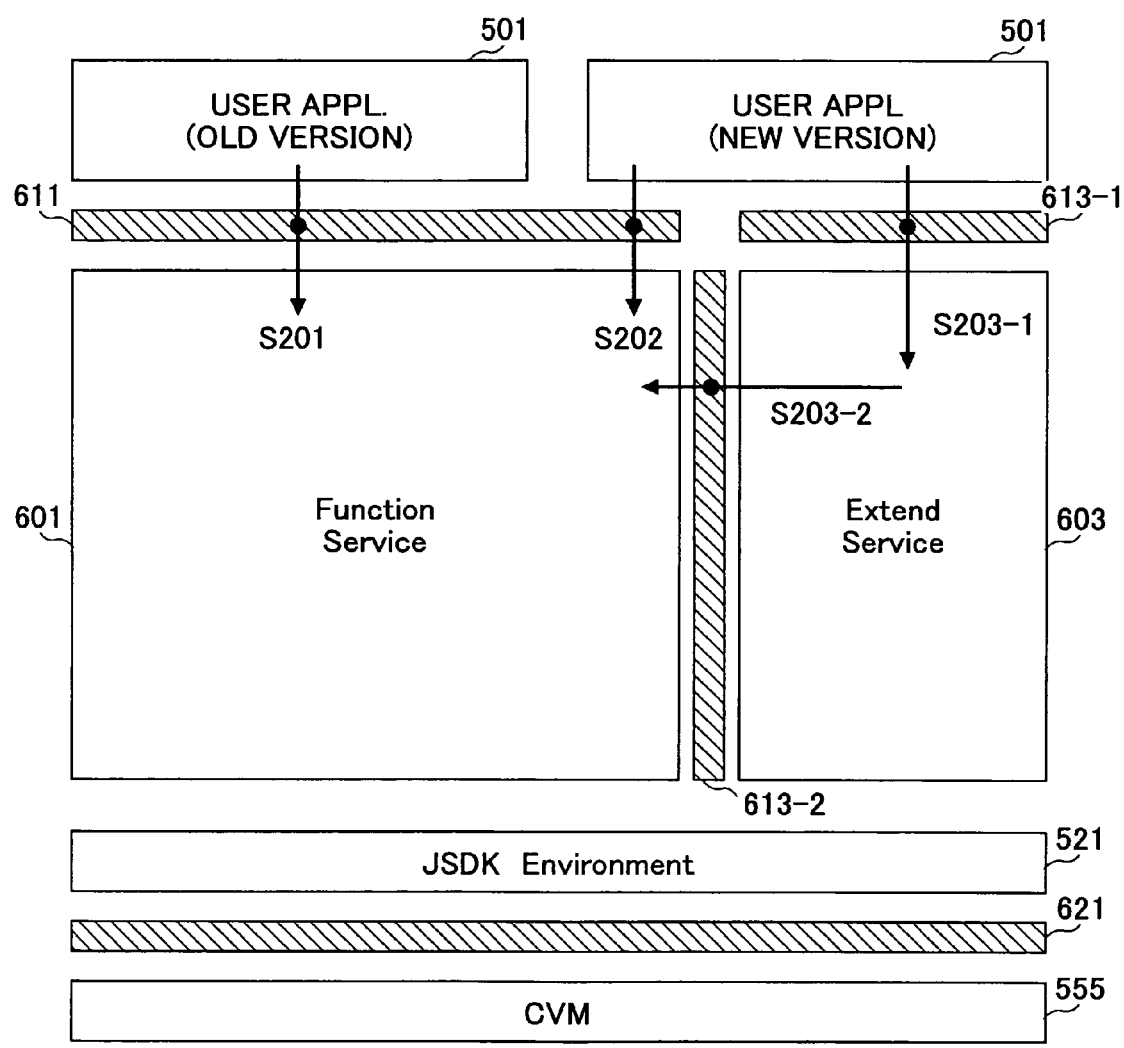
FIG. 26 is a class diagram for explaining Extend Service.

FIG. 26 is a class diagram for explaining the Extend Service 603 which constitutes the JSDK system of FIG. 7.

The Extend Service 603 is a class which extends the service of the Function Service 601. In the JSDK system of FIG. 7, the Function Service 601 described in the preceding section (1) and the Extend Service 603 described in the present section (3) are arranged in the same-level layer.

In the JSDK system of FIG. 7, as an API which performs the intermediary task for the service transfer between the Function Service 601 and the user application 501, the Function API 611 is provided. And as an API which performs the intermediary task for the service transfer between the Extend Service 603 and the user application 501, the first Extend API 613-1 is provided. And the second Extend API 613-2 is provided as an API which performs the intermediary task for the service transfer between the Function Service 601 and the Extend Service 603.

The reason for the composition of the Extend Service 603 and the Extend API 613 will be explained. In order to adapt the JSDK platform 148 to conform to various changes of the JSDK application 147 appropriately, it is desirable that the service of the Function Service 601 can be changed heteronomously. This may be a case in which the Function Service 601 is provided with an externally supplied component, thereby extending the service of Function Service 601.

Therefore, the Extend Service 603 which extends the service of the Function Service 601 is implemented together with the Function Service 601, in order to extend the service of the Function Service 601. And the Extend API 613 is further implemented together with the Function API 611.

As shown in FIG. 26, the user application 501 of the old version sends a request to the service of the Function Service 601 through the Function API 611 (S201).

On the other hand, when requiring the service of a non-extended version of the Function Service 601, the user application 501 of the new version sends a request to the Function Service 601 through the Function API 611 (S202). And when requiring the service of an extended version of the Function Service 601, the user application 501 of the new version sends a request to the Extend Service 603 through the 1st Extend API 613-1 (S203-1), so that the request is sent to the Function Service 601 through the 2nd Extend API 613-2 (S203-).

Figure 27:
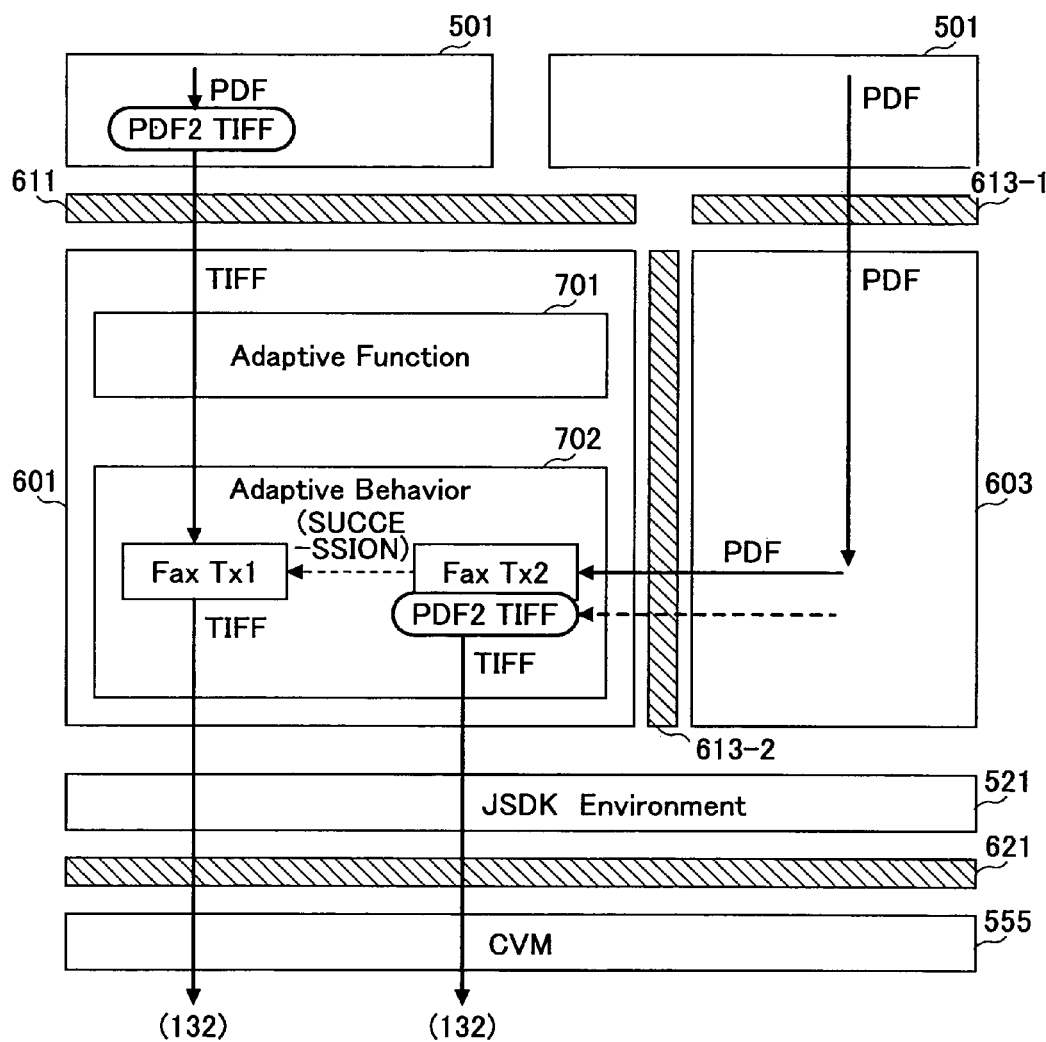
FIG. 27 is a diagram for explaining the operation of Extend Service.

FIG. 27 is a diagram for explaining the operation of the Extend Service.

As shown in FIG. 27, the Fax Tx1 which is the Fax Service 714 of the non-extended version, and the Fax Tx2 which is the Fax Service 714 of the extended version are provided in the Adaptive Behavior 702 of the Function Service 601. The Fax Tx1 is the Fax Service 714 which performs FAX transmission of image data. The Fax Tx2 is the Fax Service 714 which transforms image data from PDF format to TIFF format, and performs FAX transmission of the image data in the TIFF format.

When image data is transformed into the TIFF format and the FAX transmission of the image data is performed through the Fax Tx1, the transform processing is performed by using the JSDK application 147. When image data is transformed into the TIFF format and the FAX transmission of the image data is performed through the Fax Tx2, the transform processing is performed by using the JSDK platform 148.

Figure 28:
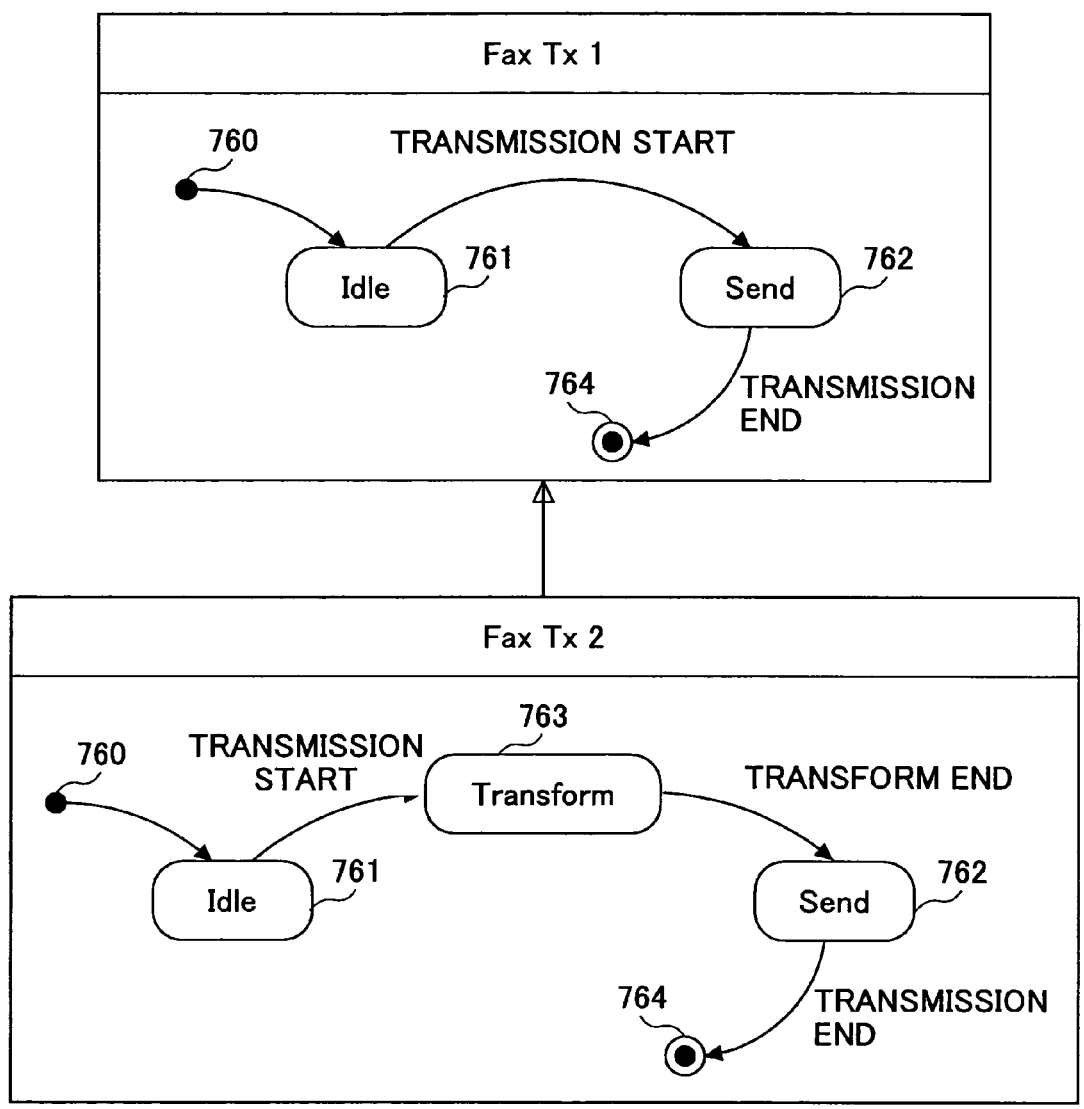
FIG. 28 is a diagram showing a state-transition model of Fax Tx1 or Fax Tx2.

FIG. 28 shows the state-transition model of the Fax Tx1 or the Fax Tx2.

Regarding the states of the Fax Tx1, the initial state 760, the Idle state 761, the Send state 762, and the end state 764 are provided. Regarding the states of the Fax Tx2, the initial state 760, the Idle state 761, the Send state 762, the Transform state 763, and the end state 764 are provided.

The Idle state 761 is a waiting state in which a start of FAX transmission processing is awaited. The Send state 762 is a state in which the FAX transmission processing is performed continuously. The Transform state 763 is a state in which the image transform processing is performed continuously.

As shown in FIG. 28, the Fax Tx1 and the Fax Tx2 are in succession relation. Fax Tx1 is a class before succeeding, and Fax Tx2 is a class after succeeding.

By using the Adaptive Behavior 702 of the Function Service 601, the self behavior can be dynamically changed by succeeding the self behavior dynamically. For example, as shown in FIG. 27, the Fax Tx1 is dynamically succeeded by the Fax Tx2, and the behavior which does not transform image data from the PDF format into the TIFF format is dynamically changed to the behavior which does transform image data from the PDF format into the TIFF format.

By using the Adaptive Behavior 702 of the Function Service 601, the self behavior can be dynamically changed by performing the plug-in of the plug-in component for behavior succession to the self module. For example, as shown in FIG. 27, the Fax Tx1 is dynamically succeeded by Fax Tx2 with the plug-in of "PDF2TIFF" of the plug-in component for transforming image data from the PDF format into the TIFF format. The plug-in component for behavior succession is supplied to the Function Service 601 by the Extend Service 603.

Figure 29:
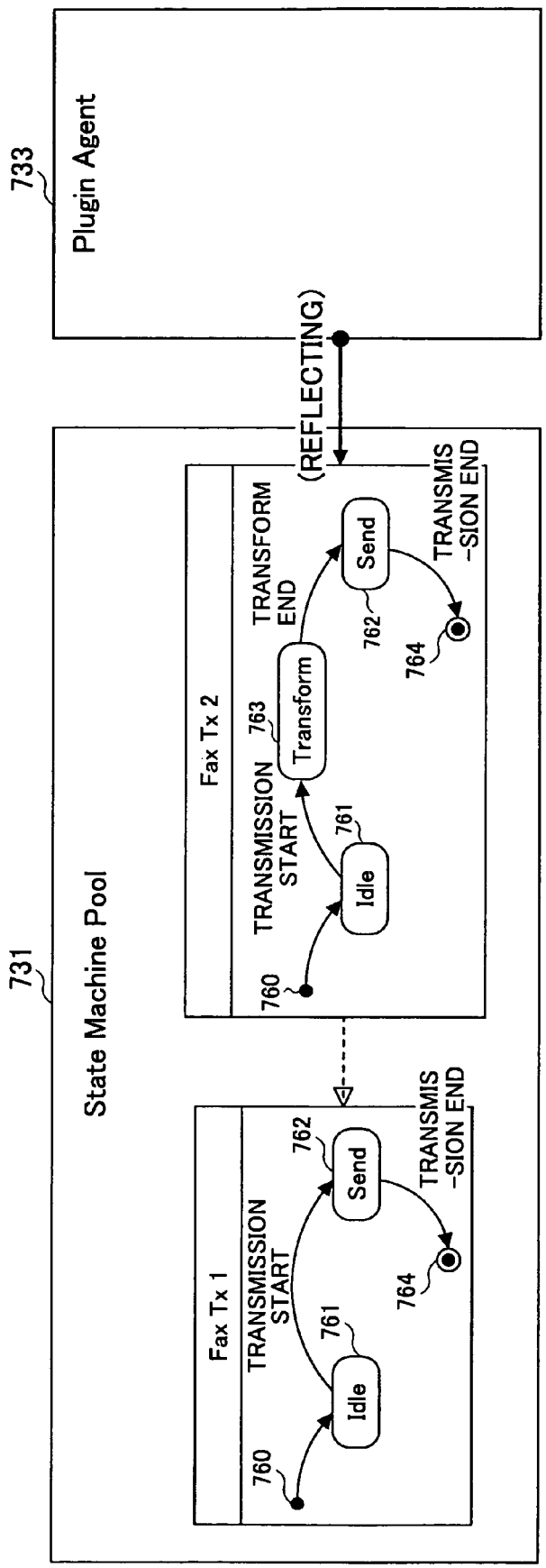
FIG. 29 is a diagram for explaining the plug-in processing with respect to Fax Service.

FIG. 29 is a diagram for explaining the plug-in processing with respect to the Fax Service.

As shown in FIG. 29, the classes of the State Machine Pool 731 and the Plugin Agent 733 are provided in the Adaptive Behavior 702 of the Function Service 601.

The State Machine Pool 731 is a class which manages the state-transition model of Fax Tx1 or Fax Tx2. The Plugin Agent 733 is a class which makes the plug-in result of the plug-in component for behavior succession reflect in the state-transition model of Fax Tx1 or Fax Tx2.

When the plug-in of the plug-in component for behavior succession is performed to the Function Service 601, the Plugin Agent 733 makes the plug-in result of the plug-in component for behavior succession reflect in the state-transition model which is managed by the State Machine Pool 731. Thereby, the behavior of the Function Service 601 is dynamically changed.

In the following, the extend processing from Fax Tx1 to Fax Tx2, which has been briefly explained with reference to FIG. 26 to FIG. 29, will be explained in greater detail.

The Fax Tx1 is the Fax Service 714 before extension, and this Fax Service 714 is constituted by the following objects based on the model shown in FIG. 13.

Figure 30:
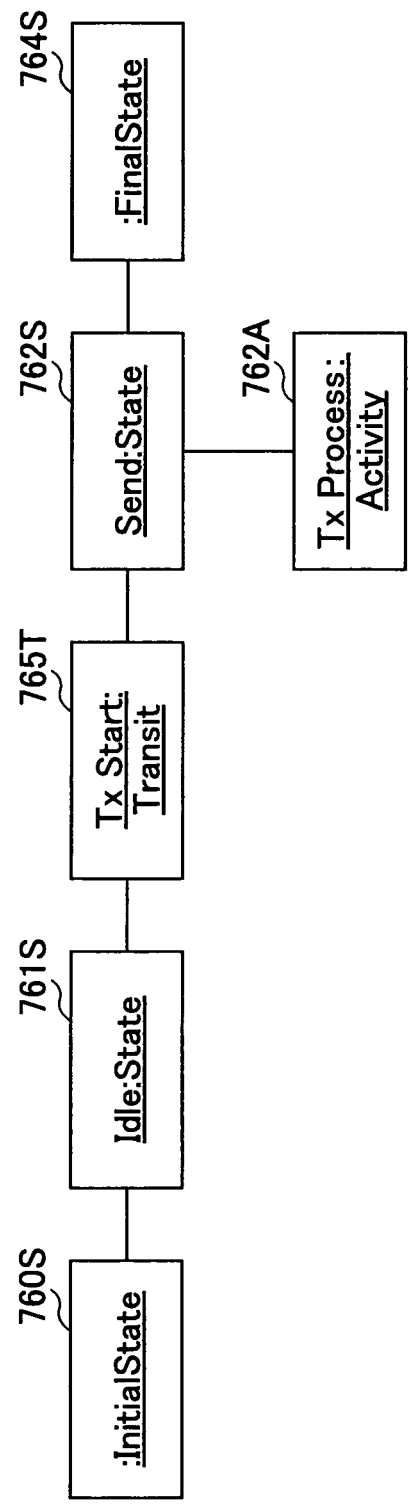
FIG. 30 is a diagram showing the object composition of Fax Tx1.

FIG. 30 is a diagram showing the object composition of the Fax Tx1. Based on the state-transition model of FIG. 28, the Fax Tx1 comprises the initial-state object 760S, the final-state object 764S, the Idle state object 761S, the Send state object 762S, the transmission start object 765T, and the transmission processing object 762A.

Figure 31:
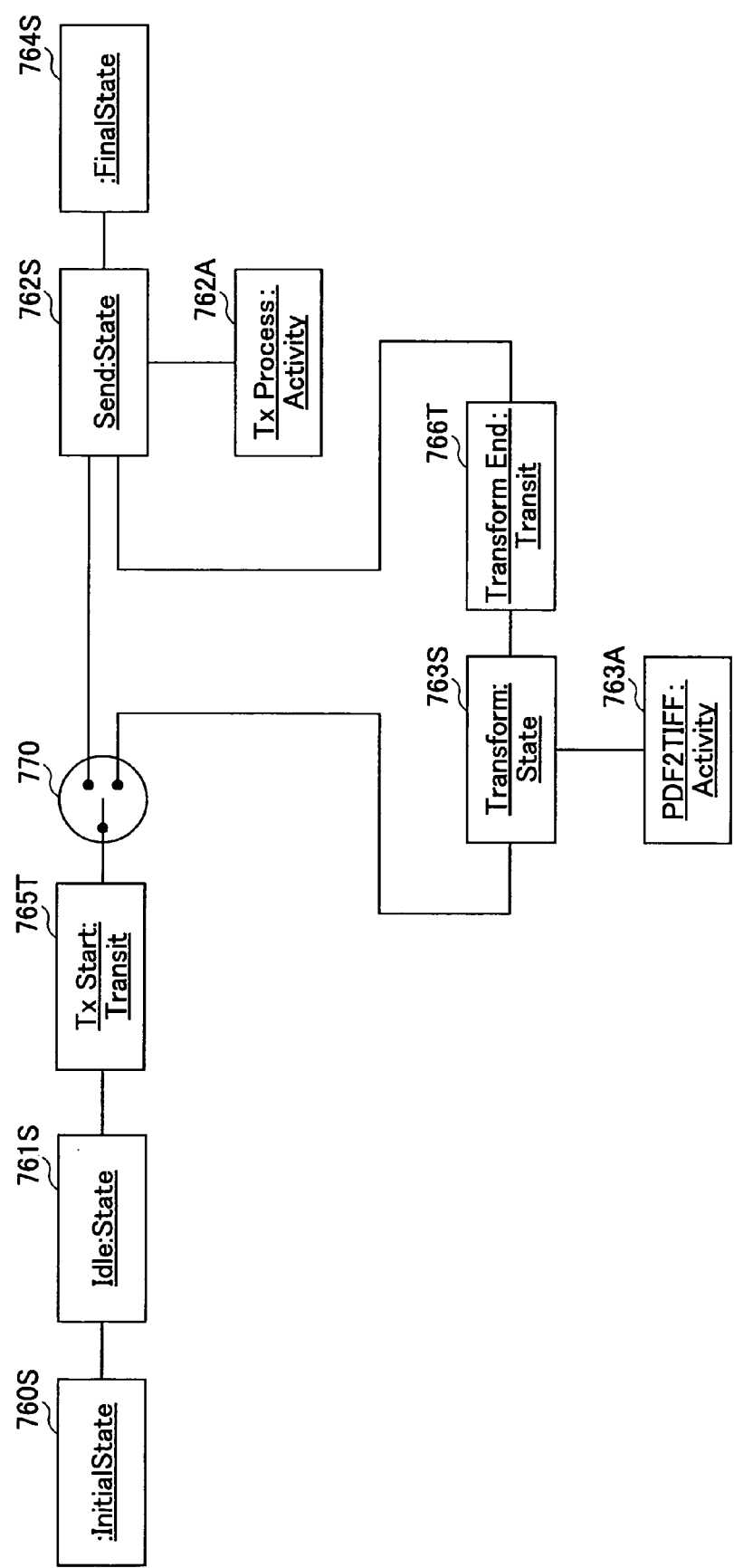
FIG. 31 is a diagram showing the object composition of Fax Tx2.

FIG. 31 is a diagram showing the object composition of the Fax Tx2. Based on the state-transition model of FIG. 28, the Fax Tx2 comprises the initial-state object 760S, the final-state object 764S, the Idle state object 761S, the Send state object 762S, the Transform state object 763S, the transmission start object 765T, the transmission processing object 762A, the transform-processing object 763A, and the transform end object 766T.

In FIGS. 30 and 31, some transition objects (for example, the transition object corresponding to a state transition from the Send state 762 to the end state 764) are omitted for the sake of convenience of description.

As is apparent from FIGS. 30 and 31, the extend processing from the Fax Tx1 to the Fax Tx2 can be realized by adding the objects for the extend processing, such as the transform state object 763S, the transform processing object 763A, and the transform end object 766T, to the Fax Tx1. The objects which receive remarkable influences of the extend processing of the Fax Service 714 are the objects in the updating portion of the Fax Service 714. The objects in the updating portion of the Fax Service 714 are the objects connected to the object-replacement portion or the object-addition portion (or the updating portion of the Fax Service 714).

In the extend processing from the composition of FIG. 30 to the composition of FIG. 31, the addition portion of switch 770 is equivalent to the updating portion of the Fax Service 714. And the Send state object 762S and the transmission start object 765T are equivalent to the objects in the updating portion of the Fax Service 714.

In order to perform the extend processing of the Fax Service 714 during operation of the Fax Service 714, the extend processing is performed when the objects in the updating portion of the Fax Service 714 are in an inactive state (or when the objects are not in an active state).

FIGS. 32 and 33 are diagrams showing the example of definition of the state-transition information of the Fax Tx1. One example of the description of the state-transition information 1100 is shown in FIGS. 32 and 33. The line number is attached to the diagrams in FIGS. 32 and 33, for the sake of convenience of description.

By the tag name of the <StateMachine> tag in the 121st line of the state-transition information 1100 and the value (Fax Tx1) of its name attribute, it is defined that the state-transition information 1100 corresponds to the Fax Tx1.

The value ("004") of the xmi.id attribute in the <StateMachine> tag is the ID which identifies the Fax Tx1.

The <CompositeState> tag of the 125th line is equivalent to the declaration of a start of a definition of the state of the Fax Tx1. This declaration is identified by the value ("017") of the xmi.id of the <CompositeState> tag.

The Pseudostate element 1110 surrounded by the <Pseudostate> tag from the 130th line to the 137th line is the definition of the initial state 760. "Init" is set to the value of the name attribute of the Pseudostate element 1110, and "018" is set to the value of the xmi.id element.

The CompositeState element 1120 from the 138th line to the 148th line is the definition of the Send state 762. "Send" is set to the value of the name attribute of the CompositeState element 1120, and "019" is set to the value of the xmi.id element.

The CompositeState element 1130 from the 149th line to the 159th line is the definition of the Idle state 761. "Idle" is set to the value of the name attribute of the CompositeState element 1130, and "022" is set to the value of the xmi.id element.

The Pseudostate element 1140 from the 160th line to the 183rd line is the definition of the end state 764. "end" is set to the value of the name attribute of the Pseudostate element 1140, and "024" is set to the value of the xmi.id element.

Each state transition in the Fax Tx1 is defined from the 191st line to the 228th line. Namely, the Transition element 1150 from the 191st line to the 204th line is the definition of the state transition from the Idle state 761 to the Send state 762. By the Transition.source element 1151 and the Transition.target element 1152 which are defined as child elements of the Transition element 1150, it is specified that the Transition element 1150 is the definition of the state transition.

The Transition.source element 1151 is an element in which the state of the transition-source element is set up. The value of the xmi.idref attribute of the child element of the Transition.source element 1151 is "022". Therefore, it is found that the transition-source element is in the state where the value of the xmi.id attribute is "022", i.e., the Idle state 761.

The Transition.target element 1152 is an element in which the state of the transition-target element is set up. The value of the xmi.idref attribute of the child element of the Transition.target element 1152 is "019". Therefore, it is found that the transition-target element is in the state where the value of the xmi.id is "019", i.e., the Send state 762.

The value of the name attribute of the Transition element 1150 is "Transmission Start", and the value of the xmi.id attribute is "023".

The Transition element 1160 from the 205th line to the 218th line is the definition of the state transition from the Send state 762 to the end state 764.

By the value of the xmi.idref attribute of the Transition.source element 1161 which is "019" (the Send state 762) and the value of the xmi.idref attribute of the Transition.target element 1162 which is "024" (the end state 764), it is specified that the Transition element 1160 is the definition of the state transition.

The value of the name attribute of the Transition element 1160 is "Transmission End", and the value of the xmi.id attribute is "020".

The Transition element 1170 from the 219th line to the 228th line is the definition of the state transition from the initial state 760 to the Idle state 761. By the value of the xmi.idref attribute of the Transition.source element 1171 which is "018" (the initial state 760), and the value of the xmi.idref attribute of the Transition.target element 1172 which is "022" (the Idle state 761), it is specified that the Transition element 1170 is the definition of the state transition. The value of the xmi.id attribute of the Transition element 1170 is "018".

A description will be given of the state-transition information 1100 following the 130th line. The Pseudostate element 1110, the CompositeState element 1120, and the CompositeState element 1130, which correspond to the respective states, have at least one of the StateVertex.outgoing element and the StateVertex.incoming element as a child element thereof. The StateVertex.outgoing element is an element in which the connection to the state transition from the transition source element is defined. The StateVertex.incoming element is an element in which the connection to the state transition to the transition target element is defined.

For example, in the StateVertex.outgoing element 1111 of the Pseudostate element 1110 corresponding to the initial state 760, the value of the xmi.idref attribute of the child element is "018". Therefore, it is found out that the state transition to the transition target from the initial state 760 is equivalent to the state transition to which the Transition element 1170 corresponds.

In the StateVertex.outgoing element 1121 of the CompositeState element 1120 corresponding to the Send state 762, the value of the xmi.idref attribute of the child element is "020". And, in the StateVertex.incoming element 1122, the value of the xmi.idref attribute of the child element is "023". Therefore, it is found out that the state transition to the transition target element from the Send state 762 is equivalent to the state transition to which the Transition element 1160 corresponds, and the state transition of the transition source element is equivalent to the state transition to which the Transition element 1150 corresponds.

In the CompositeState element 1130 corresponding to the Idle state 761, and the Pseudostate element 1140 corresponding to the end state 764, the connection with the state transition is defined similarly.

The object composition of the Fax Tx1 is created based on the above-described state-transition information. This construction processing of the object composition is essentially the same as what has been described with reference to FIG. 15, and a description thereof will be omitted.

Next, a description will be given of the extend processing of the Fax Service 714.

Figure 34:
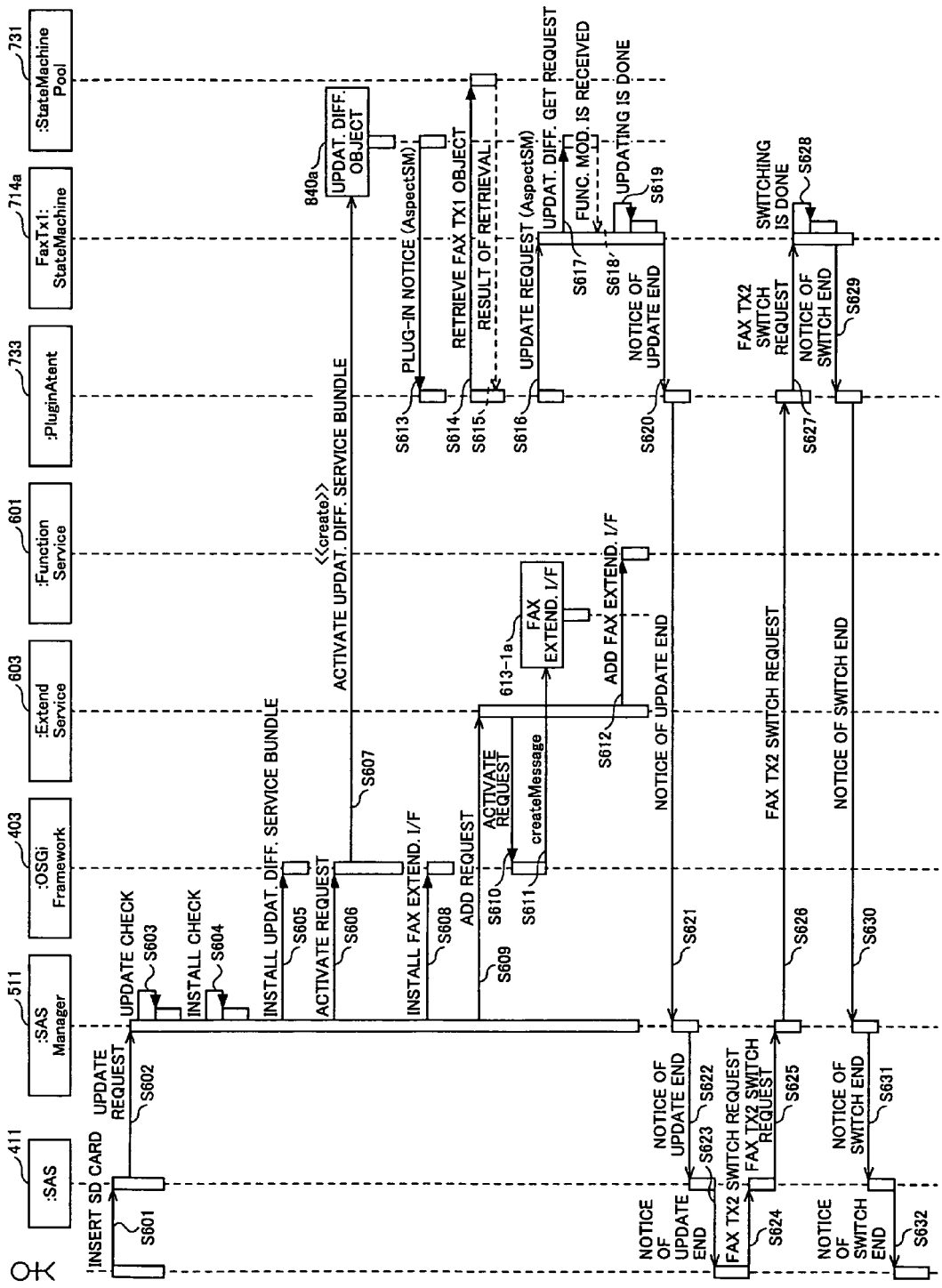
FIG. 34 is a sequence diagram for explaining extend processing of Fax Service.

FIG. 34 is a sequence diagram for explaining the extend processing of Fax Service.

For example, the administrator inserts, in the memory card slot 234 of the multi-function peripheral 101, an SD card on which the additional module that defines the difference between the Fax Tx2 and the Fax Tx1 is stored (S601).

Figure 35:
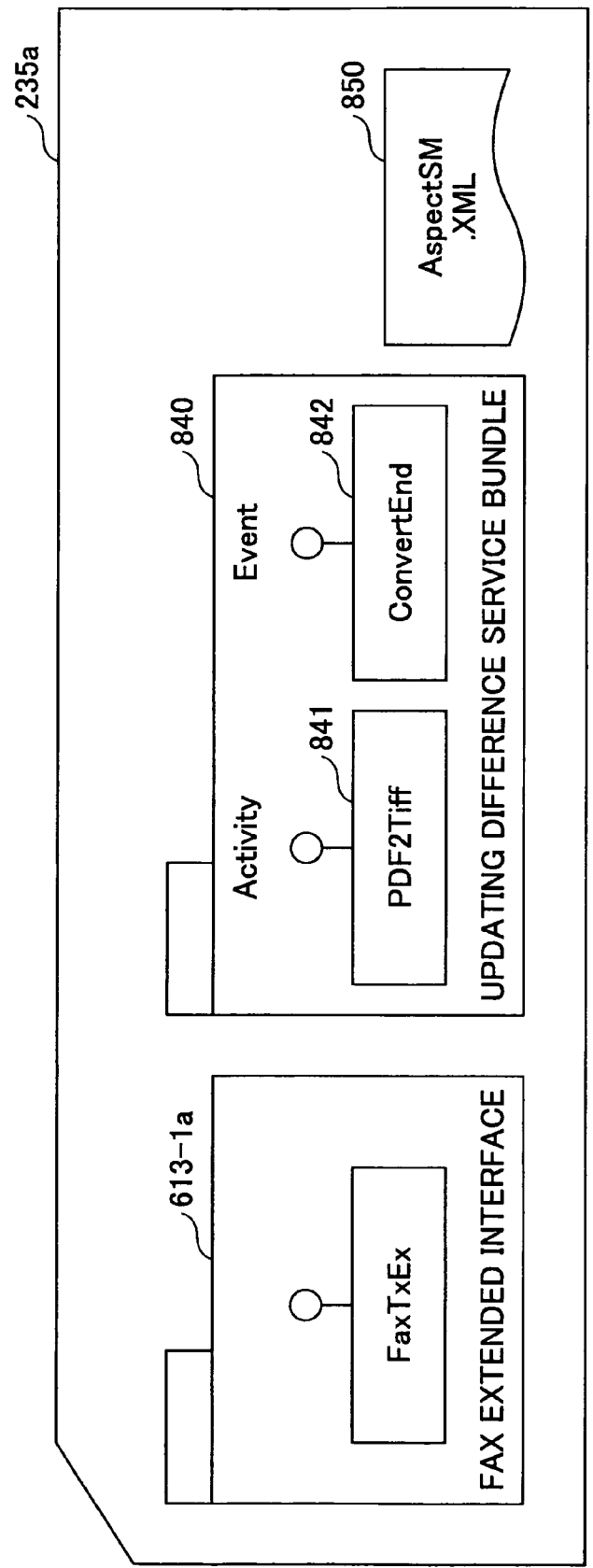
FIG. 35 is a diagram showing the composition of the additional modules in an SD card.

FIG. 35 is a diagram showing the composition of the additional module in the SD card.

As shown in FIG. 35, the Fax extended interface 613-1a, the updating difference service bundle 840, and the AspectSM.xml file 850 (AspectSM 850) are stored in the SD card 235a. The Fax extended interface 613-1a (Fax Tx Ex) is equivalent to the Extend API 613-1 for extending the Fax Service 714.

In the updating difference service bundle 840, the functional module in which the classes, from among the classes in the class diagram of FIG. 13 corresponding to the IState interface 1004a, the Activity interface 1004b, the Event interface 1003a, the Guard interface 1003b and the Action interface 1003c, the addition of which is needed when performing the extend processing, are implemented is stored. The functional module is, for example, a class file in the Java (registered trademark) language. In the following, the functional module will be called "additional module".

In this embodiment, the PDF2Tiff 841 and the ConvertEnd 842 are stored as the additional modules.

The AspectSM 850 is the XML-form file in which the specification as to how the extend processing from Fax Tx1 to Fax Tx2 is performed is described.

FIG. 36 is a diagram showing an example of description of the AspectSM in which the extended contents of the Fax Service are described. The line number is attached to the diagram in FIG. 36 for the sake of convenience of description.

The contents of change to the state-transition information 1100 (FIGS. 32 and 33) of the Fax Tx1 are described in the AspectSM 850.

In the description of the AspectSM 850, it is specified by the 2nd line that the state transition to the Fax Tx1 in which the value of xmi.id element is "004" is being changed. Namely, the xmi.id of the state machine which is the target of change is specified by the xmi.idref attribute in the 2nd line.

The change information with respect to a first change portion is described from the 3rd line to the 20th line. The change portion and the change timing are specified by the 3rd line. The change portion is specified by the description <xxx> in the pointcut.<xxx> and the value of the xmi.ref attribute. The description <xxx> in this example is "CompositeState", and the value of the xmi.ref attribute is "017". Therefore, the change to the content of the <CompositeState> tag of the state-transition information 1100 in the 125th line is specified.

The change timing is specified by the value of the timing attribute. In this example, "Idle" is set to the value of the timing attribute. Therefore, it is specified that the change is to be effected when the Fax Tx1 is in the Idle state 761.

The contents of the change are specified by the 4th line. Namely, by the tag name portion following "advice." in the tag name of the <advice.CompositeState> tag, it is specified that the target of the change is the CompositeState element. By the type attribute, it is specified that the classification of the change is "insert" (insertion). By the 3rd line and the 4th line, it is specified that a new CompositeState element should be inserted into the <CompositeState> tag.

By the 5th to 18th lines, the definition of the CompositeState element 851 which is the target of the insertion is provided. The CompositeState element 851 corresponds to the Transform state 763 of the Fax Tx2. The form of description of the CompositeState element 851 is essentially the same as that described with reference to FIGS. 32 and 33. Namely, the connection with the transition target element is defined by the StateVertex.outgoing element 852 which is the child element of the CompositeState element 851, and the connection to the transition source element is defined by the StateVertex.incoming element 853.

In the CompositeState element 851, the State.entry element 854 is defined as the child element thereof. The State.entry element 854 is an element in which the entry processing in the Transform state 763 corresponding to the CompositeState element 851 is defined. The Action element 855 is defined as the child element of the CompositeState element 851. By the xmi.id attribute thereof and its name attribute, it is specified that the processing identified by the value of the xmi.id attribute which is "026" and the value of the name attribute which is "pdf2tiff" is performed.

By the 21st to 42nd lines, the change information with respect to the second change portion is specified. The change portion and the change timing are specified by the 21st line. In this example, it is specified that, when it is in the Idle state 761, the change to the Transition element 1150 is effected (see FIG. 33).

In the second change portion, two changes are specified. The first one of the two changes is specified by the 22nd to 24th lines, and the second change is specified by the 25th to 41st lines.

Namely, by the tag name portion following "advice." in the tag name of the <advice.Transition.target> tag of the 22nd line, the first change is specified that the target of the change is the Transition.target element 1152. By the type attribute, it is specified that the classification of the change is "modify" (modification). By the 23rd line, the definition after modification is described with respect to the target of the change. Namely, the first change is to modify the state transition from the Idle state 761 to the Send state 762 into the state transition from the Idle state 761 to the Transform state 763.

The second change (the 25th to 41st lines) is to perform insertion of the Transition element corresponding to the new state transition (the state transition from the Transform state 605 to the Send state 762) when it is in the Idle state 761. Since the contents of the change can be easily understood from the above-mentioned explanation, the explanation for every line will be omitted.

By the 43rd to 55th lines, an extended description portion in which the definition based on the particular format that is not standard is described is provided.

By the "XMI.extension" following "pointcut." of the 43rd line, it is specified that it is the extended description portion. In this embodiment, what is defined in this portion is the association between the action processing which is called by the state-transition processing and the functional module (for example, the Java class) which is used for the event processing is defined.

By the 44th line, it is specified that the definition of the child element of the advice element should be inserted.

By the 45th to 49th lines, the definition being inserted is specified. By the 45th line, it is specified that the Bundle is implemented. The implementing place of the Bundle is specified by the value ("004") of the xmi.idref attribute. Namely, the implementing place of the Bundle is the Fax Tx1.

By the 46th to 49th lines, association between the "pdf2tiff" in the definition (the 15th to 17th lines) of the entry processing of the CompositeState element 851 (the 5th to 18th lines) which is newly inserted as corresponding to the Transform state 763, and the jp.co.rrr.function.pdf2tiff class in which the processing is actually implemented is defined. By the definition of this association, the processing of the jp.co.rrr.function.pdf2tiff class is performed when it is changed to the Transform state 763 after the Fax Tx1 is updated to the Fax Tx2. The property element of the 48th line is the property information when the processing of the jp.co.rrr.function.pdf2tiff class is performed.

By the 50th to 52nd lines, association between the transform end event, which is a trigger of the state transition from the Transform state 763 to the Send state 762, and the jp.co.rrr.function.convertEnd class is defined. By the definition of this association, the jp.co.rrr.function.convertEnd class is performed if the transform end event is detected during the Transform state 605, and if the result of the execution is true, the state transition to the Send state 762 is effected.

Referring back to FIG. 34, the extend processing of the Fax Service will be explained.

After the insertion of SD card 235a by the administrator is detected automatically, or after the SD card 235a is inserted and the updating request is inputted from the operation panel 202, the SAS 411 sends a request for execution of the extend processing to the SAS Manager 511 (S602).

In addition, the information recorded on the SD card 235a may be downloaded through the network. In this case, it is not necessary to use a recording medium like an SD card.

The SAS Manager 511 checks if the updating from the Fax Tx1 to the Fax Tx2 using the updating difference service bundle 840 of the inserted SD card 235a is permitted (S603).

When the updating is permitted, the SAS Manager 511 checks if the installation of the updating difference service bundle 840 to the multi-function peripheral 101 is permitted (S604).

When the installation is permitted, the SAS Manager 511 installs the updating difference service bundle 840 from the SD card 235a into the OSGI framework 403 (the multi-function peripheral 101) (S605).

After the installation of the updating difference service bundle 840 is completed, the SAS Manager 511 requests the OSGi framework 403 to activate the state of the updating difference service bundle 840 (S606).

The OSGi framework 403 creates the instance of the updating difference service bundle 840 (which is called updating difference object 840a), and makes the updating difference object 840a change to an active state (S607).

Then, the SAS Manager 511 installs the Fax extended interface 613-1a in the OSGi framework 403 (S608). The SAS Manager 511 sends a request for the inclusion of the Fax extended interface 613-1a to the Function Service 601, to the Extend Service 603 (S609).

Then, the Extend Service 603 requests the OSGi framework 403 to activate the state of the Fax extended interface 613-1a (S610). The OSGi framework 403 makes the Fax extended interface 613-1a change to an active state (S611).

After the Fax extended interface 613-1a is changed to the active state, the Extend Service 603 registers the Fax extended interface 613-1a into the Function Service 601 (S612). Thereby, the calling of the Fax extended interface 613-1a is made possible.

On the other hand, the updating difference object 840a, which is changed to the active state in the step S607, notifies to the Plugin Agent 733, with the attachment of the AspectSM 850, that the plug-in of the updating difference service bundle 840 is carried out (S613). The Plugin Agent 733 acquires the object (Fax Tx1 object 714a) of the Fax Tx1 from the State Machine Pool 731 (S614, S615).

The Plugin Agent 733 sends an updating request for performing the updating to the Fax Tx2, to the Fax Tx1 object 714a with the attachment of the AspectSM 850 (S616). The Fax Tx1 object 714a determines, based on the AspectSM 850, additional modules that are necessary for updating the service bundle Fax Tx1 to the Fax Tx2, and requests the updating difference object 840a to perform acquisition of the additional modules (in this example, PDF2Tiff 841 and ConvertEnd 842) (S617). The updating difference object 840a acquires the additional modules, and returns them to the Fax Tx1 object 714a (S618).

Then, the Fax Tx1 object 714a updates the object composition of the Fax Tx1 to that corresponding to the Fax Tx2, based on the AspectSM 850, and performs association between the Activity object which is newly added by the updating and the additional modules (S619). The processing of step S619 is performed at the timing described in the AspectSM 850.

Then, the Fax Tx1 object 714a notifies to the Plugin Agent 733 that the updating of the Fax Tx1 to the Fax Tx2 is completed (S620). However, the switch 770 which switches the Fax Tx1 into the Fax Tx2 remains unchanged to select the Fax Tx1.

The notice indicating that updating is completed is sent to the SAS 411 through the SAS Manager 511 (S621, S622).

The SAS 411 displays on the operation panel 202 a message indicating that the completion of the updating, in order to notify the administrator of the completion of the updating (S623). In this state, the switch 770 is not changed to the Fax Tx2 yet, and the SAS 411 asks the administrator whether the switching to the Fax Tx2 should be performed.

Then, if the administrator inputs an instruction for switching to the Fax Tx2, through the operation panel 202 (S624), the SAS 411 sends a switching request for switching to the Fax Tx2, to the SAS Manager 511 (S625).

The SAS Manager 511 sends the switching request for switching to the Fax Tx2, to the Plugin Agent 733 (S626). The Plugin Agent 733 requests the Fax Tx1 object 714a change the behavior (state transition) to that corresponding to the Fax Tx2 (S627).

The Fax Tx1 object 714a is set in a waiting condition until the Fax Tx1 is changed to the Idle state 761. After the Fax Tx1 is changed to the Idle state 761, the Fax Tx1 object 714a changes the self behavior to that corresponding to the Fax Tx2, by switching the switch 770 (S628).

After the change is completed, the Fax Tx1 object 714a sends a notice of the completion of the switching, to the Plugin Agent 733 (S629). The notice of the completion of the switching is transmitted to the SAS 411 via the SAS Manager 511 (S630, S631).

In response to the notice of the completion of the switching, the SAS 411 displays a message indicating that the switching from the Fax Tx1 to the Fax TX2 is completed, on the operation panel 202 (S632).

Figure 37:
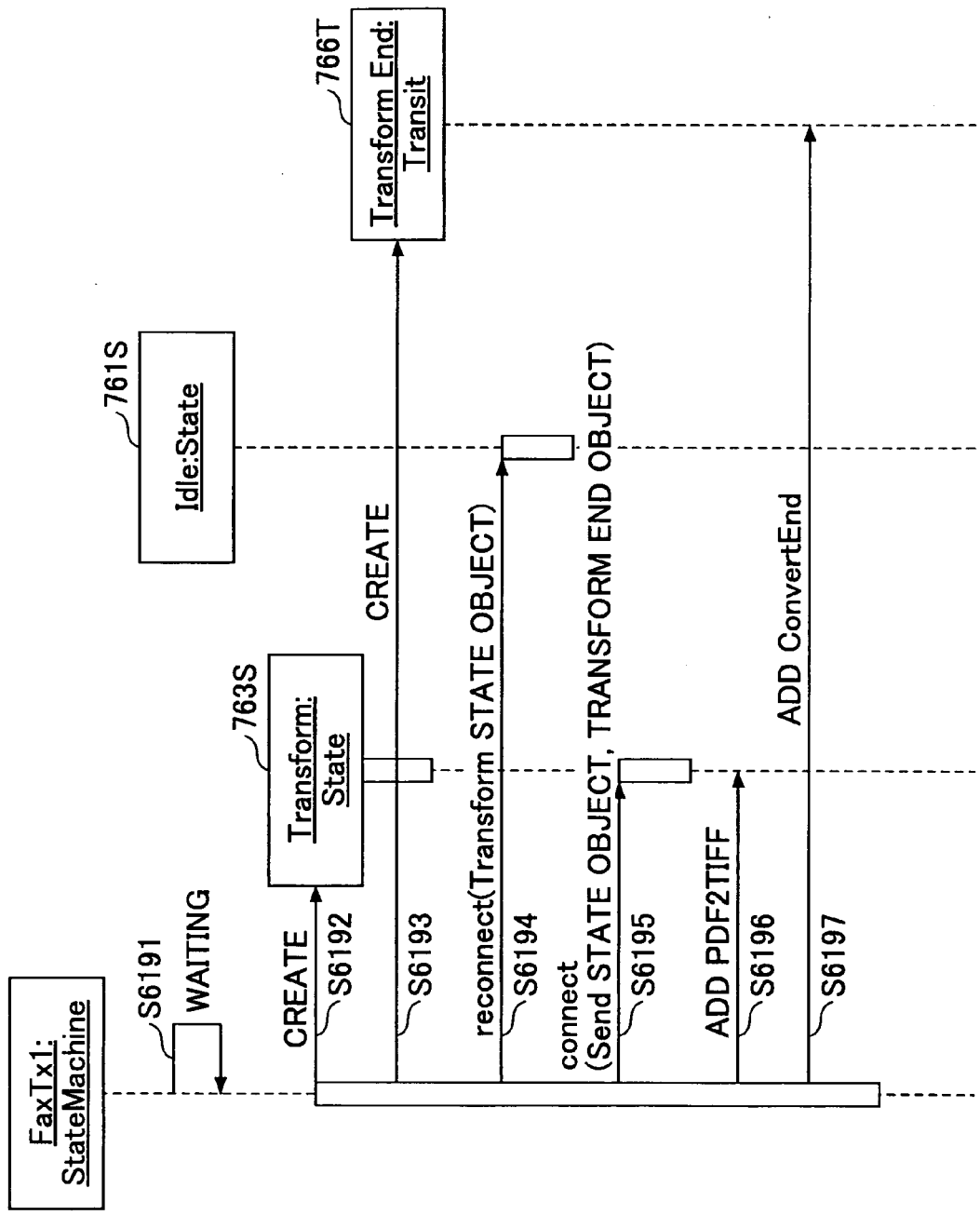
FIG. 37 is a sequence diagram for explaining update processing of the object composition of Fax TX1.

Next, a description will be given of the update processing of the object composition of the Fax Tx1 in the step S619. FIG. 37 is a sequence diagram for explaining the update processing of the object composition.

As shown in FIG. 37, the Fax Tx1 object 714a is in a waiting condition until the state of the Fax Tx1 changes to the state which is specified by the value of the timing attribute in each of the change portions specified in the AspectSM 850 (S6191).

In the example of the AspectSM 850 of FIG. 36, the timing for all the change portions is specified as being the Idle state 761. For this reason, the Fax Tx1 object 714a is in a waiting condition until the state of the Fax Tx1 changes to the Idle state 761.

After the state of the Fax Tx1 changes to the Idle state 761, the Fax Tx1 object 714a starts the extend processing according to the description of the AspectSM 850. For example, the Fax Tx1 object 714a creates the Transform state object 763S corresponding to the Transform state 763, based on the 3rd to 20th lines of the AspectSM 850 (S6192).

Then, the Fax Tx1 object 714*a* creates the transform end object 766T based on the 25th to 41st lines of the AspectSM 850 (S6193). Then, the Fax Tx1 object 714*a* changes the connecting relation between the objects based on the 9th to 14th lines and the 22nd to 24th lines of the AspectSM 850.

Namely, the Fax Tx1 object 714*a* calls the reconnect( ) method of the Idle state object 761S by setting the identification information of the Transform state object 763S to the argument (S6194).

In response to the call, the Idle state object 761S holds the Send state object 762S and the Transform state object 763S as the state object of the transition target element. This is equivalent to the state where the transition target is branched by the switch 770 as shown in FIG. 31.

For example, the switch 770 is implemented as being a flag variable which can make reference to the Idle state object 761S. In this case, for example, when the value of the flag variable is 0, the transition target is switched to the Send state object 762S, and when the value of the flag variable is 1, the transition target is switched to the Transform state object 763S.

Although the connection between the Idle state object 761S and the Transform state object 763S is made, the switch 770 is not switched at this time as described with FIG. 34. The object of the transition target element from the Idle state object 761S still remains the Send state object 762S (namely, it functions as the Fax Tx1).

Then, the Fax Tx1 object 714*a* calls the connect( ) method of the Transform state object 763S by setting the identification information of the Send state object 762S and the identification information of the transform end object 766T to the arguments (S6195).

In response to the call, the Transform state object 763S associates the identification information of the Send state object 762S and the identification information of the transition end object 766T, and holds the association. Namely, the connection corresponding to the state transition from the Transform state 763 to the Send state 762 when the transform end event occurs is created.

Then, the Fax Tx1 object 714*a* performs association between the additional modules and the objects, based on the 43rd to 55th lines of the AspectSM 850. Namely, the PDF2TIFF 841 is associated with the interface of the entry processing of the Transform state object 763S (the IState interface 1004*a*) (S6196). And the ConvertEnd 842 is associated with the Event interface 1003*a* of the transform end object 766T (S6197).

As described in the foregoing, the object composition of the Fax Tx1 is updated to that of the Fax Tx2 as shown in FIG. 31.

In addition, as described with FIG. 36, the contents of the change to the state-transition information 1100 (FIGS. 32 and 33) of the Fax Tx1 are described in the AspectSM 850. However, as mentioned above, the Fax Tx1 object 714*a* does not rewrite the state-transition information 1100 based on the AspectSM 850, but performs the extend processing by changing the object composition of the Fax Tx1. The objects of the Fax Tx1 are created based on the state-transition information 1100, and the AspectSM 850 in which the contents of changes to the state-transition information 1100 are described is applicable to the object composition of the Fax Tx1.

Alternatively, the state-transition information 1100 may be updated based on the AspectSM 850, and the Fax Tx1 (strictly speaking, it is updated to the Fax Tx2) may be reconstructed based on the updated state-transition information 1100.

However, in this case, the object group which constitutes the Fax Tx1 is canceled before reconstruction, and the reference relation to the application program which is using the Fax Tx1 will be destroyed.

Therefore, changing the existing object composition as in this embodiment is more suitable than reconstructing the object group.

As mentioned above, after the extend processing is performed, the switching between the Fax Tx1 and the Fax Tx2 can be performed easily by switching the switch 770. Therefore, returning to the Fax Tx1 from the Fax Tx2 again, after the updating from the Fax Tx1 to the Fax Tx2 is performed, can be attained by switching the switch 770. Namely, what is necessary is just to update the value of the flag variable which can make reference to the Idle state object 761S.

In addition, the updating from the Fax Tx2 to the Fax Tx1 may be realized based on the AspectSM in which the request for updating from the Fax Tx2 to the Fax Tx1 is described. In this case, the switching of the switch 770 is performed in accordance with the timing described in the AspectSM.

As mentioned above, the extend instruction which requests the extension of the Fax Service 714 to be performed at the timing when the extension portion is inactive is described in the AspectSM 850 in this embodiment. And, when the extension portion is inactive, the extension is performed based on the AspectSM 850. Therefore, the Fax Service 714 in this embodiment can perform the extension of the behavior during execution of the Fax Service 714.

Moreover, since the object group is not necessarily reconstructed when performing the extension of the behavior, it is possible to extend the behavior dynamically, without destroying the reference relation of the accessing side and the accessed side of the Fax Service 714. Therefore, the behavior of the Fax Service 714 may be extended without rebooting the multi-function peripheral 101.

(4) OSGi

Figure 38:
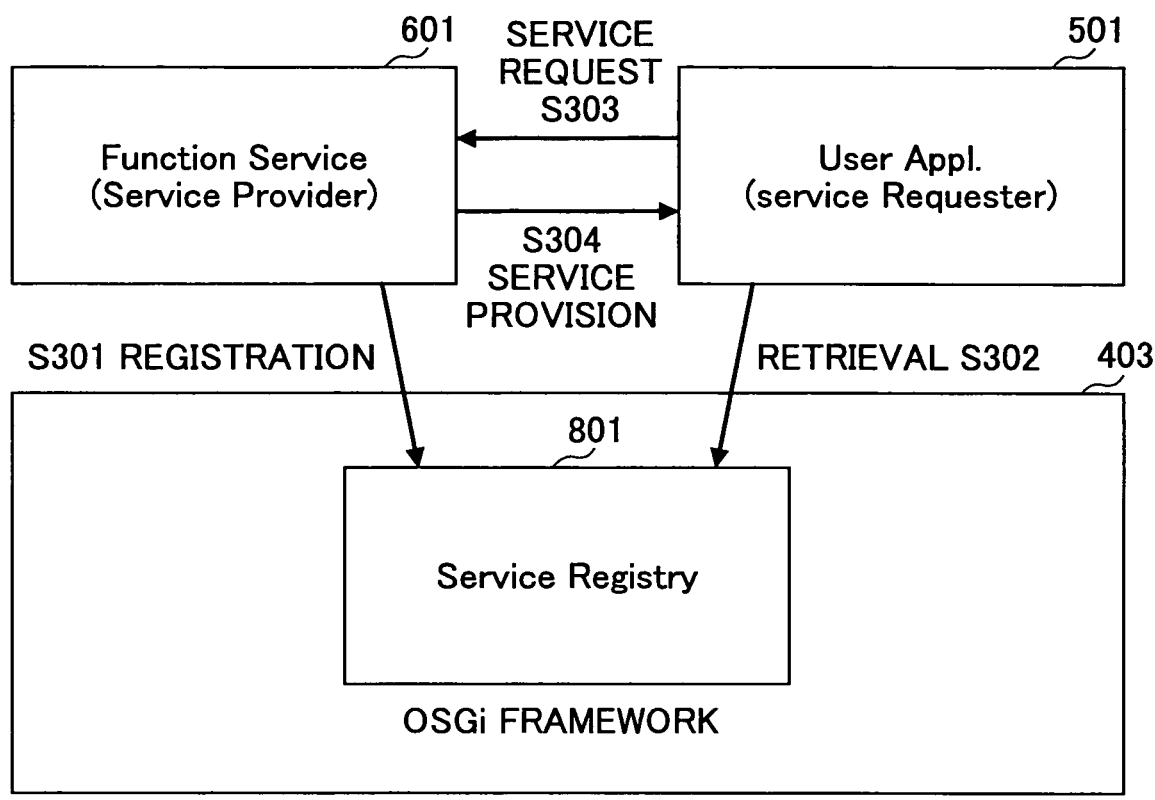
FIG. 38 is a class diagram for explaining Service Registry.

FIG. 38 is a class diagram for explaining the Service Registry 801. The Service Registry 801 is a class which constitutes OSGi framework 403.

The Function Service 601, which is the service provision side, registers into the Service Registry 801 the service content which is provided by the self module (S301). The user application 501, which is the service requesting side, retrieves the Service Registry 801 to find the service content requested by the self module (S302).

The user application 501 sends a service request to the Function Service 601 (S303). In response to this request, the Function Service 601 provides the requested service for the user application 501 (S304).

Figure 39:
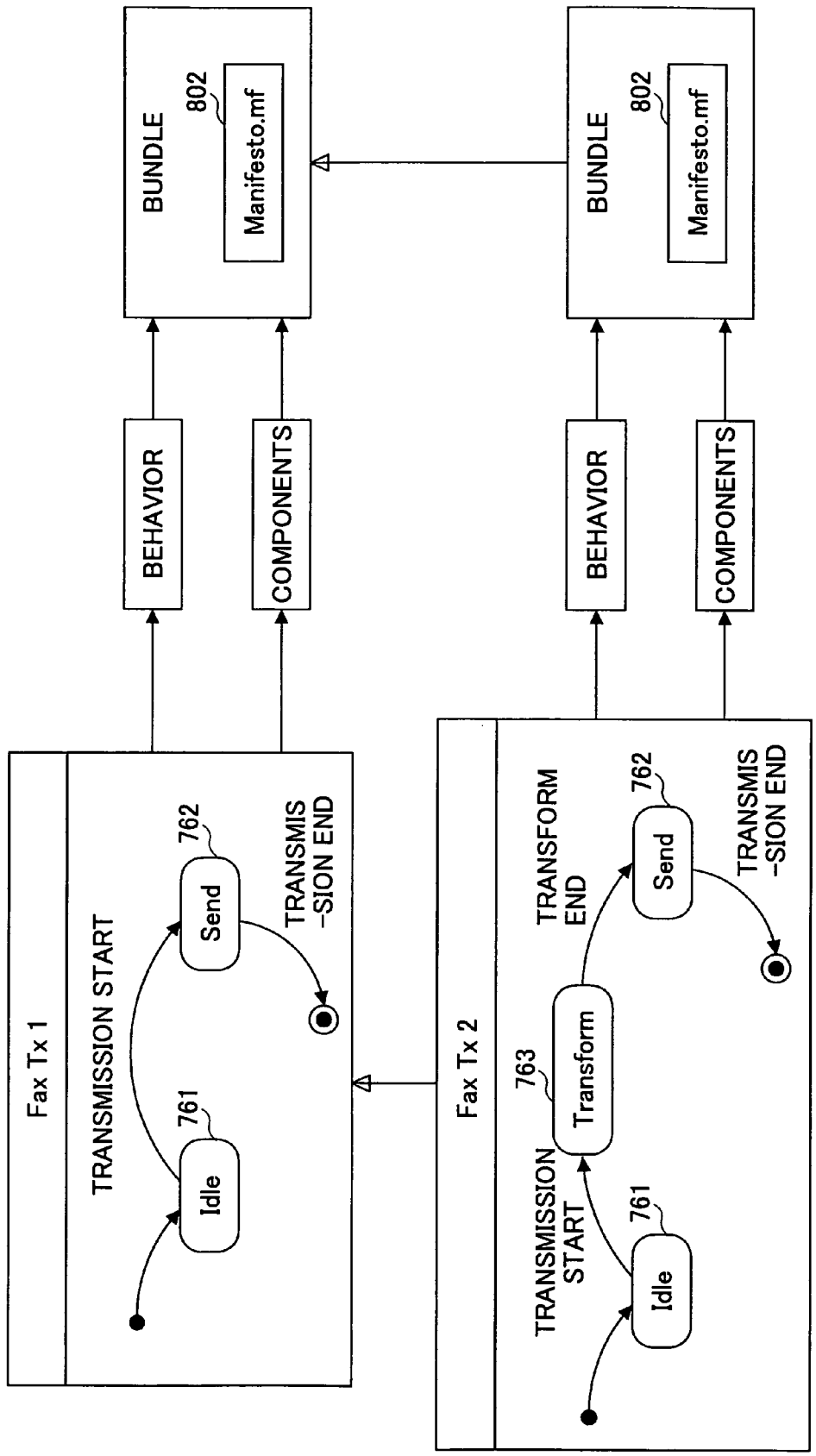
FIG. 39 is a diagram for explaining the bundling processing of a state-transition model.

FIG. 39 is a diagram for explaining the bundling processing of a state-transition model.

In designing a state-transition model, the behavior and the components of the model are designed separately. The behavior is described in the XMI language, and the components are described in the Java (registered trademark) language. The codes by the XMI language and the codes by the Java (registered trademark) language are bundled according to the bundling processing of OSGi. A manifesto file 802 is incorporated in the bundle. Information required for the bundle is stored in the manifesto file 802.

Figure 40:
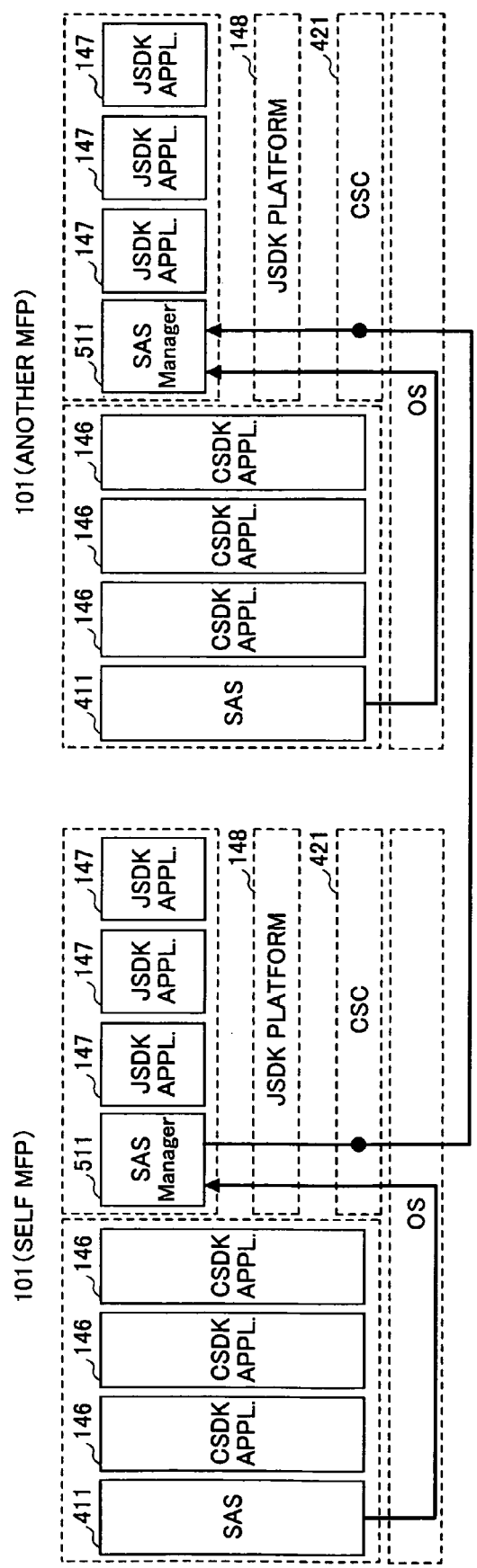
FIG. 40 is a diagram for explaining CSC in case of a same device type.
Figure 41:
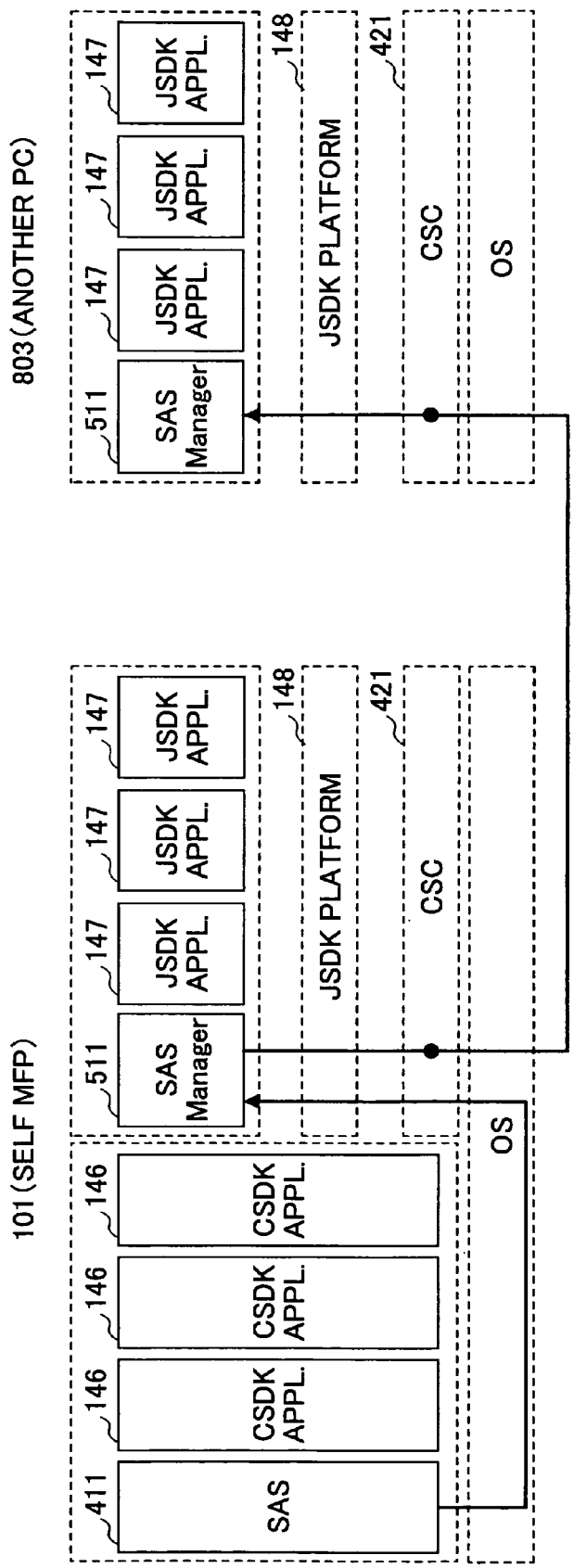
FIG. 41 is a diagram for explaining CSC in case of a different device type.

FIG. 40 and FIG. 41 are diagrams for explaining CSC (communication service concierge) 421.

In the multi-function peripheral 101, CSC 421 is implemented for processing the OSGi service platform of another machine in the same manner as the processing of the OSGi service platform of the self machine. The mode of implementing CSC 421 is as shown in FIG. 6.

FIG. 40 shows the case in which another machine is a multi-function peripheral 101, and FIG. 41 shows the case in which another machine is a PC 803. As shown in FIG. 40 and FIG. 41, the association between SAS Manager 511 of the self MFP and SAS Manager 511 of another machine is realized by the intermediary process of CSC 421 of the self machine and CSC 421 of another machine.

The present invention is not limited to the above-described embodiments, and variations and modifications may be made without departing from the scope of the present invention.

Further, the present application is based on and claims the benefit of priority of Japanese patent application No. 2005-270265, filed on Sep. 16, 2005, Japanese patent application No. 2005-270266, filed on Sep. 16, 2005, Japanese patent application No. 2006-243221, filed on Sep. 7, 2006, and Japanese patent application No. 2006-243222, filed on Sep. 7, 2006, the entire contents of which are hereby incorporated by reference.

What is claimed is:

1. A device comprising:
a processor configured to execute, by a second program, a process requested by a first program, the second program including a plurality of modules that operate according to a state transition model with respect to each other for operating the device, wherein the modules respectively correspond to states of the state transition model each subjected to state transition, or a plurality of state transitions between states;
determine that a problem or defective matter exists when the second program executes the process requested by the first program;
generate change information of a module of the second program based on the problem or defective matter, the change information including a change in the state transition model of a condition of a state transition of the module;
record the change information of the module including the state transition, the condition of the state transition, and information for changing the condition in the module; and
change the state transition model according to the condition specified in the change information in the module, such that a subsequent process requested by the first program is executed according to the changed state transition model;
wherein, in the recorded change information, information indicating a timing of changing the condition in the module is specified, and
wherein the processor changes the state transition model according to the timing specified in the change information.

2. The device according to claim 1, wherein the second program causes the device to determine whether state transition is possible based on the condition changed in the module, when the state transition of the second program is to occur.

3. The device according to claim 1, wherein, in the change information, a timing to change the state transition model is specified when the module is not operating the device.

4. The device according to claim 1, wherein, in the change information, a timing to change the condition is specified by identifying a module operating the device, and
the processor determines that it is the timing to change the state transition model when the module specified by the timing is operating the device.

5. The device according to claim 1, wherein the processor suspends the changing of the state transition model until it is determined that the timing to change the state transition model has approached.

6. The device according to claim 1, wherein the processor changes the condition of the state transition, based on a condition stored on a memory card.

7. The device according to claim 1, wherein the module is an object.

8. The device according to claim 1, wherein the information indicating the timing indicates that a method specified in the information is called.

9. A method comprising:
configuring a second program to execute a process requested by a first program, the second program including a plurality of modules that operate according to a state transition model with respect to each other for operating a device, wherein the modules respectively correspond to states of the state transition model each subjected to state transition, or a plurality of state transitions between states;
determining that a problem or defective matter exists when the second program executes the process requested by the first program;
generating change information of a module of the second program based on the problem or defective matter, the change information including a change in the state transition model of a condition of a state transition of the module;
recording the change information of the module including the state transition, the condition of the state transition, and information for changing the condition in the; and
changing the state transition model according to the condition specified in the change information in the module, such that a subsequent process requested by the first program is executed according to the changed state transition model;
wherein, in the recorded change information, information indicating a timing of changing the condition in the module is specified; and
wherein the changing includes changing the state transition model according to the timing specified in the change information.

10. The method according to claim 9, wherein the second program causes the device to determine whether state transition is possible based on the condition changed in the module, when the state transition of the second program is to occur.

11. The method according to claim 9, wherein, in the change information, a timing to change the state transition model is specified when the module is not operating the device.

12. The method according to claim 9, wherein, in the change information, a timing to change the condition is specified by identifying a module operating the device, and
the changing includes determining that it is the timing to change the state transition model when the module specified by the timing is operating the device.

13. The method according to claim 9, wherein the changing includes suspending changing of the state transition model until it is determined that the timing to change the state transition model has approached.

14. The method according to claim 9, wherein the changing includes changing the condition of the state transition, based on a condition stored on a memory card.

15. The method according to claim 9, wherein the module is an object.

16. The method according to claim 9, wherein the information indicating the timing indicates that a method specified in the information is called.

17. A non-transitory computer-readable storage medium having computer readable program codes embodied in the computer readable storage medium that, when executed cause a computer to execute:
- configuring a second program to execute a process requested by a first program, the second program including a plurality of modules that operate according to a state transition model with respect to each other for operating a device, wherein the modules respectively correspond to states of the state transition model each subjected to state transition, or a plurality of state transitions between states;
- determining that a problem or defective matter exists when the second program executes the process requested by the first program;
- generating change information of a module of the second program based on the problem or defective matter, the change information including a change in the state transition model of a condition of a state transition of the module;
- recording the change information of the module including the state transition, the condition of the state transition, and information for changing the condition in the; and
- changing the state transition model according to the condition specified in the change information in the module, such that a subsequent process requested by the first program is executed according to the changed state transition model in response to a service provision request to the second program that the first program causes the device to execute;
- wherein, in the recorded change information, information indicating a timing of changing the condition in the module is specified; and
- wherein the changing includes changing the state transition model condition in the module when the service provision request is specified in the change.

18. The non-transitory computer-readable storage medium according to claim 17, wherein the second program causes the device to determine whether state transition is possible based on the condition changed in the module, when the state transition of the second program is to occur.

19. The non-transitory computer-readable storage medium according to claim 17, wherein, in the change information, a timing to change the state transition model is specified when the module is not operating the device.

20. The non-transitory computer-readable storage medium according to claim 17, wherein, in the change information, a timing to change the condition is specified by identifying a module operating the device, and
- the changing includes determining that it is the timing to change the state transition model when the module is operating the device.

21. The non-transitory computer-readable storage medium according to claim 17, wherein the changing includes suspending changing of the state transition model until it is determined that the timing to change the state transition model has approached.

22. The non-transitory computer-readable storage medium according to claim 17, wherein the changing includes changing the condition of the state transition, based on a condition stored on a memory card.

23. The non-transitory computer-readable storage medium according to claim 17, wherein the module is an object.

24. The non-transitory computer-readable storage medium according to claim 17, wherein the information indicating the timing indicates that a method specified in the information is called.

\* \* \* \* \*